United States Patent [19]

Smith et al.

[11] 3,978,659

[45] Sept. 7, 1976

[54] BUMPLESS TRANSFER IN SHIFTING CONTROL COMMAND BETWEEN THE PRIMARY AND BACKUP CONTROL SYSTEMS OF A GAS TURBINE POWER PLANT

[75] Inventors: Jack R. Smith, Pittsburgh; Leonard H. Burrows, Gibsonia, both of Pa.

[73] Assignee: Westinghouse Electric Corporation, Pittsburgh, Pa.

[22] Filed: Feb. 19, 1975

[21] Appl. No.: 551,203

[52] U.S. Cl. .......................................... 60/39.28 R
[51] Int. Cl.² ........................................... F02C 9/08
[58] Field of Search ......... 60/39.28 R, 39.14, 39.15; 415/17; 290/40 R; 235/151.21

[56] References Cited
UNITED STATES PATENTS

| | | | |
|---|---|---|---|
| 3,340,883 | 9/1967 | Peternel | 415/17 X |
| 3,552,872 | 1/1971 | Giras | 415/17 |
| 3,709,626 | 1/1973 | Eggenberger | 415/17 |
| 3,898,441 | 8/1975 | Davis | 415/1 |

Primary Examiner—Clarence R. Gordon
Attorney, Agent, or Firm—S. A. Seinberg

[57] ABSTRACT

A backup control system for a gas turbine power plant having a computer implemented primary control system is disclosed. Bumpless transfer between the two control systems is effected by tracking a plurality of control signals generated by each control system, the signals being functionally identical, but independent. After comparison of the functionally identical signals, transfer between the two control systems is permitted only if any tracking error does not exceed a permissible deadband margin.

The presence of tracking error is also utilized to generate a signal which is employed to operate panel mounted signal means, which panel can thereby be used as a diagnostic tool in monitoring the health of both the primary and backup systems. Transfer reliability is thereby enhanced and turbine availability improved.

11 Claims, 49 Drawing Figures

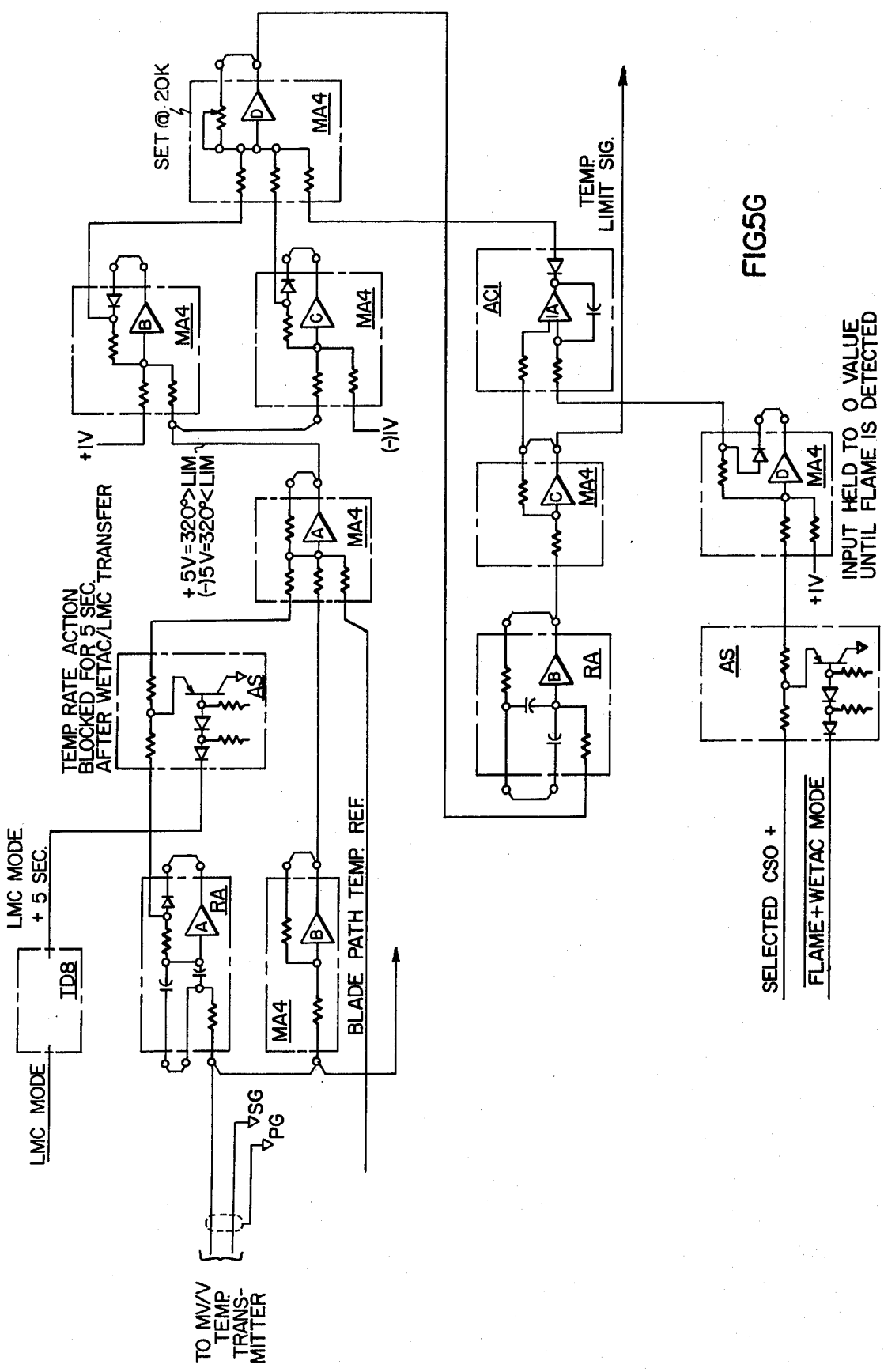

(±)10V. REFERENCE & SPEED
SET POINT DEVELOPMENT

BLADE PATH TEMP. REFERENCE DEVELOPMENT

RUN FUNCTION OBTAINED BY VOLTAGE ADDITION TO START FUNCTION. ANALOG SW. 2F GROUNDS B AMPL. OUTPUT WITH BKR. OPEN.

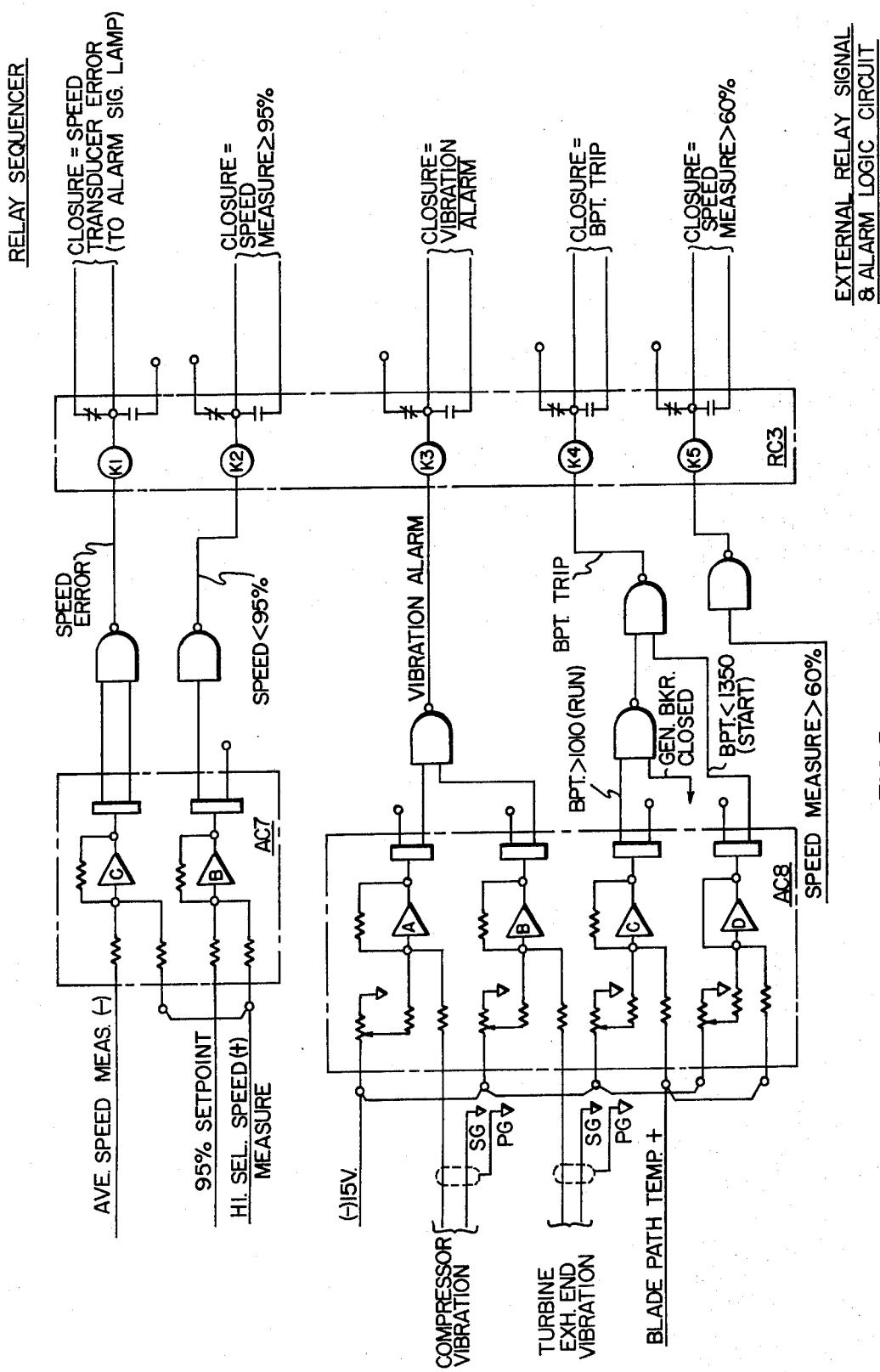

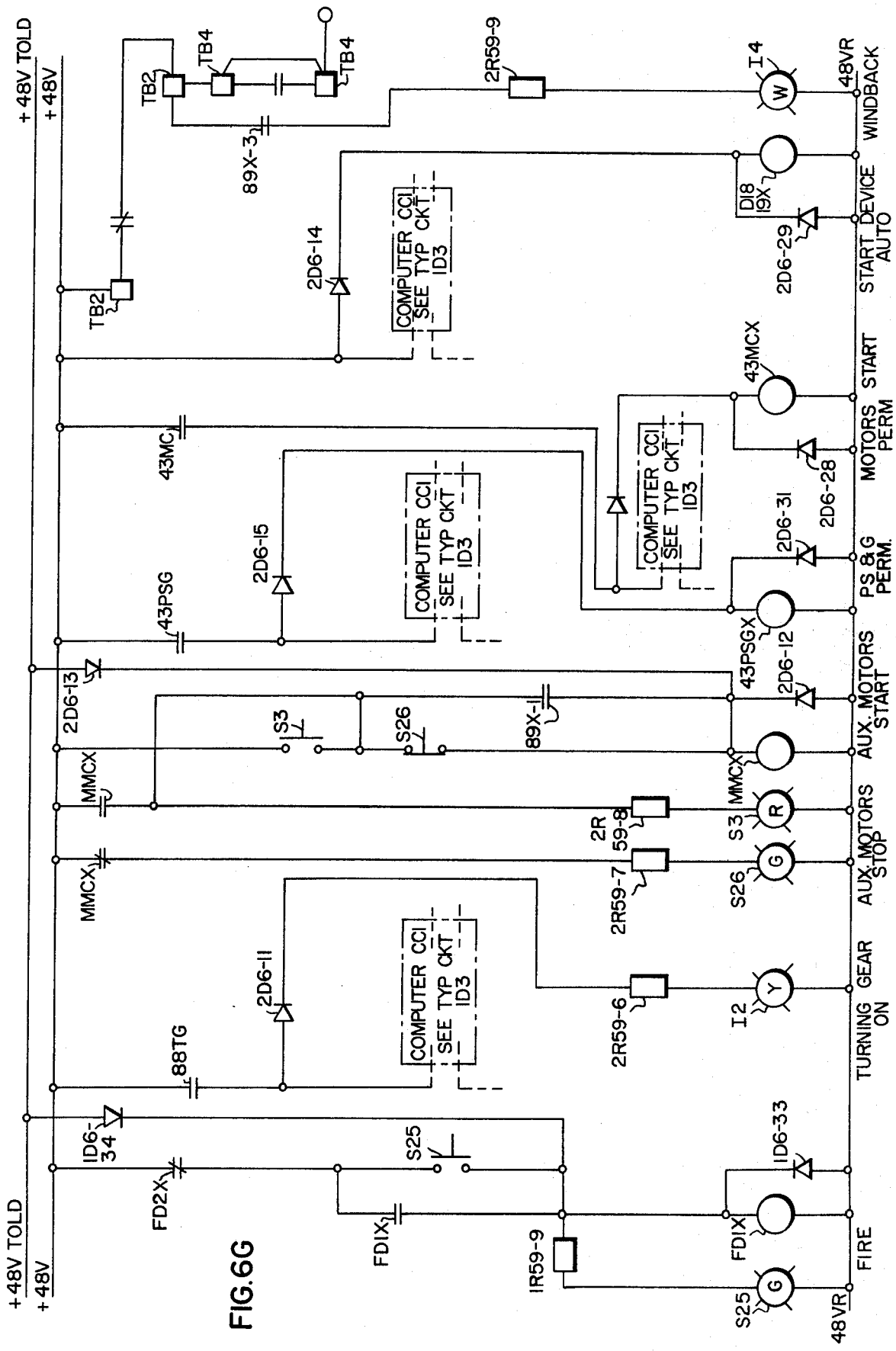

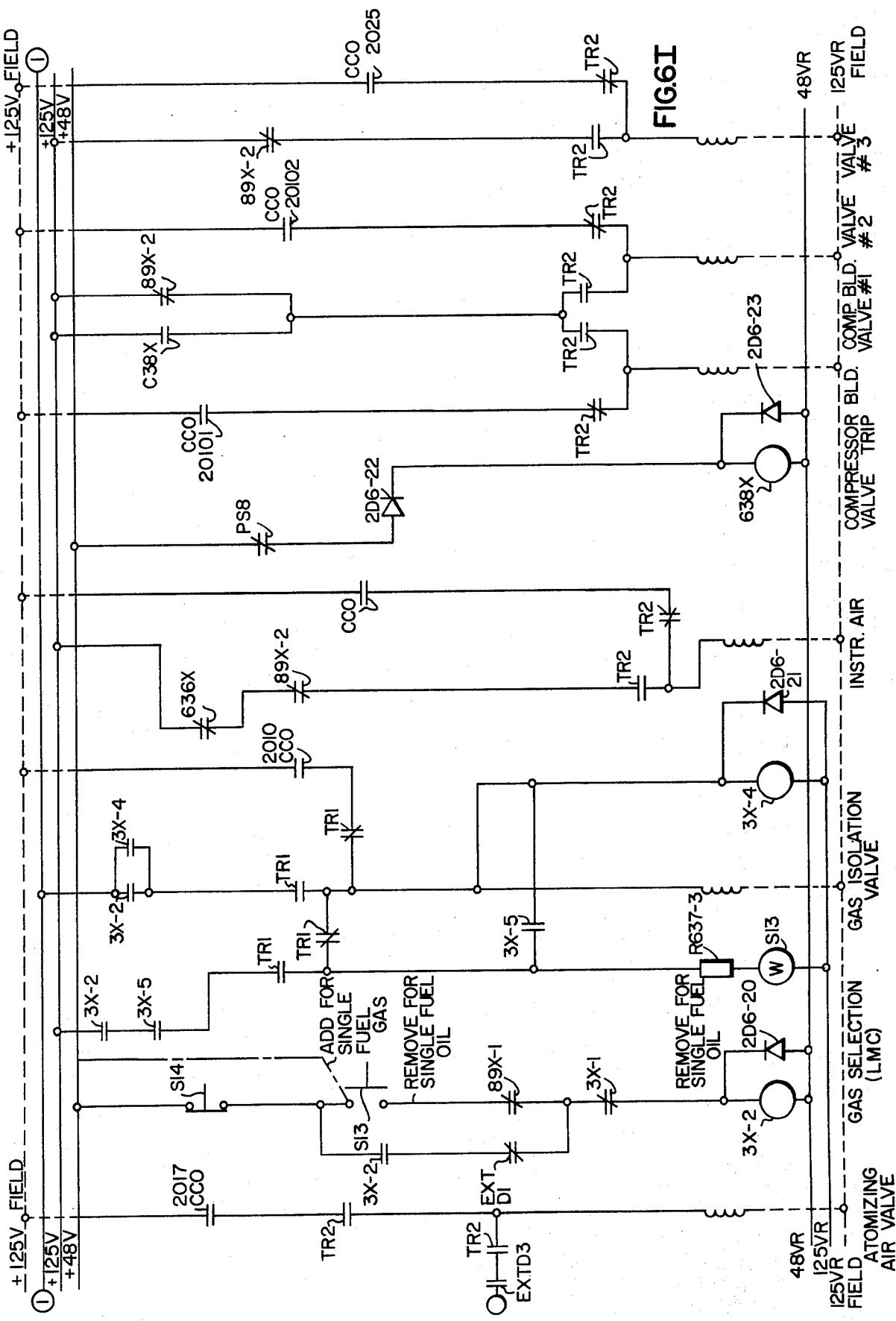

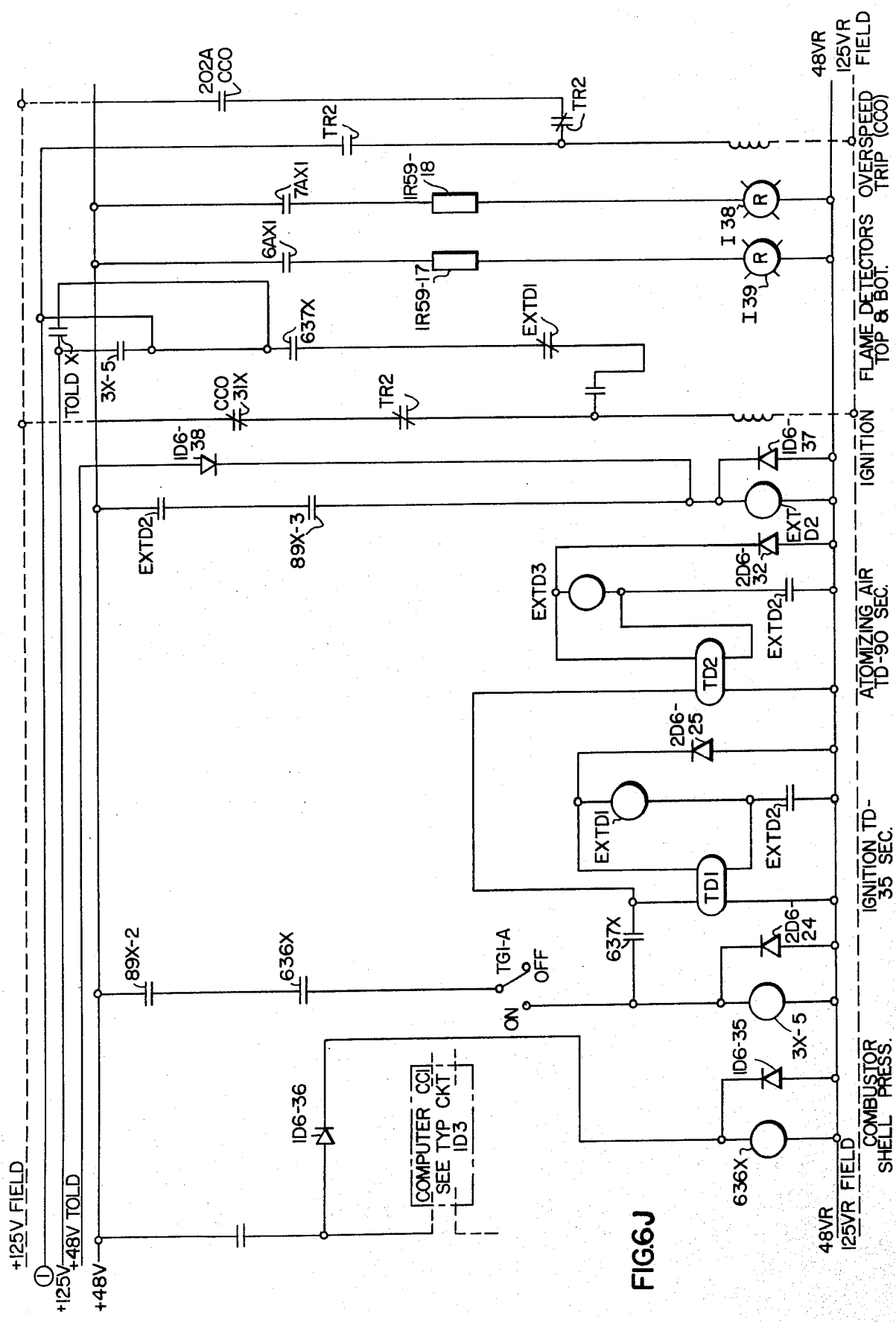

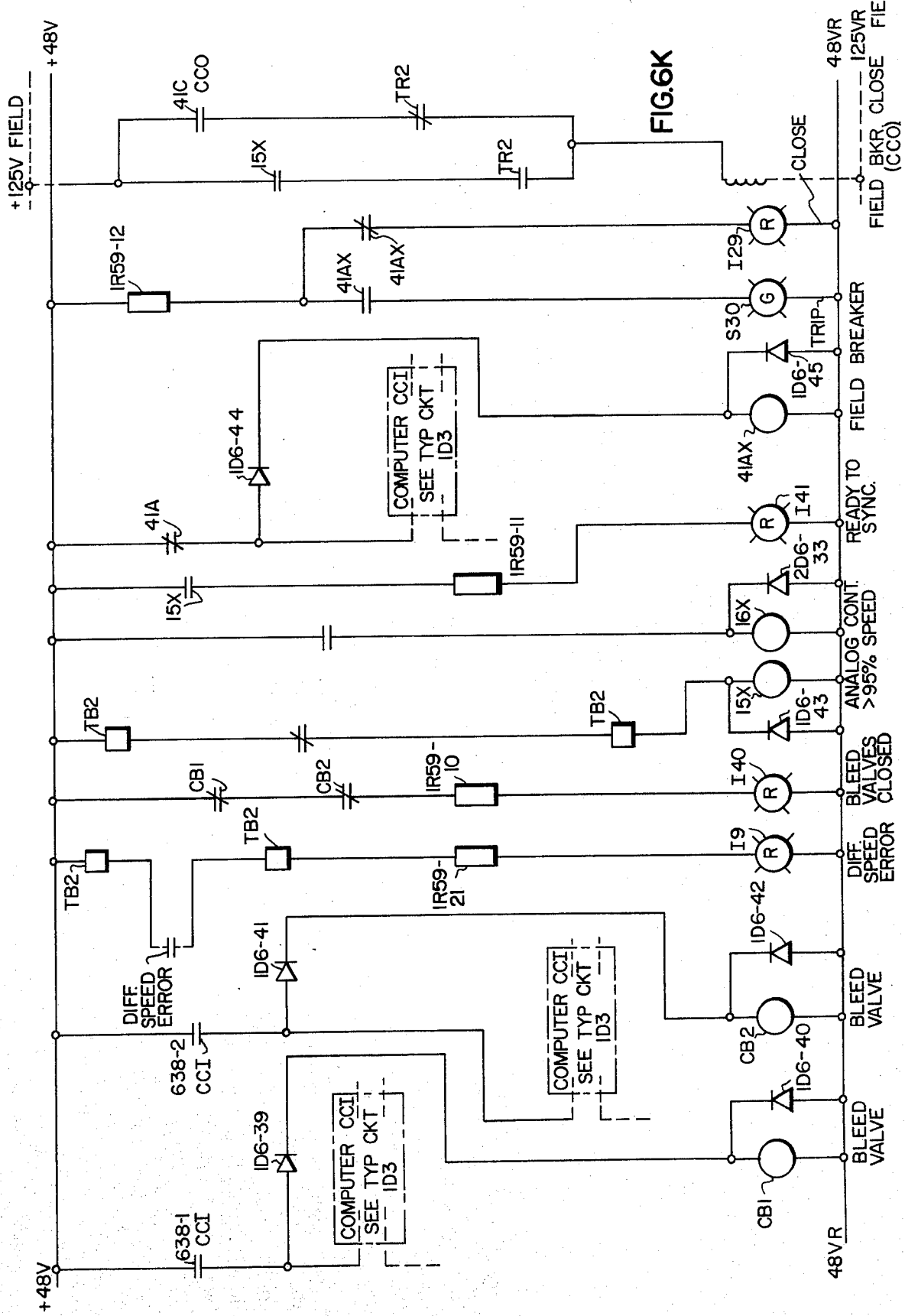

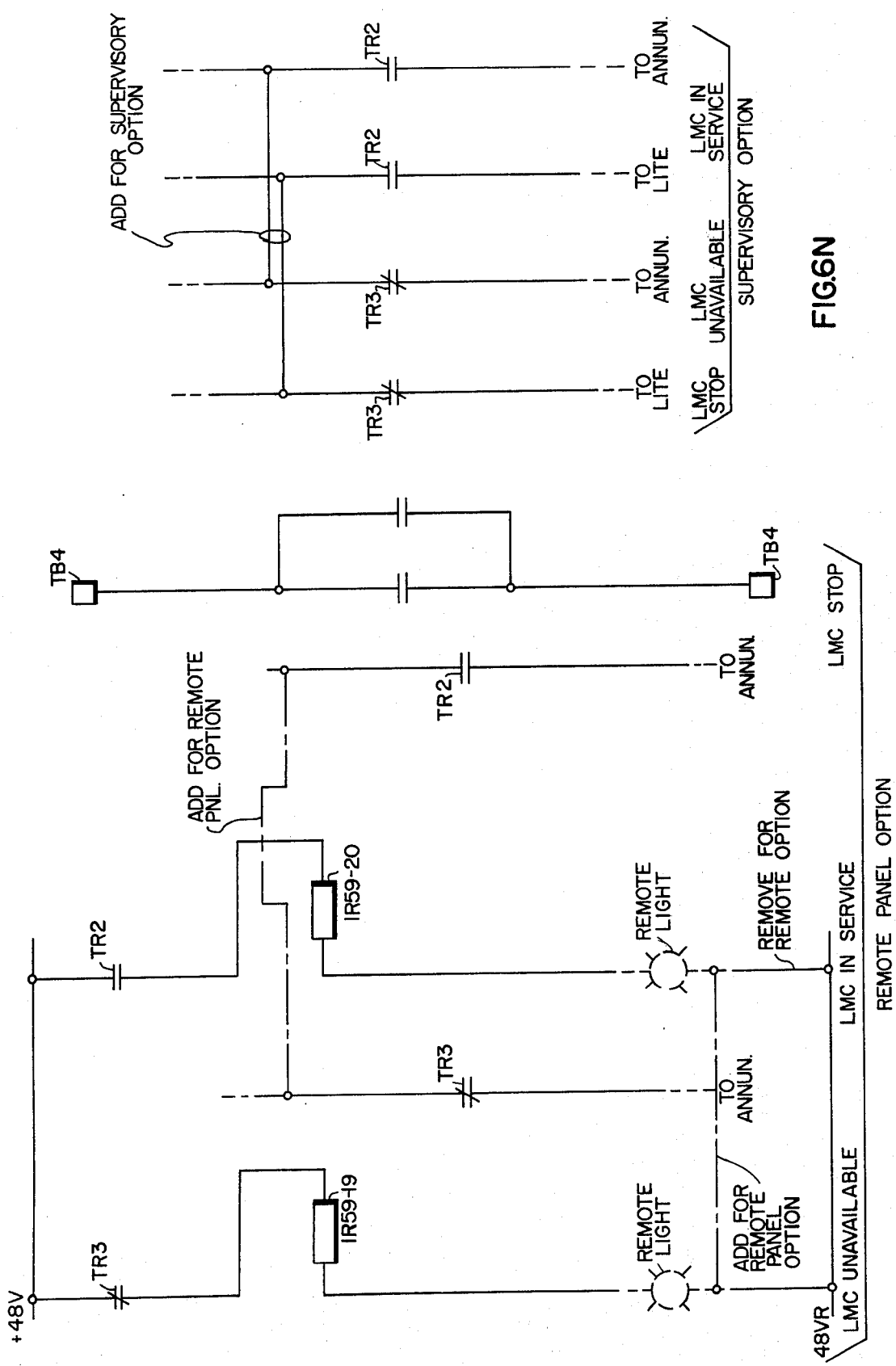

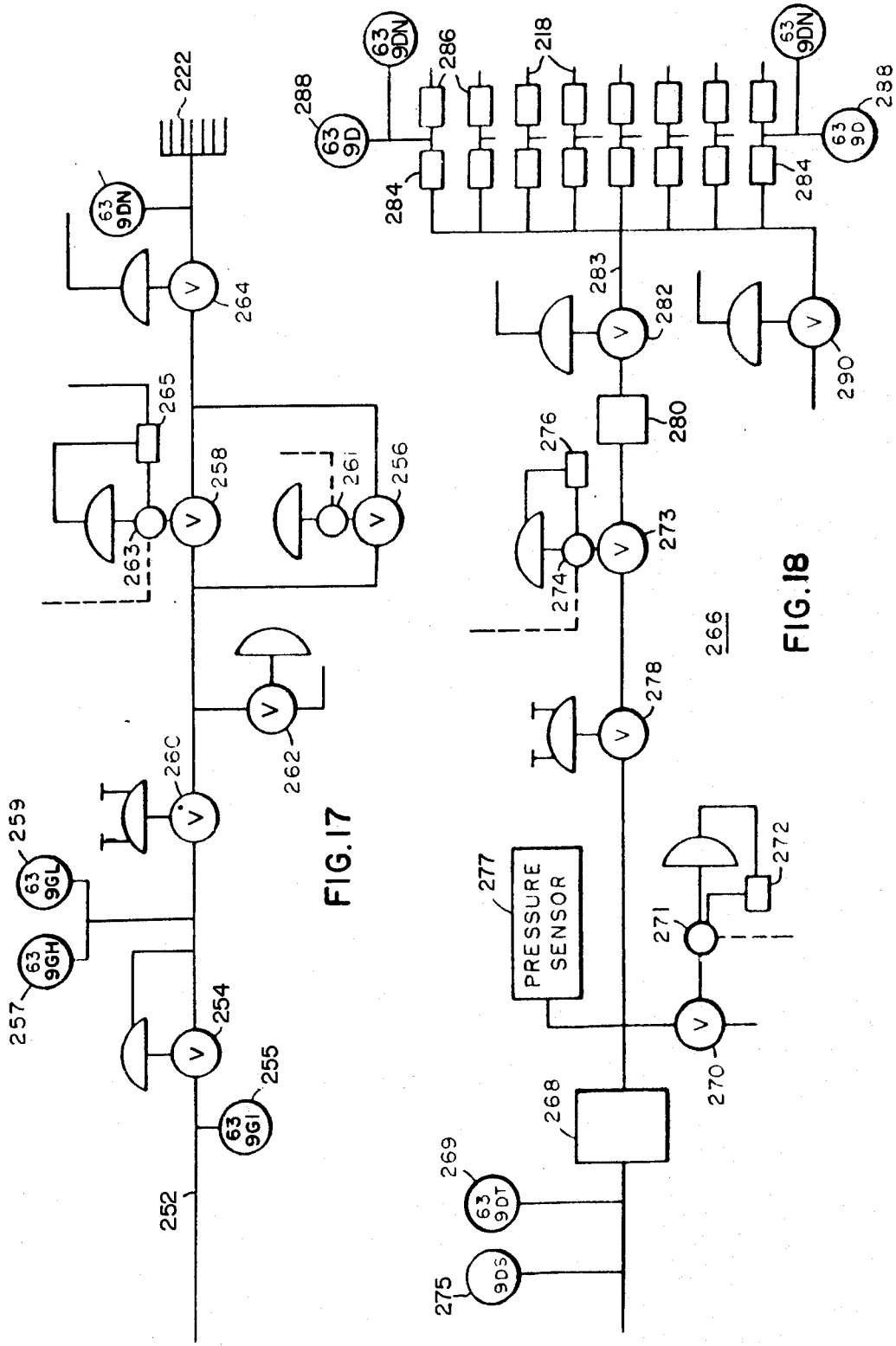

BUMPLESS TRANSFER IN SHIFTING CONTROL COMMAND BETWEEN THE PRIMARY AND BACKUP CONTROL SYSTEMS OF A GAS TURBINE POWER PLANT

CROSS-REFERENCE TO RELATED APPLICATIONS

Reference is hereby made to the following copending and related applications, all of which are assigned to the present assignee:

U.S. Pat. application Ser. No. 476,182 filed on June 4, 1974 in the names of Smith et al, entitled "Local Maintenance Controller For Gas Turbine Power Plants Having A Primary Control System", which application is incorporated herein by reference;

U.S. Pat. application Ser. No. 82,470 filed on Oct. 20, 1970 in the names of J. Reuther and T. Giras, entitled "System And Method For Operating Industrial Gas Turbine Apparatus And Gas Turbine Electric Power Plants Preferably With A Digital Computer Control System", now abandoned in favor of U.S. Pat. application Ser. No. 319,114, filed on Dec. 29, 1972 as a streamline continuation thereof;

U.S. Pat. application Ser. No. 82,469 filed on Oct. 20, 1970 in the names of R. Kiscaden and R. Yannone, entitled "System And Method For Accelerating And Sequencing Industrial Gas Turbine Apparatus And Gas Turbine Electric Power Plants Preferably With A Digital Computer Control System", now abandoned in favor of U.S. Pat. application Ser. No. 252,948, filed on May 12, 1972 as a streamline continuation thereof, and U.S. Pat. application Ser. No. 252,131, filed on May 10, 1972 as a divisional of the originally filed, above-mentioned, U.S. Pat. application Ser. No. 82,469;

U.S. Pat. application Ser. No. 82,467 filed on Oct. 20, 1970 now U.S. Pat. No. 3,898,439, in the name of T. Reed, entitled "Improved System And Method For Operating Industrial Turbine Apparatus And Gas Turbine Electric Power Plants Preferably With A Digital Computer Control System";

U.S. Pat. application Ser. No. 99,491 filed on Dec. 18, 1970 in the name of J. Reuther, entitled "System And Method Employing A Digital Computer For Automatically Synchronizing A Gas Turbine Or Other Electric Power Plant Generator With A Power System", now abandoned in favor of U.S. Pat. application Ser. No. 276,508, filed on July 31, 1972 as a streamline continuation thereof;

U.S. Pat. application Ser. No. 99,493 filed on Dec. 18, 1970 in the name of T. Reed, entitled "System And Method Employing A Digital Computer With Improved Programmed Operation For Automatically Synchronizing A Gas Turbine Or Other Electric Power Plant Generator With A Power System", now abandoned in favor of U.S. Pat. application Ser. No. 276,343, filed on July 31, 1972 as a streamline continuation thereof;

U.S. Pat. application Ser. No. 205,261 filed on Dec. 6, 1971 in the names of R. Yannone and R. Kiscaden, entitled "Improved Control System And Method For Controlling Dual Fuel Operation Of Industrial Gas Turbine Power Plants Preferably Employing A Digital Computer", now abandoned in favor or U.S. Pat. application Ser. No. 310,520, filed on Nov. 29, 1972, now U.S. Pat. No. 3,866,108, as a streamline continuation thereof;

U.S. Pat. application Ser. No. 205,263 filed on Dec. 6, 1971 in the name of J. Reuther, entitled "Industrial Gas Turbine Power Plant Control System Having Capability For Effecting Automatic Fuel Transfer Under Load Preferably Employing A Digital Computer", now abandoned in favor of U.S. Pat. application Ser. No. 308,892, filed on Nov. 22, 1972, now U.S. Pat. No. 3,914,623, as a streamline continuation thereof;

U.S. Pat. application Ser. No. 155,905 filed on June 23, 1971 in the names of R. Yannone and T. Reed, entitled "Improved System And Method For Monitoring And Controlling Operation of Industrial Gas Turbine Apparatus And Gas Turbine Electric Power Plants Preferably With A Digital Computer Control System", now abandoned in favor of U.S. Pat. application No. 317,839, filed on Dec. 26, 1972 as a streamline continuation thereof;

U.S. Pat. application Ser. No. 189,632 filed on Oct. 15, 1971 in the names of R. Yannone and R. Kiscaden, entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process", now abandoned in favor of U.S. Pat. application Ser. No. 323,593, filed on Jan. 15, 1973 now U.S. Pat. No. 3,891,915 as a streamline continuation thereof;

U.S. Pat. application Ser. No. 189,633 filed on Oct. 15, 1971 in the names of J. Reuther and T. Reed, entitled "Improved Digital Computer Control System And Method For Monitoring And Controlling Operation of Industrial Gas Turbine Apparatus Employing Expanded Parameteric Control Algorithm", now abandoned in favor of U.S. Pat. application Ser. No. 326,718, filed on Jan. 26, 1973, now U.S. Pat. No. 3,866,109, as a streamline continuation thereof; and U.S. Pat. application Ser. No. 204,944 filed on Dec. 6, 1971 in the name of G. Rankin, entitled "Industrial Gas Turbine Power Plant Control System And Method For Implementing Improved Dual Fuel Scheduling Algorithm Permitting Automatic Fuel Transfer Under Load", now abandoned in favor of U.S. Pat. application Ser. No. 332,457, filed on Feb. 14, 1973, now U.S. Pat. No. 3,875,380, as a streamline continuation thereof.

Reference is also made to the following related, copending and commonly filed and assigned applications, all of which are hereby incorporated by reference:

U.S. Pat. application Ser. No. 551,201 filed in the name of Leonard H. Burrows, entitled "Delayed Ramping In The Primary Control System Or Local Maintenance Controller Of A Gas Turbine Implemented Electrical Power Plant";

U.S. Pat. application Ser. No. 551,202 filed in the names of Jack R. Smith and Leonard H. Burrows, entitled "Matching Response Of A Blade Path Temperature Limit Signal To Characteristics Of A Gas Turbine"; and U.S. Pat. application Ser. No. 551,204 filed in the name of Richard S. Heiser, entitled "Time Delayed Relay Sequencer And Alarm Reset For A Gas Turbine Local Maintenance Controller".

BACKGROUND OF THE INVENTION

The present invention relates to the control of a gas turbine power plant and, more particularly, to reliable and bumpless transfers between the primary control system of such a plant and a backup control system.

Transfer is effected and enhanced by tracking a plurality of functionally identical, but independent signals.

Local maintenance or backup control systems for both gas and steam turbine plants are known in the prior art. Typically, such backup systems achieved their stated purpose through excessive redundancy or a relatively high degree of operator intervention. Alternatively, minimum backup capability was provided, i.e., only one or two critical plant parameters were controlled in the backup mode, but at a cost of control versatility and plant availability. Furthermore, certain functions such as alarm reset capability were either operator dependent or unavailable.

Due to the increasing use of computer implemented primary control systems for power plants, the need for backup control has become pronounced. Remote placement of power plants, for example, required backup capability. The need for maintenance of the primary control system, without loss of plant availability, also contributed to the need. Moreover, customer demands for overall plant reliability and generating availability dictated enhanced backup capability.

Thus, there existed a pronounced requirement for a backup control system which would do many of the things suggested in or taught by the prior art systems, but one which would be improved thereover and be able to function independently of the primary control system in remote locations for long periods of time with enhanced functional capabilities in an efficient, relatively inexpensive and reliable manner. More specifically, the need also existed for a backup control system which could be armed preparatory to assuming control, but which would draw only minimal power in such a state thereby increasing the life of many of its components and reducing operating costs. Further, the usefulness of such a backup control system would be increased by giving it the ability to perform additional functions, such as automatic alarm circuitry reset, thereby reducing operator involvement and operating cost.

In addition, the need existed for a backup control system which would accept a transfer only when it could be effected in a bumpless manner. Further, the need existed for capability in such a backup control system for preventing transfer of control command back to the primary system if it could not be achieved in a bumpless manner.

SUMMARY OF THE INVENTION

Accordingly, there is provided a backup control system for a gas turbine power plant having a primary control system which develops a plurality of signals for regulating predetermined plant elements such as, for example, a fuel scheduling signal or CSO or fuel valve positioning signals. The backup control system includes means for generating a like plurality of functionally identical signals which are independent of the corresponding primary signals.

Comparator means, responsive to the two sets of signals, are employed to develop a tracking error signal in response to the detection of any difference between one of the generated signals and its functionally identical primary counterpart. The tracking error signal is used, in turn, to inhibit transfers of control command in conjunction with transfer enabling means whenever a tracking error signal is developed.

The backup control system is also provided with an operator's panel which includes indicating means responsive to the tracking error signal for indicating the development thereof or lack of proper tracking. This indicating means can be used as a diagnostic tool whenever an authorized transfer is inhibited or in preparation therefor.

BRIEF DESCRIPTION OF THE DRAWINGS

FIGS. 5A–L illustrate a schematic and functional diagram of one embodiment of a dual fuel analog control system of the local maintenance controller shown in FIG. 2;

FIGS. 17 and 18 respectively illustrate schematic diagrams of the gas and liquid fuel supply systems employed with the gas turbine shown in FIG. 11.

DESCRIPTION OF THE PREFERRED EMBODIMENT

The Gas Turbine Power Plant And The Primary Control System

Figure 9:
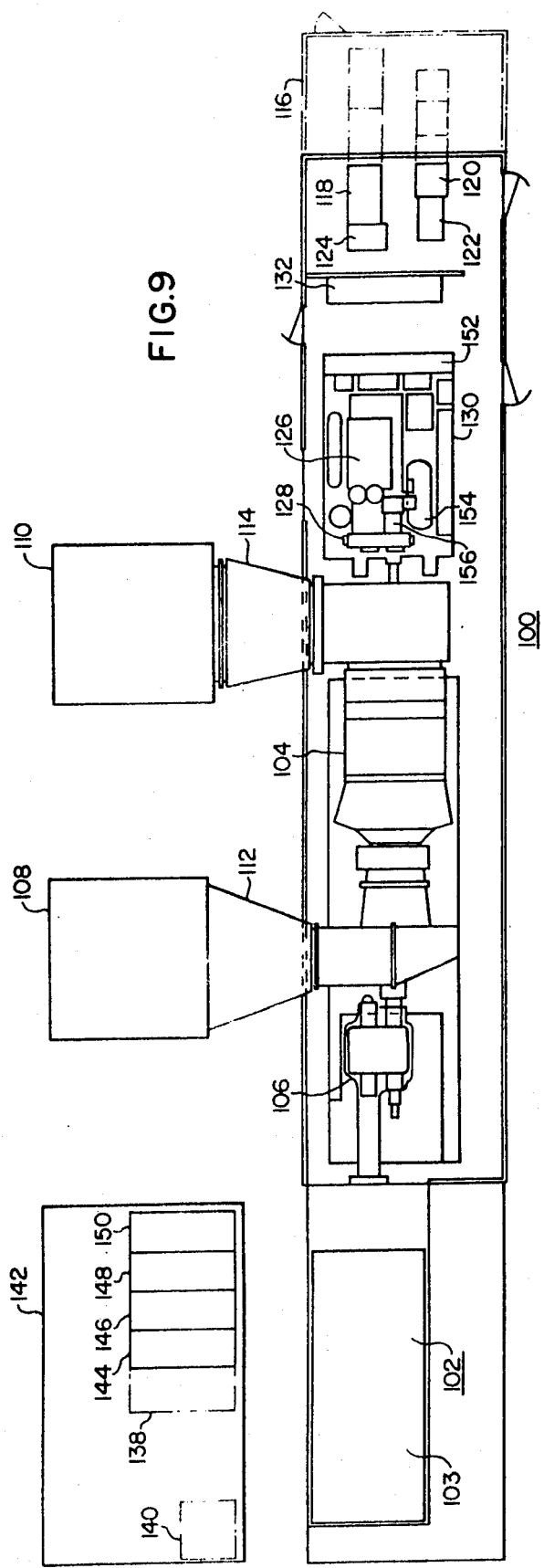
FIG. 9 shows a top plan view of a gas turbine power plant.

The gas turbine power plant and the hybrid analog/digital control system therefor is completely described in U.S. Pat. application Ser. No. 82,470, which is hereby incorporated herein by reference. More particularly, there is shown in FIG. 9, a gas turbine electric power plant 100 which includes an AC generator 102 driven by a combustion or gas turbine 104 through a reduction gear unit 106. In this instance, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristically associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor load, and DC computer and other control power for a period following shutdown of the plant 100 due to loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

Figure 10:
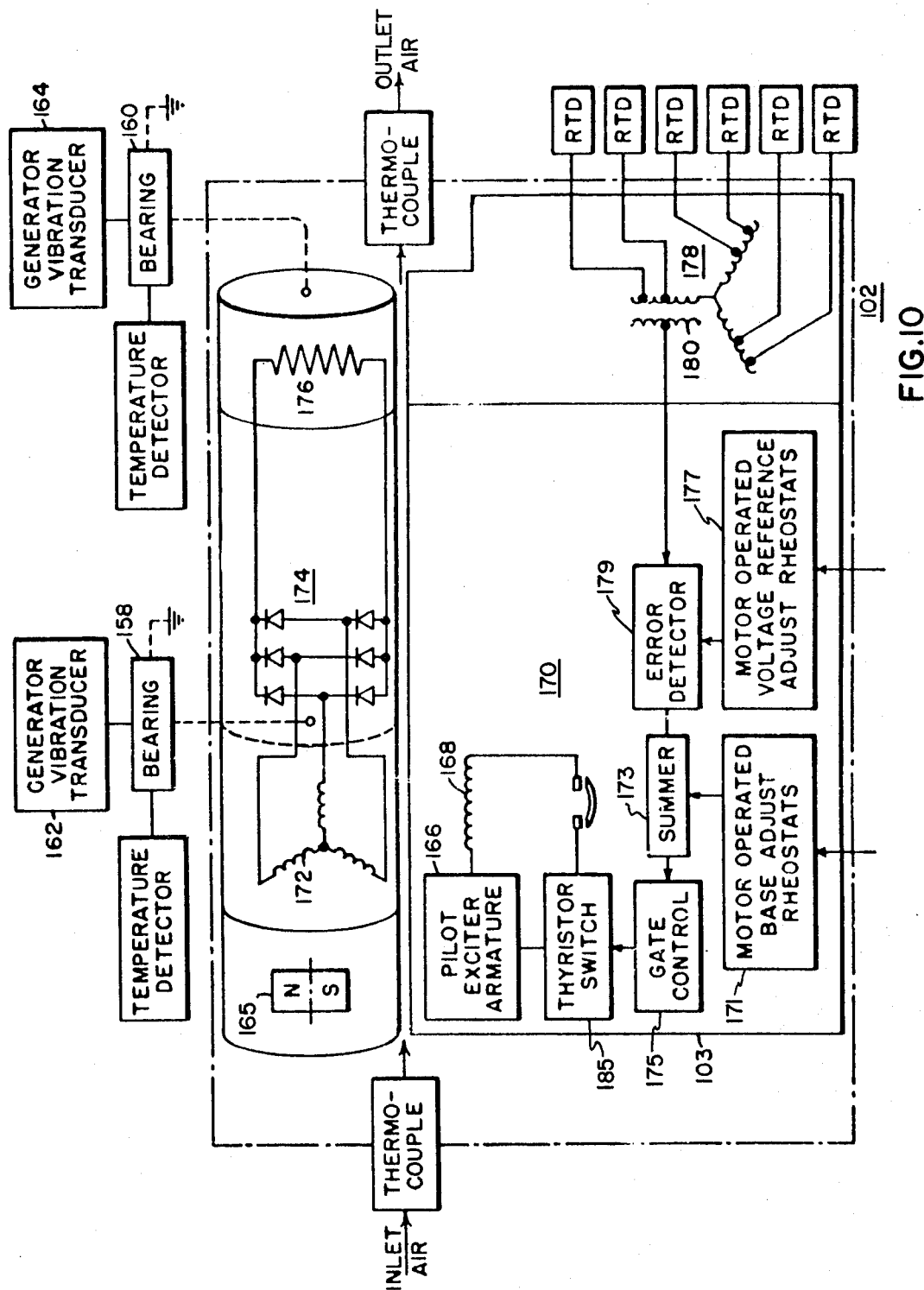
FIG. 10 shows a schematic view of a rotating rectifier exciter and a generator employed in the gas turbine power plant of FIG. 9.

The generator 102 and its brushless exciter 103 are schematically illustrated in greater detail in FIG. 10. Structural details as well as details of operation are considered more fully in the aforementioned copending U.S. Pat. application Ser. No. 82,470, Section A2, pages 21 to 24.

Briefly, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

Figure 11:
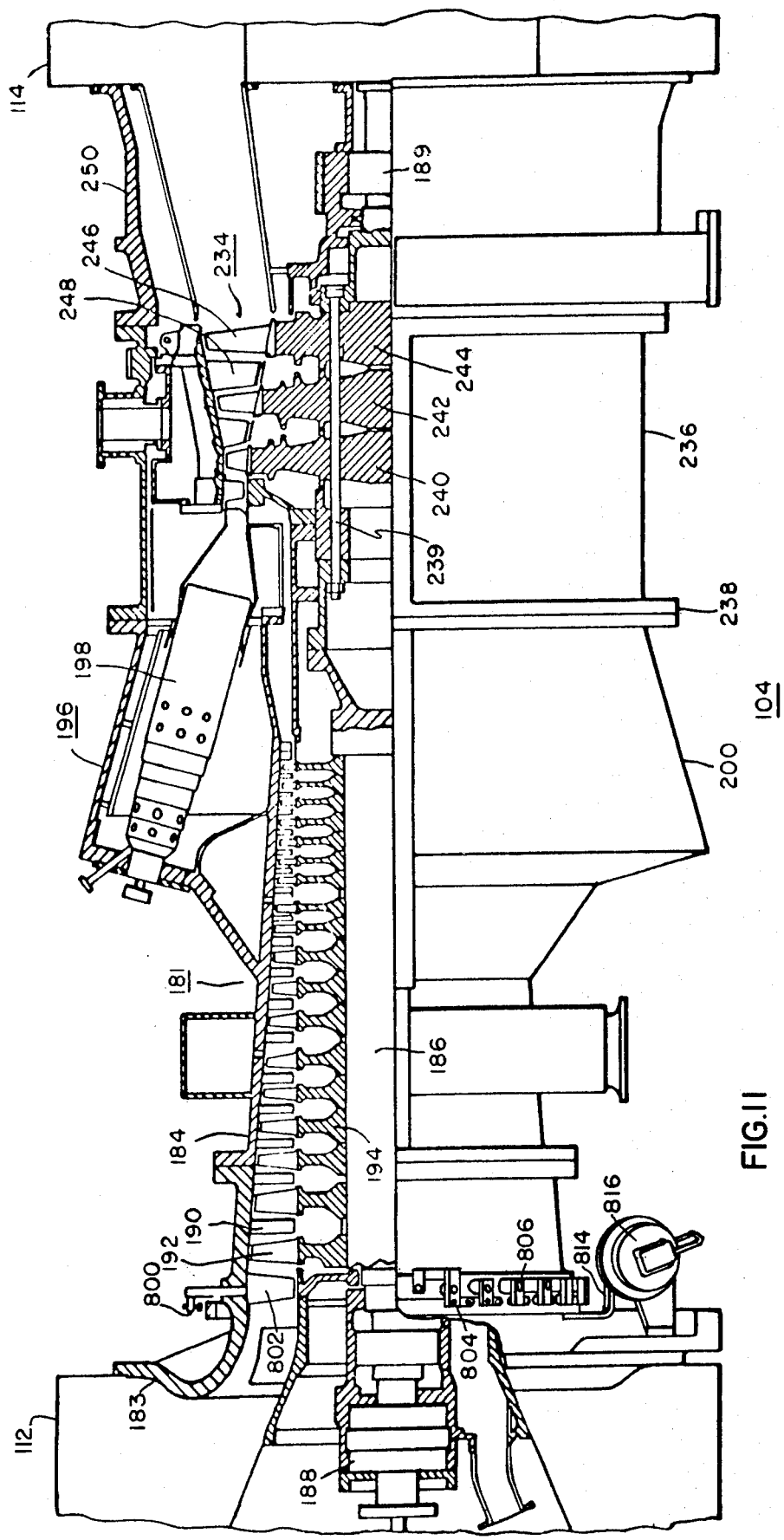
FIG. 11 shows a front elevational view of an industrial gas turbine employed in the power plant of FIG. 9 and is shown with some portions thereof broken away.

The gas turbine 104 in this case is the single shaft simple cycle type having a standard ambient pressure ratio of 9.0 to 1 and rated speed of 4,894 rpm and it is illustrated in greater detail in FIG. 11. Filtered inlet air enters a multistate axial flow compressor 181 through a flanged inlet manifold 183 from the inlet ductwork 112. An inlet guide vane assembly 800 includes rotatably mounted variable inlet guide vanes 802 circumferentially spaced about the compressor inlet. The vanes 802 are mechanically coupled to a pneumatically operated positioning ring 804 by a plurality of link assemblies 806. The angle 808 at which the guide vanes are disposed in relation to the air stream is uniform, having been positioned in response to the synchronous uniform movement of the link assemblies 806 occasioned by angular displacement of the positioning ring 804. Rotations of the positioning ring 804 are in response to a computer generated electrical signal which is transformed into a pneumatic signal by an inlet guide vane transducer (now shown). The pneumatic signal subsequently operates an inlet guide vane actuator piston contained in the air cylinder actuator 816, which delivers a force to an actuator bracket 814 sufficient to displace the positioning ring by the desired amount.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples.

Pressurized compressor outlet air is directed into a combustion system 196 comprising a total of eight combustor baskets 198 conically mounted within a section 200 of the casing 184 about the longitudinal axis of the gas turbine 104. Combustor shell pressure is detected by a suitable sensor coupled to the compressor-combustor flow paths located in the pressure switch and gauge cabinet 152.

Figure 13:
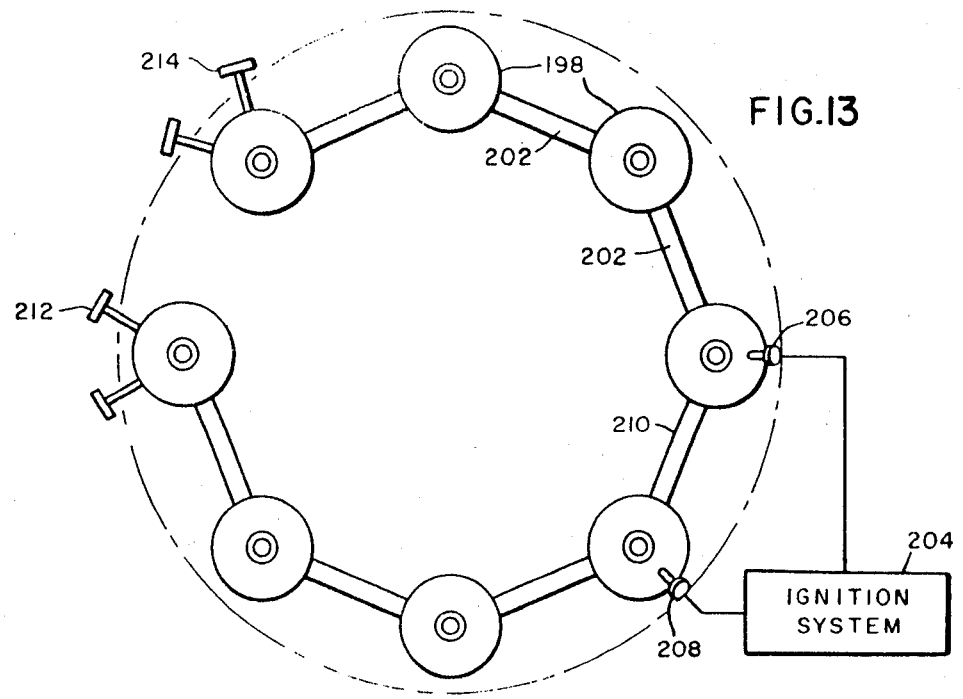
FIGS. 13–15 depict a fuel nozzle and parts thereof as employed in the gas turbine shown in FIG. 11.

As schematically illustrated in FIG. 13, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. The flame detectors 212 can for example be Edison flame detectors Model 424–10433.

In FIG. 17 there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

Figures 14, 15:
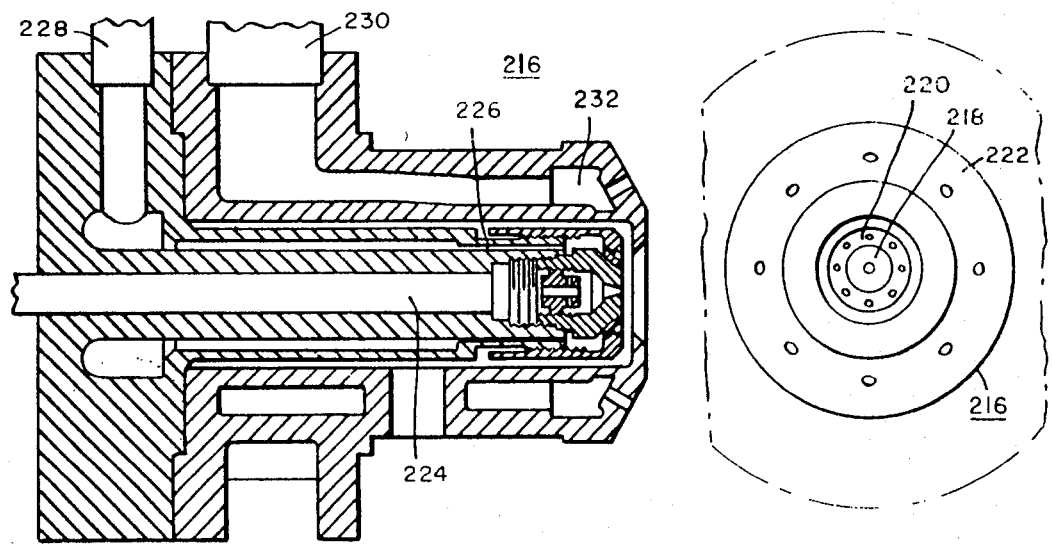
Figure 16A:
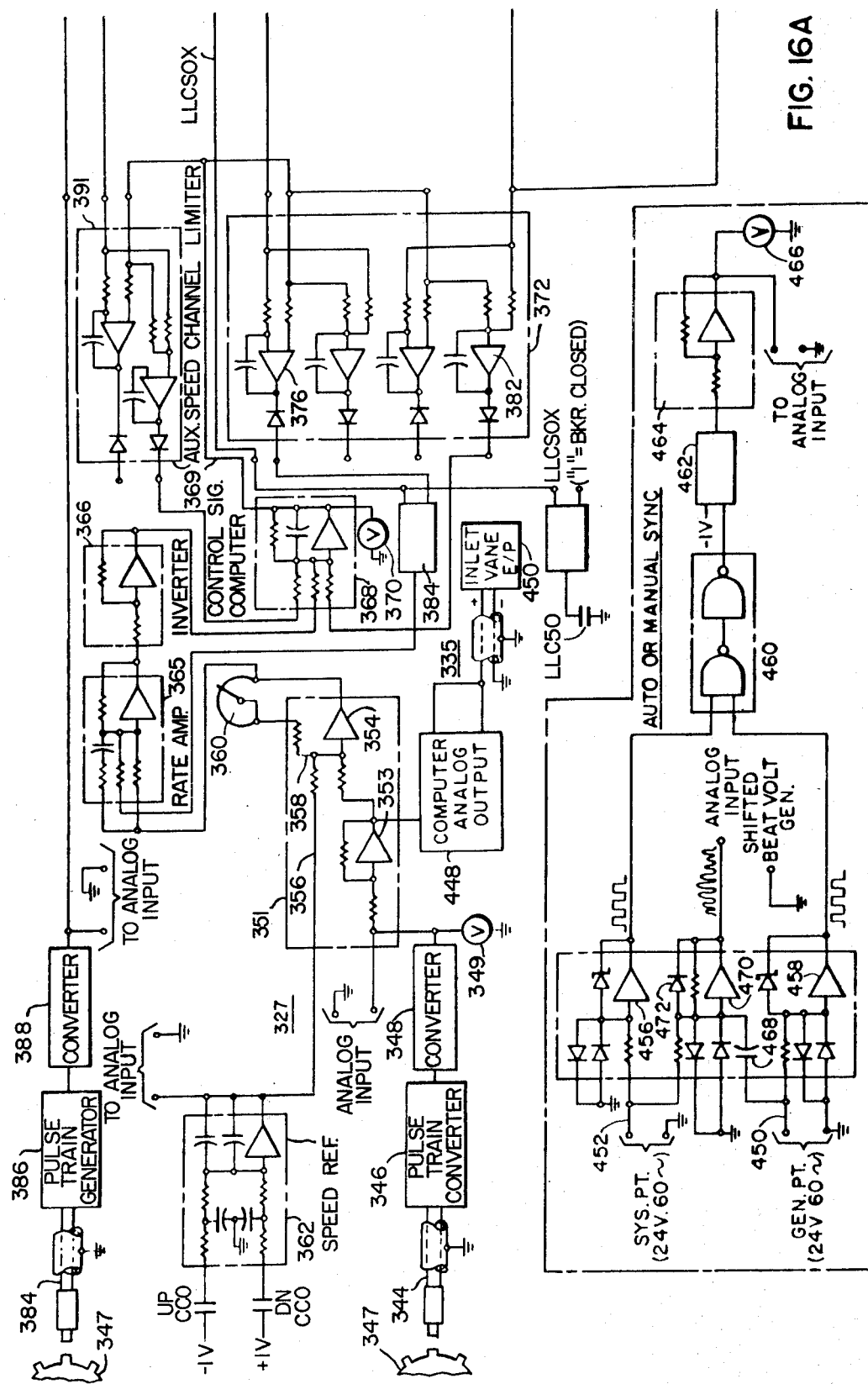
FIGS. 16A–B illustrate schematically the analog circuitry associated with the computer and the primary control system, which circuitry provides control over the gas turbine fuel supply system operation and certain other plant functions.
Figure 16B:
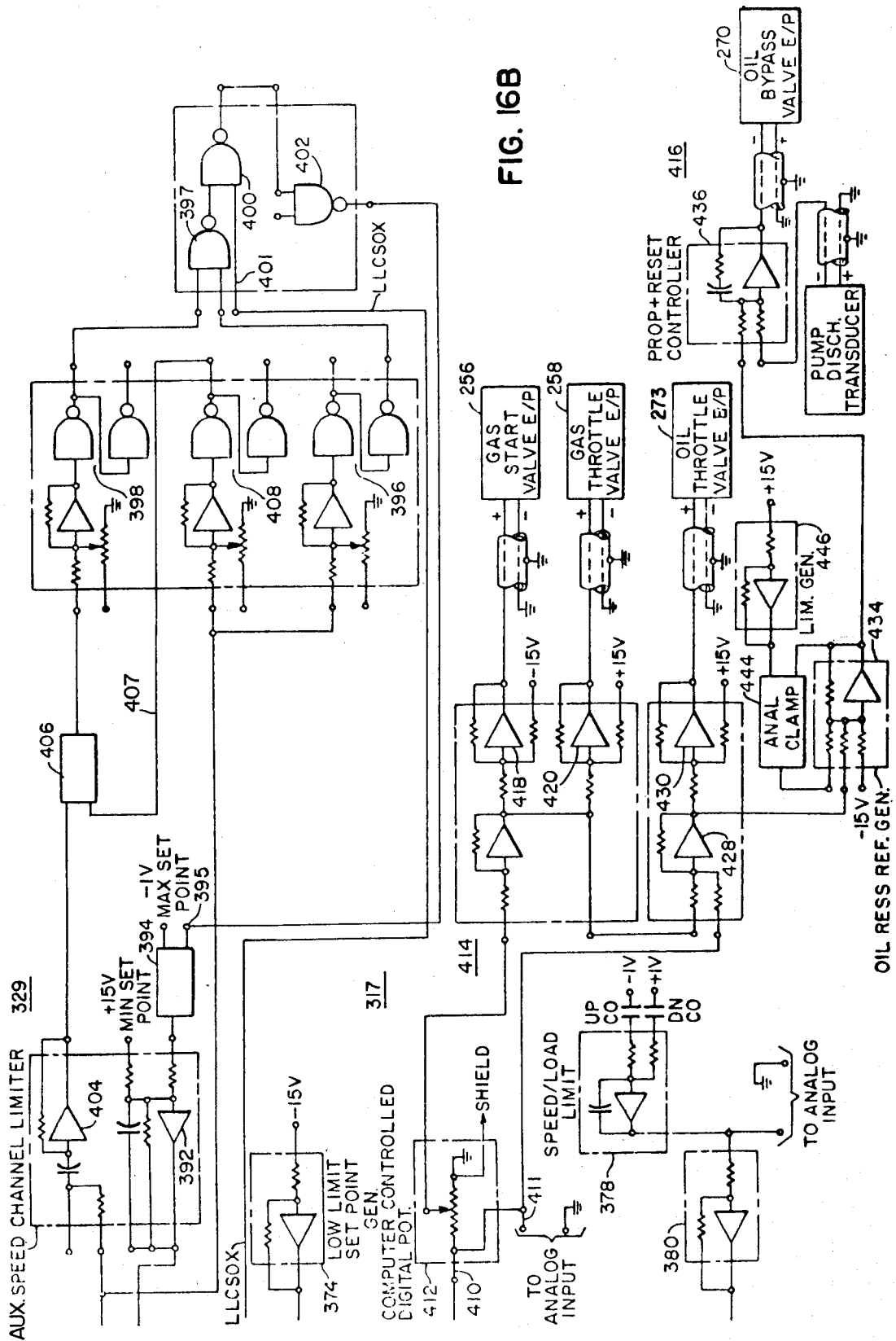

As indicated in the broken away side view in FIG. 15, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 100 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234. The combustor casing section 200 is coupled to a turbine casing 236 through a vertical casing joint 238. No high pressure air or oil seal is required between the compressor 181 and the turbine 234.

The turbine 234 is provided with three reaction stages through which the multiple stream combustion system outlet gas flow is directed in an annular flow pattern to transform the kinetic energy of the heated, pressurized gas into turbine rotation, i.e., to drive the compressor 181 and the generator 102. The turbine rotor is formed by a stub shaft 239 and three disc blade assemblies 240, 242 and 244 mounted on the stub shaft by through bolts. Thermocouples are supported within the disc cavities to provide cavity temperature signals for the control system.

High temperature alloy rotor blades 246 are mounted on this discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers can be conventional velocity transducers or pickups which transmit basic vibration signals to a vibration monitor for input to the control system. A pair of conventional speed detectors are associated with a notched magnetic wheel supported at appropriate turbine-generator shaft locations. Signals generated by the speed detectors are employed in the control system in determining power plant operation.

Thermocouples are associated with the gas turbine bearing oil drains. Further, thermocouples for the blade path are supported about the inner periphery of the exhaust manifold 250 to provide a fast response indication of blade temperature for control system usage particularly during plant startup periods. Exhaust temperature detectors are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

A fuel system 251 is provided for delivering gaseous fuel to the gas nozzles 222 under controlled fuel valve operation as schematically illustrated in FIG. 17. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37/2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 260 are both closed. The isolation valve fuel control action is initiated by an electric control signal applied through the pressure switch and gauge cabinet 152. A pressure switch 267 indicates fuel pressure at the inlet to the nozzles 222.

As schematically shown in FIG. 18, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzle 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valves provides on/off control of liquid fuel to a liquid manifold 283.

Eight positive displacement pumps 284 are respectively disposed in the individual fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shutdown to drain any liquid fuel remaining in the manifold 283.

Details concerning plant performance characteristics are contained in the aforementioned, related U.S. Pat. application Ser. No. 82,470, Section A4, pages 32 to 36.

The preferred embodiment of the integrated turbine generator control system 300 (FIG. 12) employs analog digital computer circuitry to provide sequenced start-stop plant operation, monitoring and alarm functions for plant protection and accurately, reliably and efficiently performing speed/load control during plant startup, running operation and shutdown. The plant control system 300 is characterized with centralized system packaging having a single operator's panel and embracing elements disposed in the control cabinet 118, the pressure switch and gauge cabinet 152 and other elements included in the electric power plant 100 of FIG. 9. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

Figure 8:
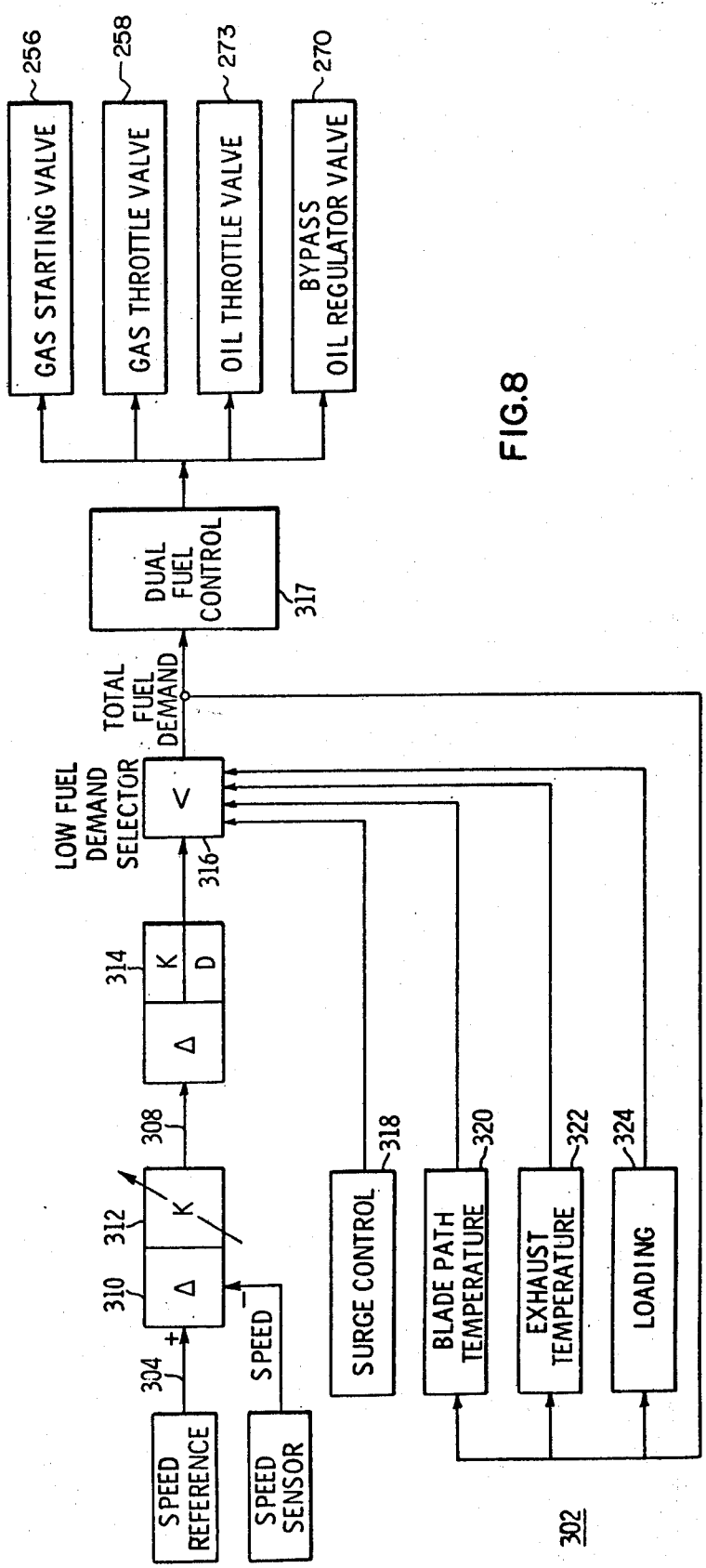
FIG. 8 is a functional block diagram of a portion of the primary control system showing certain control loops therein.

In FIG. 8, a control loop arrangement 302 represented by SAMA standard function symbols characterizes the preferred general control looping embodied in the preferred control system 300 and applicable in a wide variety of other applications of the invention. Reference is made to the aforementioned, copending U.S. Pat. application Ser. No. 82,470, Section B2, pages 39 to 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made between hardware and software elements since many aspects of the control philosophy can be implemented in hard or soft form. However, it is noteworthy that various advantages are gained by hybrid software-hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316, the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

In order to start the plant 100, the control system 300, operating in control Mode 0, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperatures are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

The control arrangement 302 is implemented such that different process variables are given greater weight in determining the control function to be performed as control progresses sequentially through the modes of operation.

Figure 12:
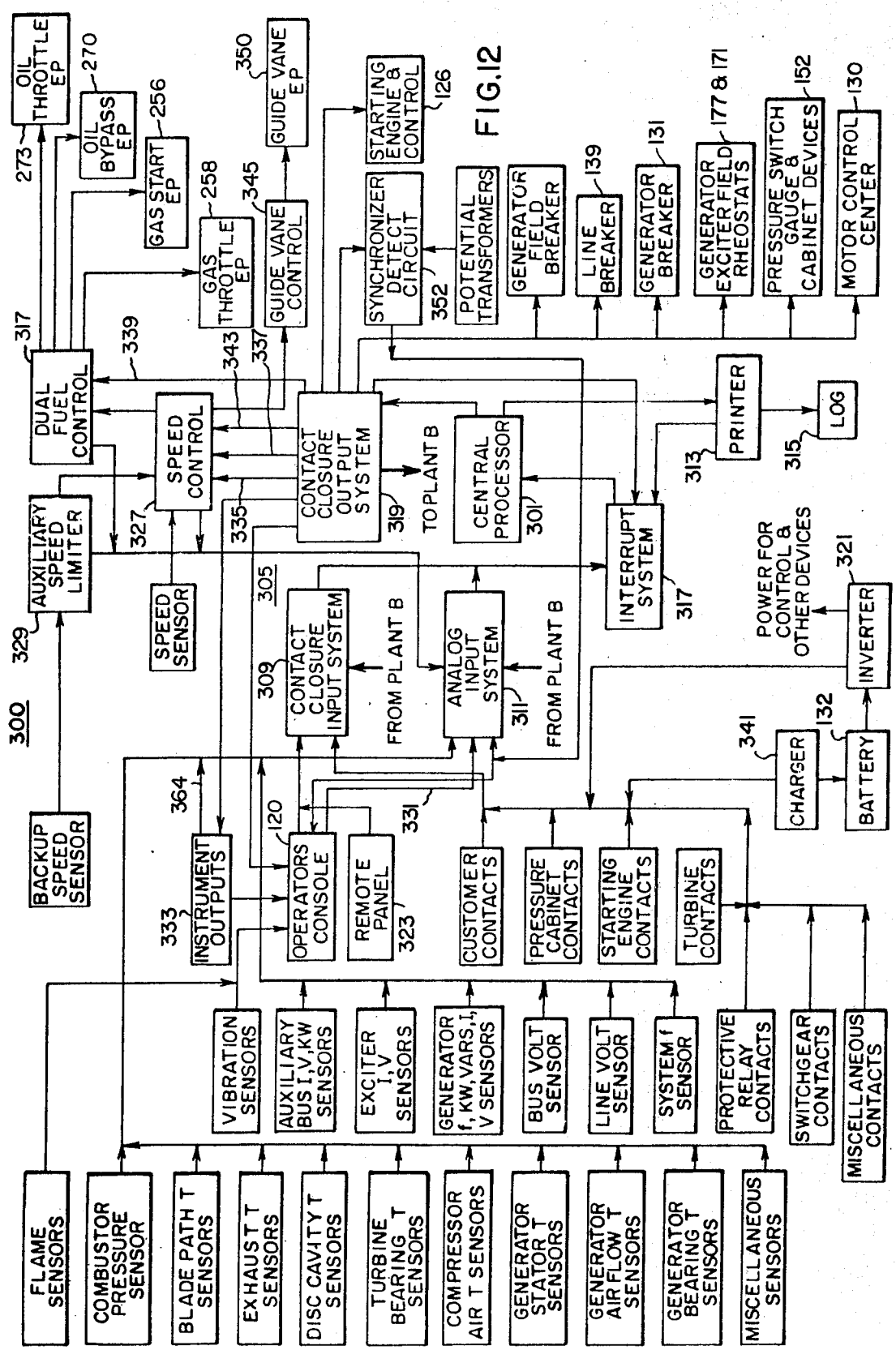
FIG. 12 illustrates a block diagram of the primary digital computer implemented control system used to operate the gas turbine power plant shown in FIG. 9.

The control system 300 is shown in block diagram detail in FIG. 12. It includes a general purpose digital computer system comprising a central processor 304 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 304 includes a constant closure input system 306 and a conventional analog input system 308. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 306 and the analog input system 308. The contact closure input (CCI) system is coupled to the operator console panel 120 and remote operator's panel 322. Characteristic CCI's are those related to the starting engine contacts. Also, a facility exists for customer selection of devices to be coupled to the CCI system.

Characteristic inputs to the analog input system 308 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 308 through an analog speed control 324 and an auxiliary speed limiter 326, respectively.

The computer supplies essential outputs of various description for display at the operator's console 120 or the like. They are also applied as analog inputs as indicated by reference character 330. The contact closure output system 316 transfers digital speed reference, speed/load limit and fuel transfer outputs to its external circuitry as indicated respectively by the reference characters 332, 334 and 336.

The coupling of the contact closure output system 316 with the analog speed control 324 is within the framework of the preferred software/hardware hybrid control system. Another contact closure ouput 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIG. 12. A contact closure output coupling to the dual fuel control 337 provides for transfer between fuels or relative fuel settings for two fuel or single fuel operation as indicated by the reference character 336.

The contact closure output system 316 is also connected to the operator's panel 120 and to sequence the starting engine 126. A synchronizer detection circuit 342 has bus line and generator potential transformers coupled to its input and the contact closure output system 316 signal provides a visual panel indication for manual synchronization. The detection circuit 342 also supplied signals to the analog input system 308 for automatic synchronization when such synchronization is employed as considered more fully in the aforementioned Reuther and Reed copending patent applications.

Other devices operated by the contact closure outputs include the generator field breaker and the generator line breakers 132 and 137. The motor operator generator exciter field rheostat 171 and 177 and various devices in the motor control center 130 and the pressure switch and gauge cabinet 152 also function in response to contact closure outputs. The printer or teletype 310 is operated directly as a special input/output channel to the main frame 304.

THE LOCAL MAINTENANCE CONTROLLER - GENERAL

Figure 1:
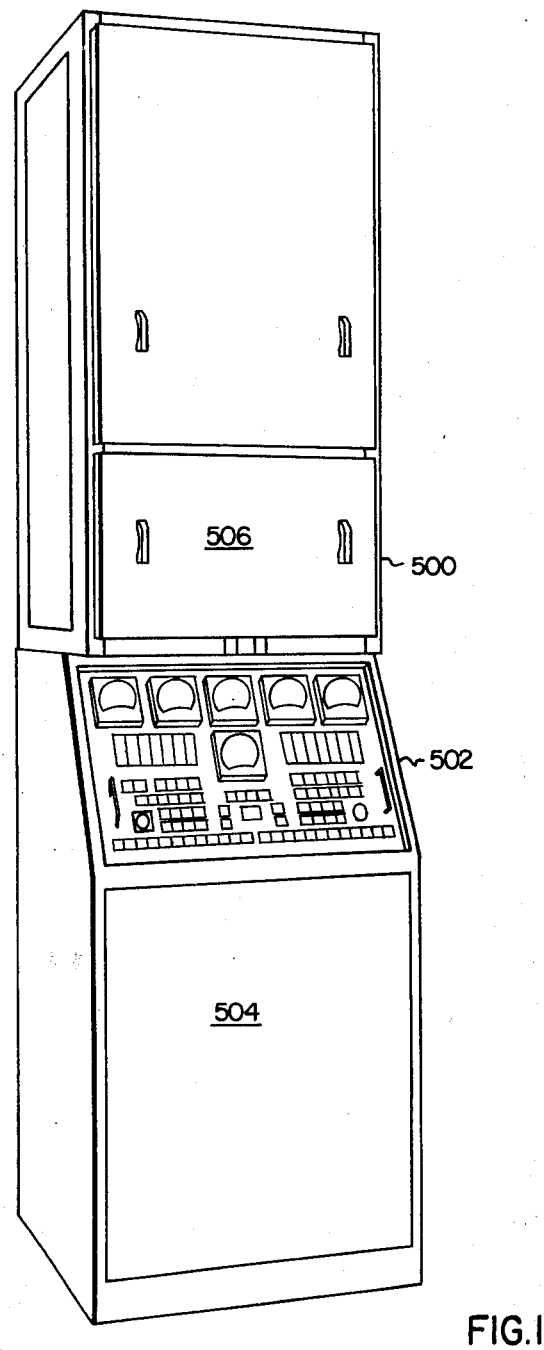
FIG. 1 shows an isometric view of an operator's console incorporating both the primary control and local maintenance controller panels.

The local maintenance controller 501 (hereinafter the LMC), as previously noted, provides a convenient, reliable and efficient means of continuing plant operation during maintenance or failure of the primary control system. As shown in FIG. 1, the LMC operator's panel 500 is conveniently mounted above the primary control operator's panel 502 in a console 504. If the computer goes down or during LMC controlled maintenance periods, the operator only has to remove panel cover 506 to expose the LMC operator's panel 500. The LMC operator's panel is shown in greater detail in FIG. 3. The details of the operator's panel 500 are set forth in the appendix hereto and should be referred to for panel item identification and specific information.

Because of the convenient mounting arrangement, all operator controls, meters and indicators are advantageously arrayed within the operator's view and reach. The LMC panel 500 includes separate speed and fuel demand indicators, but meters indicating megawatts, synchronous phase angle and kilovolts are not duplicated on the LMC. These meters, which are on the primary control operator's panel 502, are direct wired to the generator analog transducers and are therefore not affected by the disconnection of the computer from the overall system.

Figure 2:
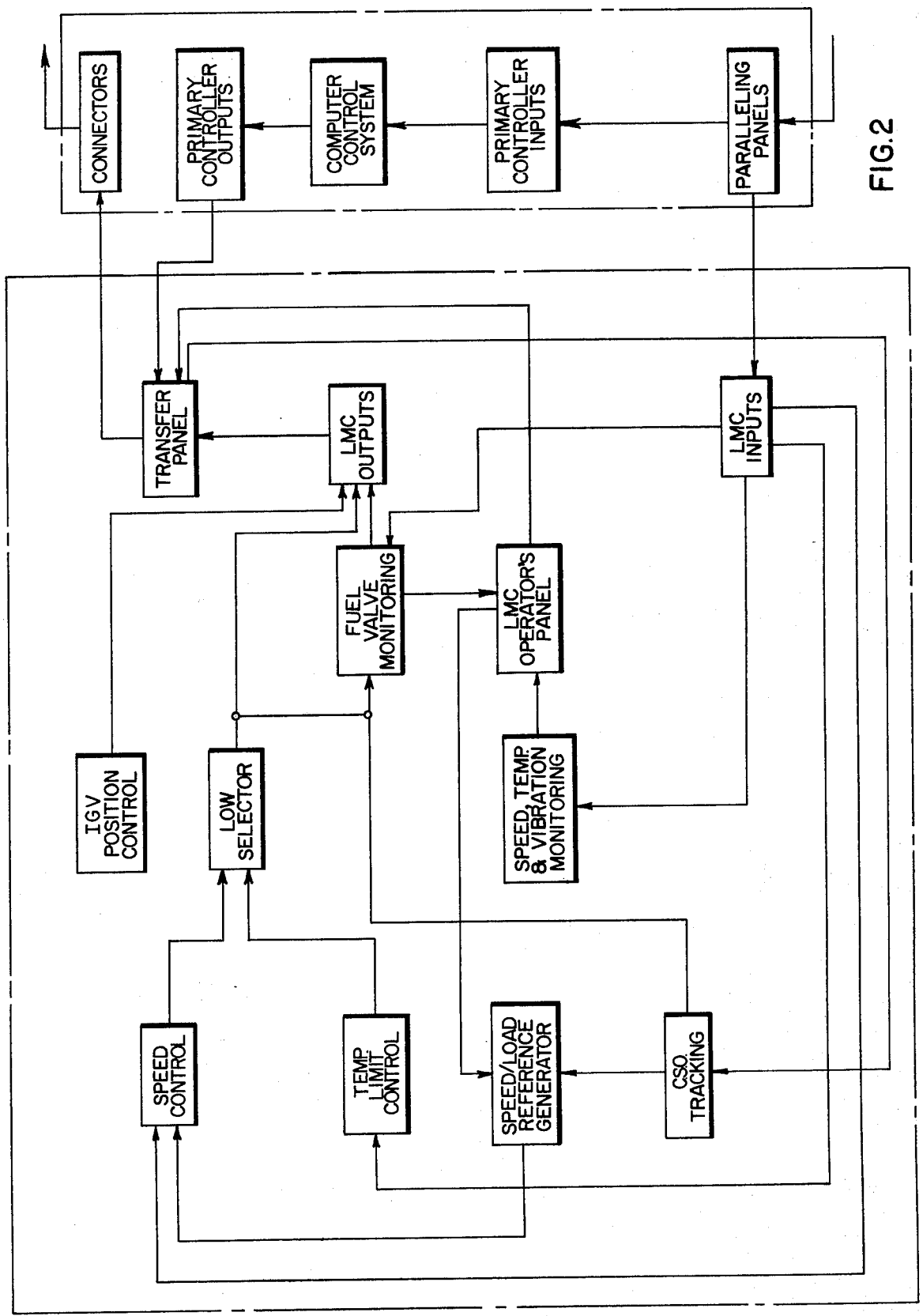
FIG. 2 is a block diagram illustrating the interface and cabling connections between the primary control system and the local maintenance controller, as well as the constituent elements of the latter.

FIG. 2 illustrates the cabling interface between the primary control system and the LMC. As shown therein, all analog and contact outputs that are switched between the LMC 501 and the computer are transferred in the LMC 501 through transfer relays (not shown) mounted in transfer panel 508. All inputs to the overall control system from the plant are paralleled at the paralleling panels 510 at the point where they enter from the field. This reduces the amount of cabling required, as well as the transfer hardware, and keeps the computer cables within the computer cabinet. In addition, this procedure provides for continuous computer monitoring of all variables prior to a required transfer to LMC operation. The signals used by the LMC are shown in Table I of the appendix hereto. These consist of CCO's, CCI's and analog signals. Using the cabling scheme illustrated in FIG. 2, signals from the plant are switched between the LMC and the primary control system by means of the transfer relays. The paralleled inputs to each control system are isolated from each other by diodes.

Turbine exhaust blade thermocouple inputs to the LMC 501 are connected in parallel with those inputs to the computer. A transfer switch provides for receipt of the temperature signal, developed by these thermocouples, by the operative control system. When the plant is being operated by the LMC, the computer merely follows the thermocouple readings. When the plant is under primary control, the transfer switch action disconnects the inputs to the LMC.

Before a transfer of control to the LMC can be initiated, the Transfer Enable pushbutton on LMC panel 500 must be depressed. If both the Lube Oil and Turning Gear toggle switches are on and the LMC system is properly tracking, the Transfer Enable pushbutton lights to indicate that the LMC is ready to accept either automatic or manual transfer. The turbine must be operating on a single fuel, either oil or gas, with the generator breaker closed for successful on-line transfer to occur. These are systems where a remote primary control panel is utilized. On such systems, an indicator light is added to the panel to show that transfer to the LMC has been made. Another light added to the remote panel provides information concerning the LMC to the operator and confirms that the LMC is tracking and enabled.

The logic required for automatic transfer of control to the LMC in the event of computer failure is contained in the relay sequencer, see FIGS. 6A-P and 7A-B. This unit comprises 43 relays and associated circuitry and is mounted on two printed circuit boards within the LMC console. The relay sequencer also embodies all of the logic required to accomplish a startup with the LMC as well as alarm and trip circuits for turbine protection. When the computer fails, assuming the LMC has been enabled as described above, a relay in the primary control system indicates to the LMC that transfer of control is necessary. During the following 1 to 2 seconds, control signals to all valves are held constant while the sequence and alarm logic is reset. The LMC then automatically takes over turbine control. Manual transfer from the primary control system, with the computer continuing to operate or disabled for maintenance purposes, is accomplished in a similar manner, starting from the Transfer Enable pushbutton actuation. In this latter case, however, the transfer is initiated by depressing the LMC On pushbutton, rather than by computer failure.

Transfer from primary to LMC control is initiated in the LMC sequencer from either detection of primary control system failure or manual selection from the operator's panel. While the primary control system is functioning, the LMC acts as a tracking system to insure minimum fuel valve position change when a transfer occurs. The LMC also continuously monitors and compares the fuel demand signal it develops and the fuel demand signal developed by the primary control system. Should a signal disparity exceed prescribed limits, the LMC will initiate a transfer prevent signal. The LMC also monitors and compares against maximum limits the blade path temperature, compressor vibration and turbine exhaust end vibration and will initiate turbine trip and shutdown from these sources.

If all permissives are satisfactory, the LMC will assume turbine speed/load control upon primary control system to LMC transfer. The transfer will be accomplished at identical fuel valve position values existing under primary control immediately prior to transfer. Hence, transfer is accomplished at existing megawatt output, blade path temperature and fuel oil pump discharge pressure.

Following transfer to the LMC, blade path temperature is limited to a peak load reference curve developed within the speed/load reference generator 512 (see FIGS. 2 and 4A-B) and oil pump discharge pressure is controlled to its setpoint as developed within the LMC. Thus, should the transfer occur above peak load, i.e. — when the primary control has been operating the plant on system reserve, a load reduction to peak load limit will follow the transfer. Also, any disparity between primary control and LMC pressure setpoints will produce a slight change in firing rate, and consequently megawatt output, following a transfer. Thereafter, the LMC will maintain a constant, fixed megawatt output which can only be varied by the panel mounted, manually actuated, increase/decrease load pushbuttons.

Should the primary control system be taken off-line during startup, before the breaker is closed, or while the turbine is operating on a mixture of fuels, an attempt to transfer control will cause the turbine to shut down. Any attempt to change fuels during startup with the LMC will also cause shutdown, while such an attempt during LMC operation will be ignored.

In any event, the LMC is capable of automatically controlling a turbine start from ignition to synchronous speed (95%). The LMC start must be attended and manually initiated from the LMC operator's panel. However, the LMC will prevent a start if the fuel demand signal exceeds a minimum value near zero. Following ignition, the LMC automatically ramps fuel demand signal per a prescribed fuel rate timing program, subject to blade path temperature limit, terminating at approximately 95% turbine speed. Thereafter, synchronization and megawatt loading is accomplished by remote manual pushbutton operation from the LMC operator's panel.

The status input information required by the LMC analog system from the sequencer and panel contact closures are set forth in the appendix hereto as are the required analog input signals. Reference should also be had to FIGS. 2, 4A-B and 5A-L. Also set forth in the appendix is a listing of the logic contact closure outputs and the analog output signals developed by the LMC analog system illustrated in FIGS. 2 and 4A-B.

Figure 4A:
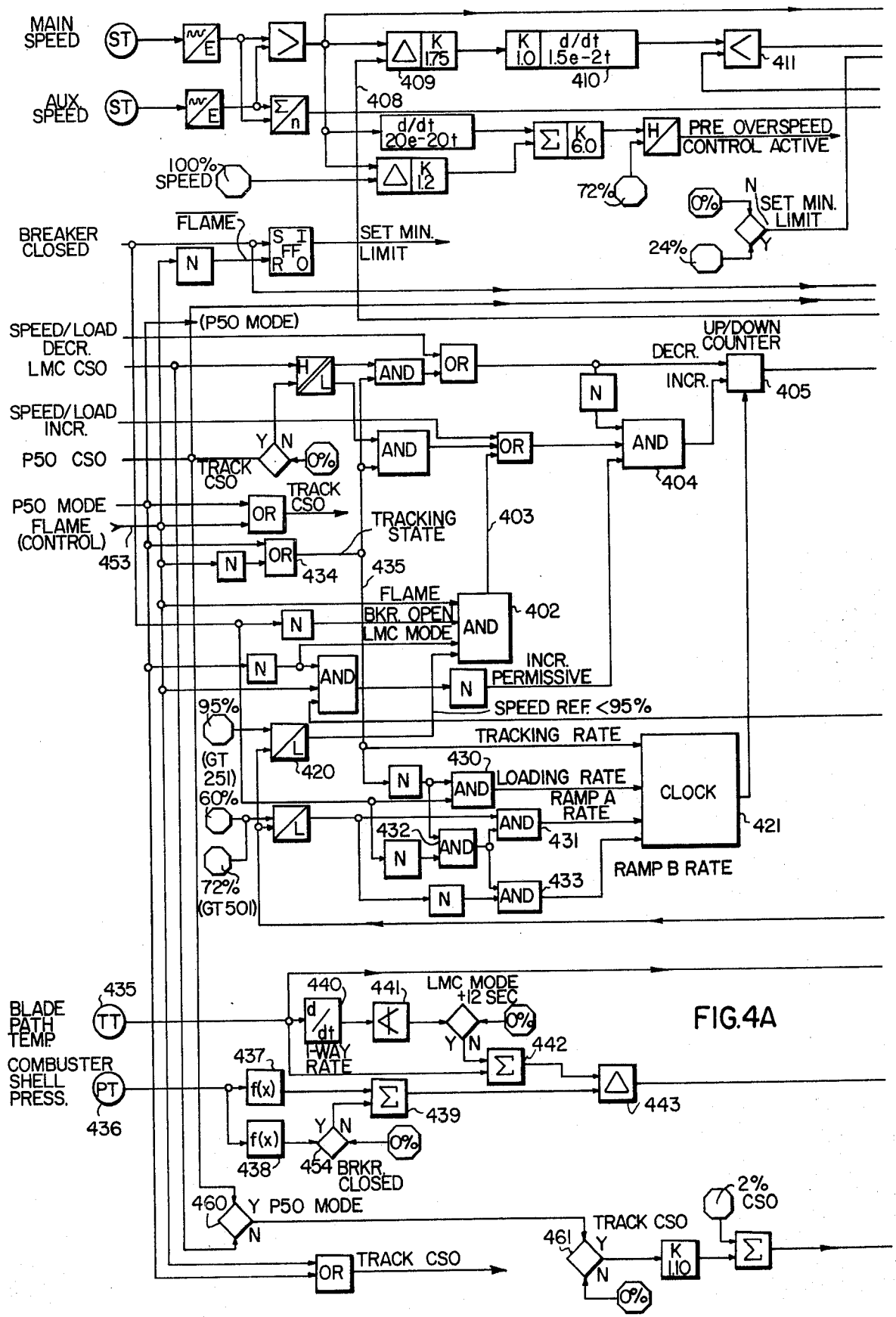
FIGS. 4A–C illustrate a functional diagram of the elements of the local maintenance controller shown in FIG. 2, showing the analog control portion thereof in greater detail.
Figure 4B:
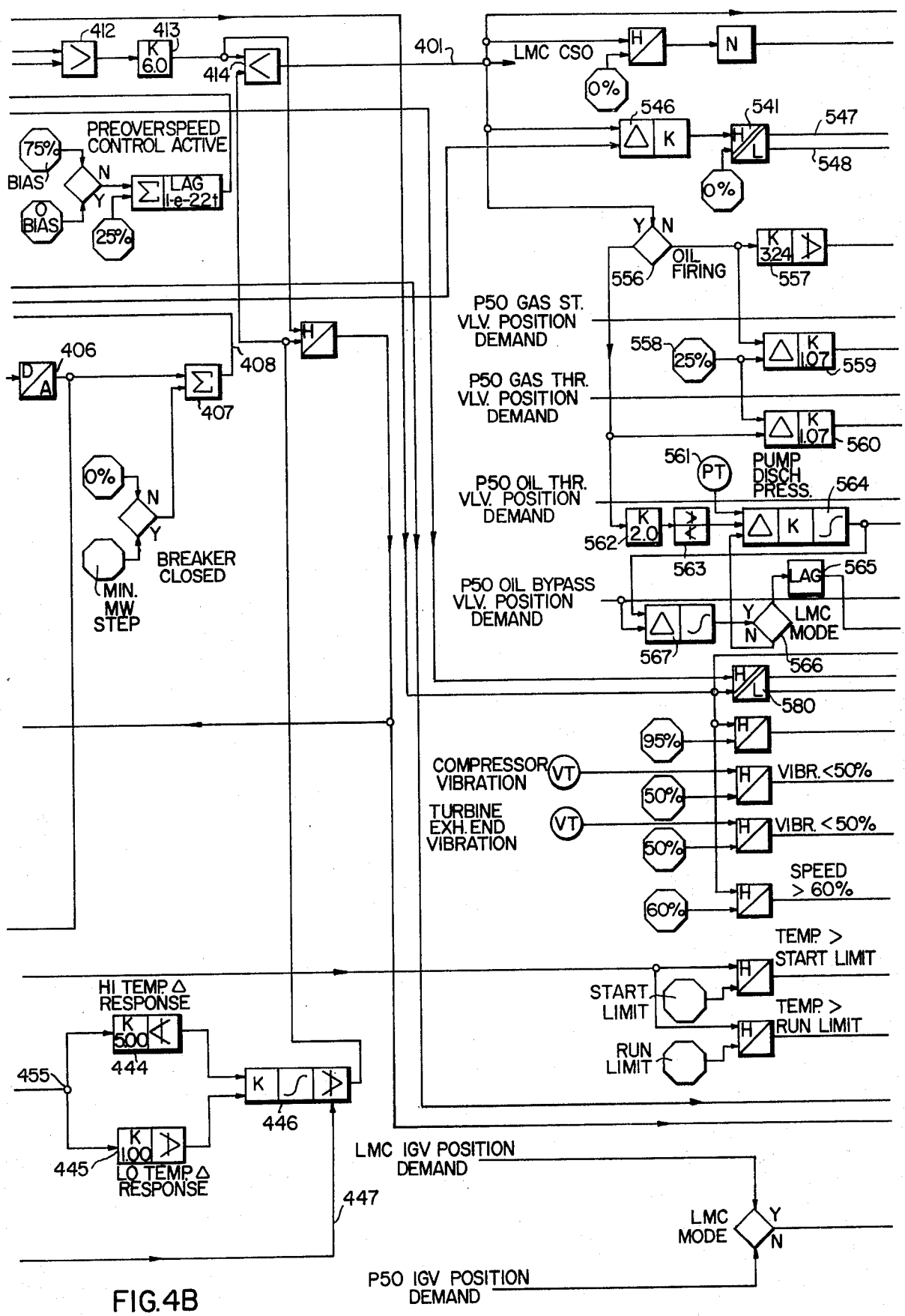

The LMC analog control is shown in block diagram form in FIG. 2 and in functional form in FIGS. 4A-B. It operates in the following manner. The speed control 516, in conjunction with the speed/load reference generator 512, will compare measured speed with speed setpoints and produce a control signal proportional to the error between the compared signals. As in the primary control system, the LMC is subject to minimum and maximum limits. The minimum limit is 25% fuel flow and is set by the presence of flame and breaker closure and reset to 0% upon loss of flame by means of flip-flop control logic. The maximum limit varies from 25% to 100% fuel flow, dependent on control action of a preoverspeed cutback control loop. Under normal operating conditions, this loop provides a 100% limit. Should the turbine overspeed and approach the 110% mechanical overspeed trip limit, the maximum fuel limit decays from 100% to 25%. The purpose of this is to avoid a total turbine shutdown and to restore stable speed conditions near synchronous speed. The limit is reduced by a proportional plus derivative control action, which thusly combines both anticipatory and direct control action features.

The analog speed signal will be developed by using two sets of A and B speed cars to convert the pulses developed by the speed pick ups to linear analog speed signals. The higher of these two signals will be selected and used by the speed controller. This system will utilize the same pulse signals used by the primary control system. The systems will be parallel and both operative at the same time. The speed pulse signals will not be transferred.

A stable speed setpoint will be developed by use of an up/down counter and D to A converter, see FIGS. 4A-B. Increase or decrease commands will be developed in analog logic. The up/down counter will operate at one of four rates. Two will be used for startup, that is, to accelerate the turbine from ignition to 95% speed, one for load control and one for tracking. The two startup rates will be selected as follows:

Rate A - Selected when the speed reference is less than 60% for GT Model 251 (72% for GT Model 501), the breaker is open, the primary control is not in service, and the system not tracking.

Rate B - Selected when the speed reference is greater than 60%, the breaker is open, the primary control is not in service and the system not tracking. The loading rate will be selected when the breaker is closed and the primary control system not in service. The tracking rate will be selected when the primary control system is in service or flame is not present.

When the gas turbine is operating on the LMC system, the speed/load setpoint will increase at the selected rate when the increase pushbutton is depressed and a decrease request and temperature limit are not present, or when flame is on and the speed is less than 95% and the breaker is open and a decrease request and temperature limit are not present, or when flame is not present and the LMC control signal output is less than zero.

When on primary control, the speed/load setpoint will increase at the tracking rate when the LMC control signal output is less than the primary control signal output by an amount equal to the deadband of the comparator.

The speed/load setpoint will decrease at the selected rate when operating on the LMC system, if the decrease pushbutton is depressed or when flame is not present and the LMC control signal output is greater than zero. When on primary control, the speed/load setpoint will decrease at the tracking rate if the LMC control signal output is greater than the control signal output of the primary control system. When operating on the LMC system, the speed/load setpoint cannot be increased if LMC control signal output exceeds the blade path temperature limit.

The LMC analog blade path temperature control will function similarly to the primary temperature control in that a function of combustor shell pressure, P2C, will be the reference or maximum temperature setpoint for average blade path temperature. Only two curves will be used, start and peak. When operating on the LMC system, the temperature control will operate as a maximum temperature limit. If, after breaker closure, the speed reference is increased to 104%, the blade path temperature will control the gas turbine at peak load. During startup, or when the breaker is open, the temperature control will stop the speed setpoint ramp and decrease control signal output if the average blade path temperature equals or is greater than the reference.

The temperature reference will be developed by means of two function generators, each developing a curve as a function of combustor shell pressure. One curve will become the maximum temperature setpoint with the breaker open. The other value will be added to the first when the breaker is closed and the sum of the two will equal the running maximum temperature limit setpoint. This system will use the pressure signal from the existing primary control combustor shell pressure transmitter. It will be paralleled and not switched.

The average blade path temperature will be determined by swamping eight thermocouples and amplifying the average. Derivative action will be applied to this signal when the system is in operation, but will be disconnected when the primary control is in service and for a short time delay after control has been transferred to the LMC. This prevents an upset to the system at the time of transfer. This system will use the same thermocouples as the primary control, but they will be disconnected when the primary control is in service, as previously noted.

The temperature reference will be compared with the measured average temperature and an error signal generated. This error signal will have two different gains applied. One for increasing and one for decreasing temperature. The resultant signals will be limited so a narrow deadband can be incorporated in the error signal. The error signals are then applied to a proportional plus integral controller. The output of this controller will be high limited to a value corresponding to approximately 110% of the LMC control signal output. Thus, maximum full load bias will be approximately 0.5 volts, but will decrease as the control signal output decreases. Using the two separately adjustable gains in the temperature controller will permit the fuel to be decreased much faster than it will be increased and will provide increased protection and greater stability to this portion of the system.

The LMC control signal output is derived from the low selection of speed controller and temperature controller outputs. This signal is applied to the LMC fuel valve controls in the identical manner as the primary control signal output is applied to the primary control valve position analog controls. The valve controls are duplicated in both control systems, thus valve position output signals are continuously available from either.

Transfer from the primary control system to the LMC will be accomplished by energizing relays containing four contacts, one for each fuel valve demand signal. The transfer command signal will be developed in the sequencer portion of the LMC system and will not be described here. These four signals, the eight thermocouple signals and other signals as required by the sequencer will be transferred at the same time.

The LMC control signal output and the four LMC valve position demand signals are monitored and compared individually with the corresponding signals from the primary control system. Any disparity in these signal comparisons exceeding preset value will result in a transfer prevent, locking turbine control to the existing mode, either primary or LMC, until the disparity is cleared.

THE LOCAL MAINTENANCE CONTROLLER - RAMPING DELAY

Figure 4C:
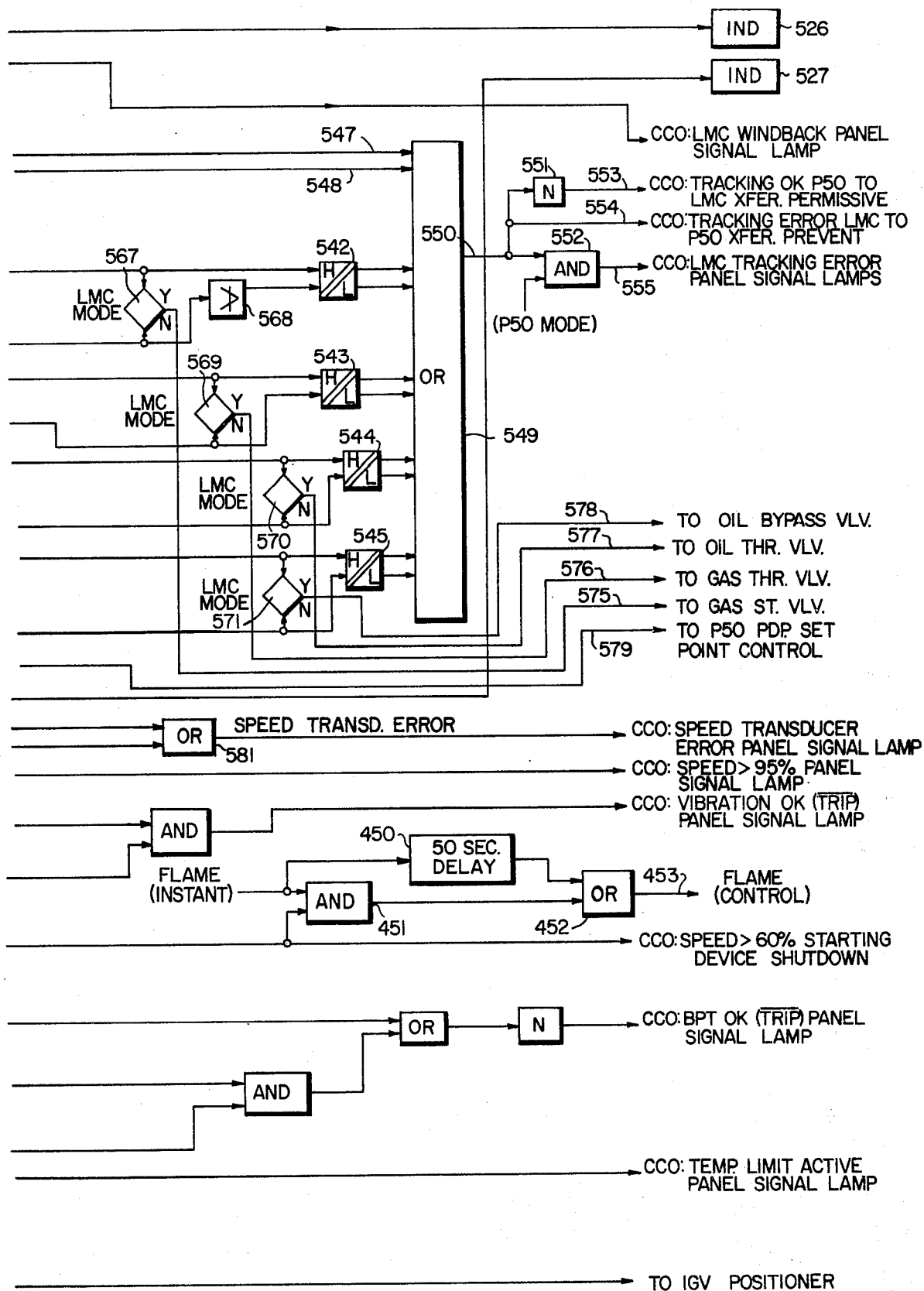
Figure 5A:
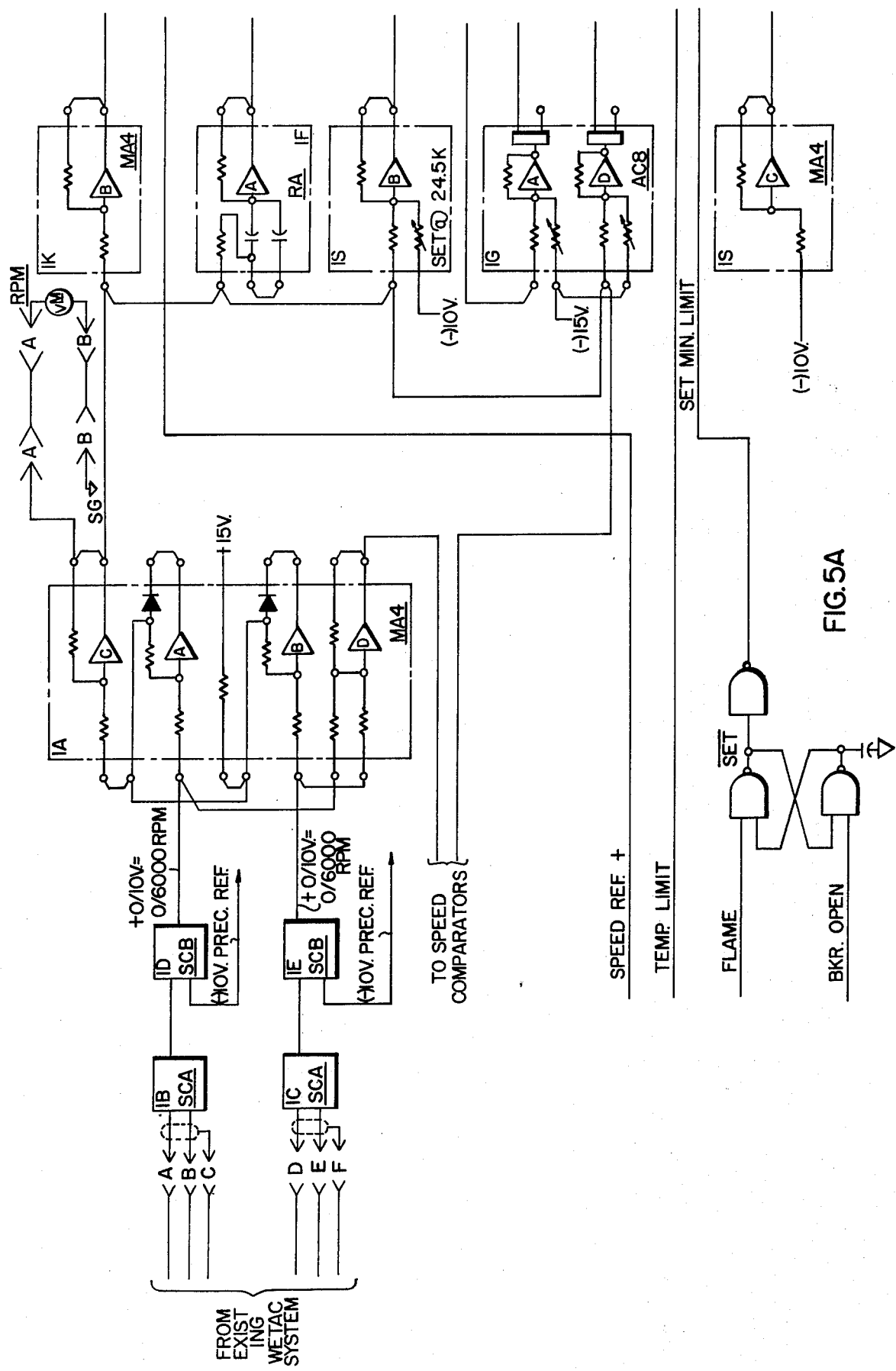
Figure 5B:
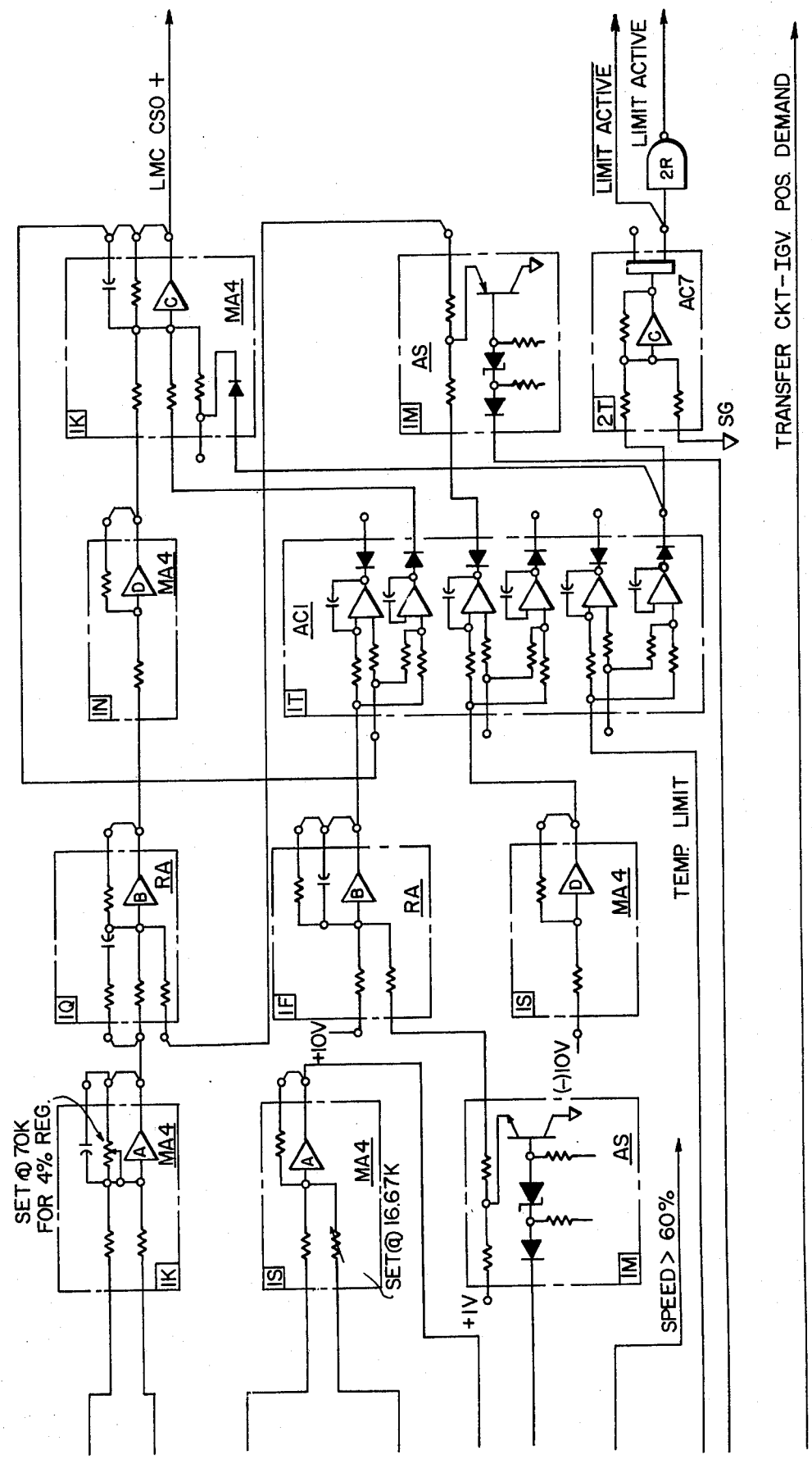
Figure 5C:
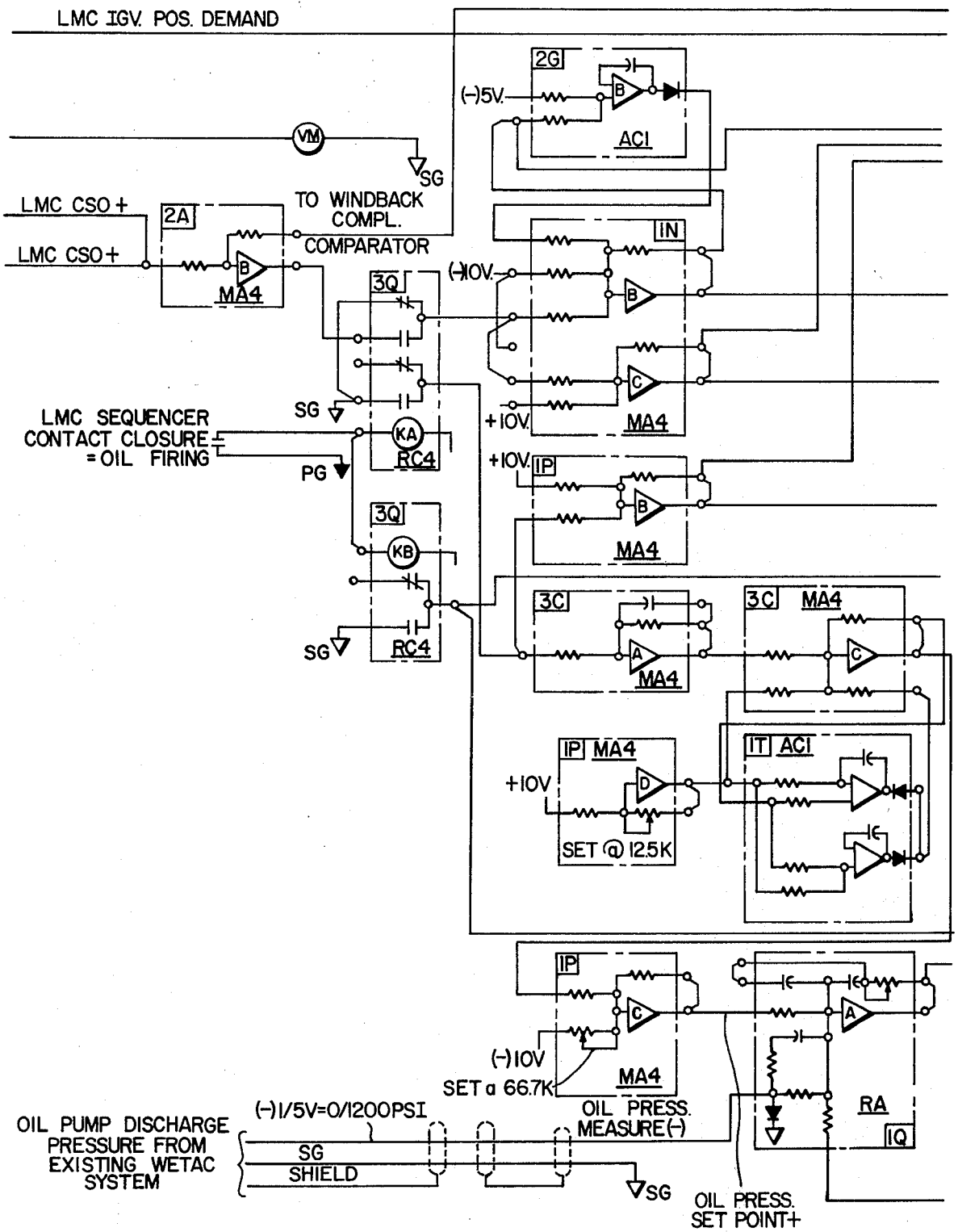
Figure 5D:
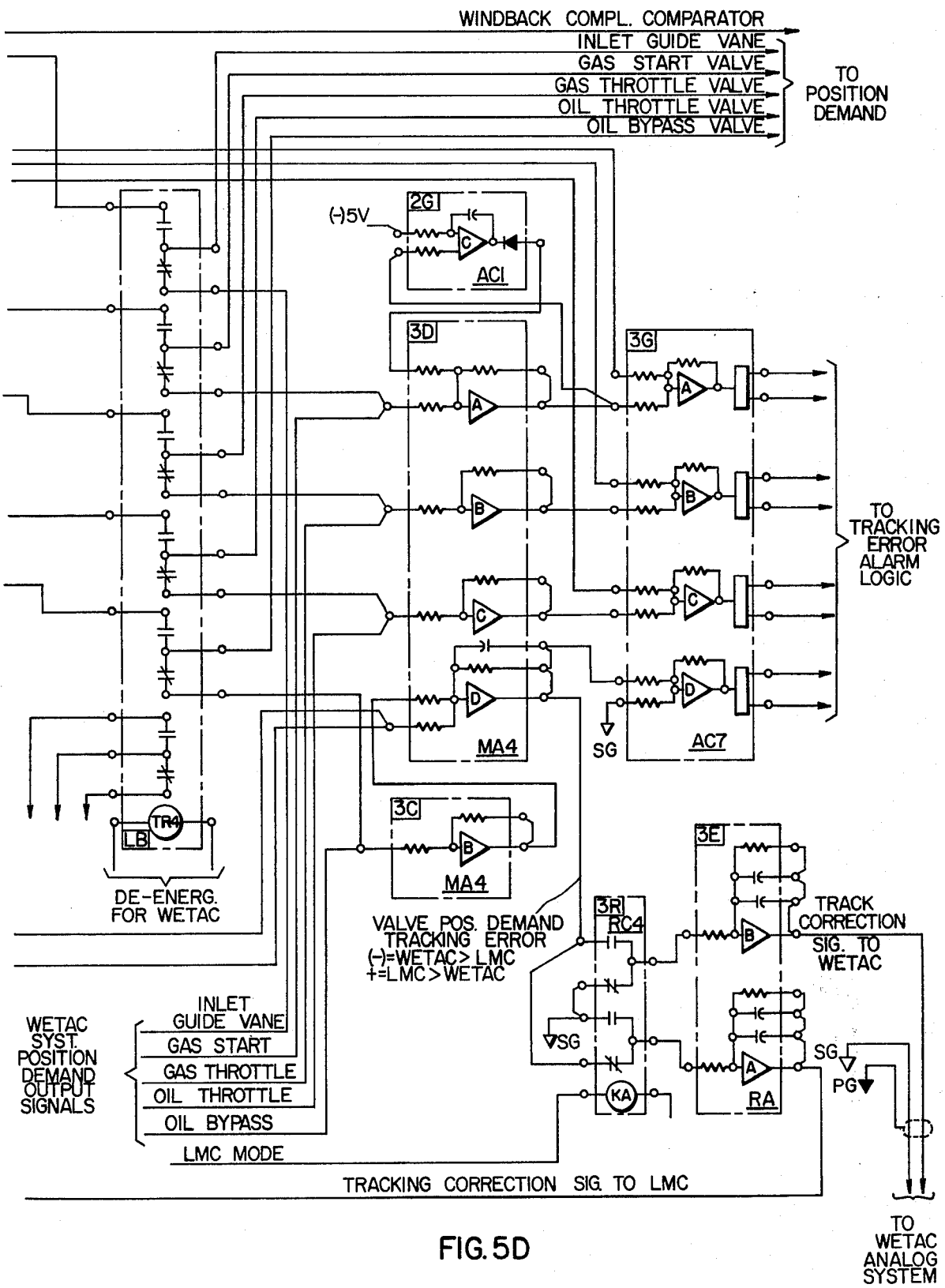
Figure 5E:
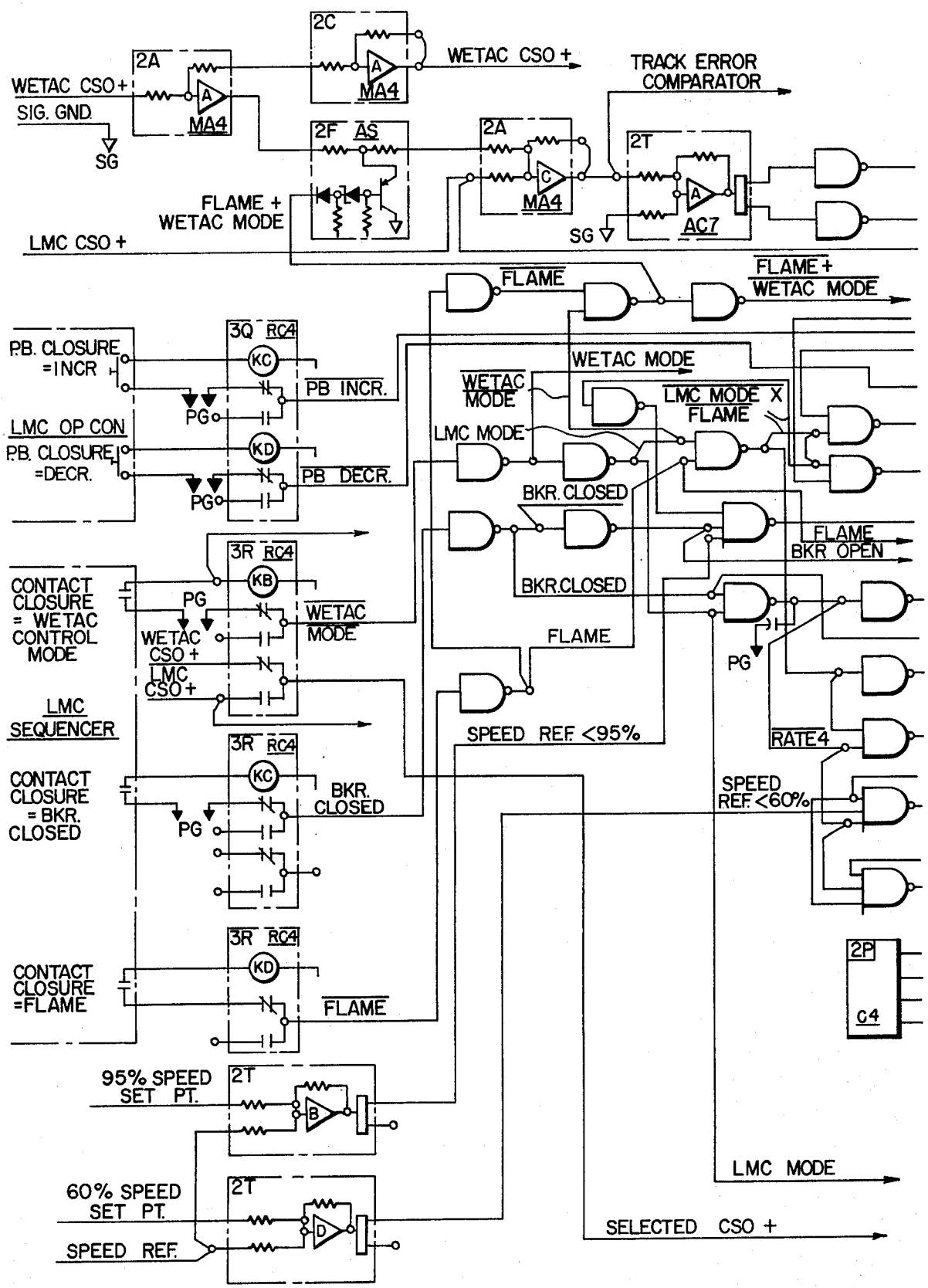
Figure 5F:
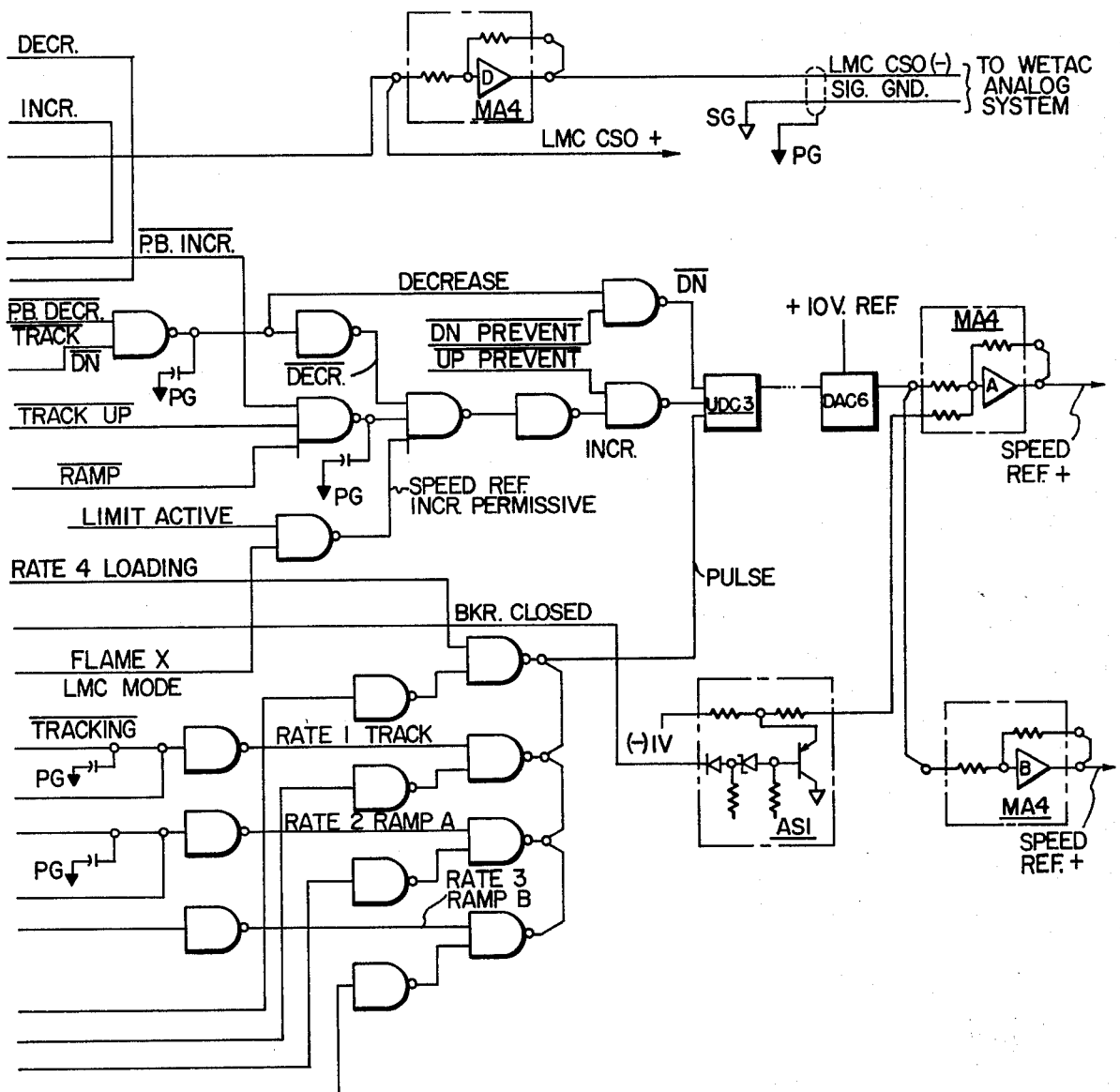
Figure 5H:
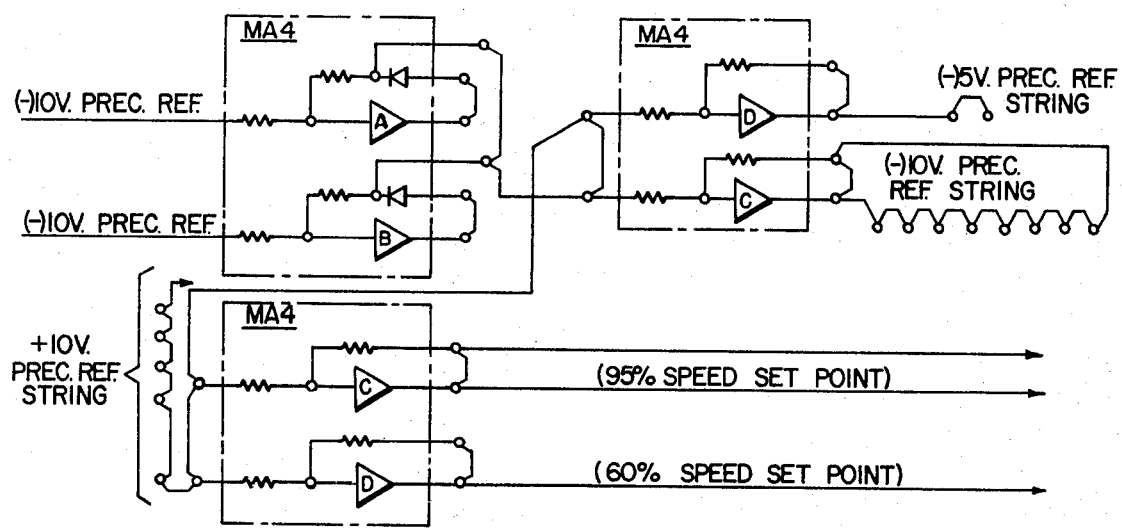
Figure 5I:
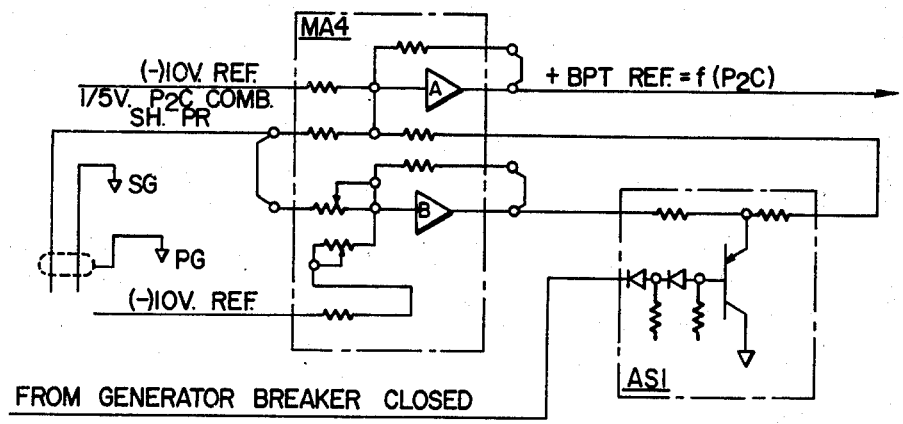
Figure 5I:
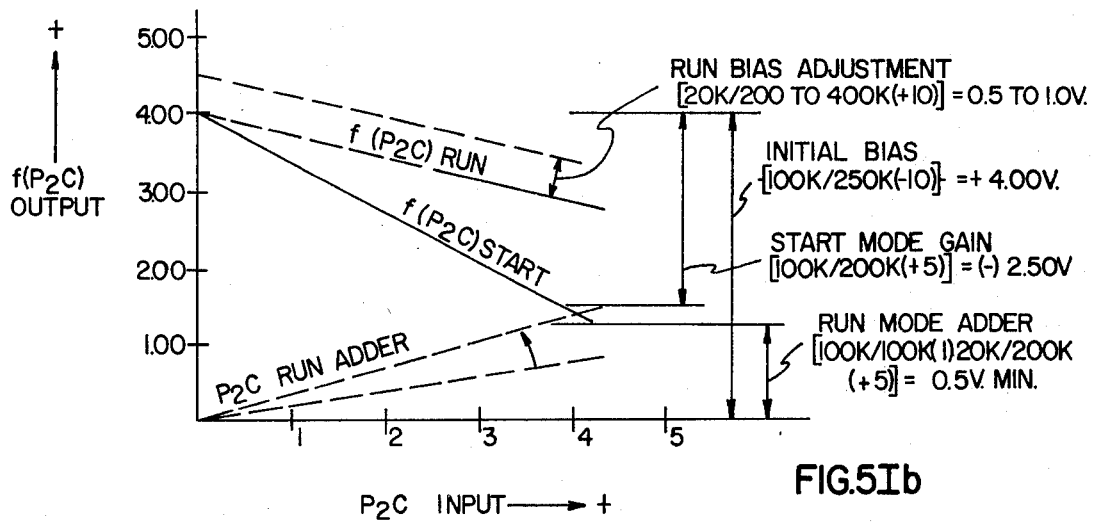
Figure 5J:
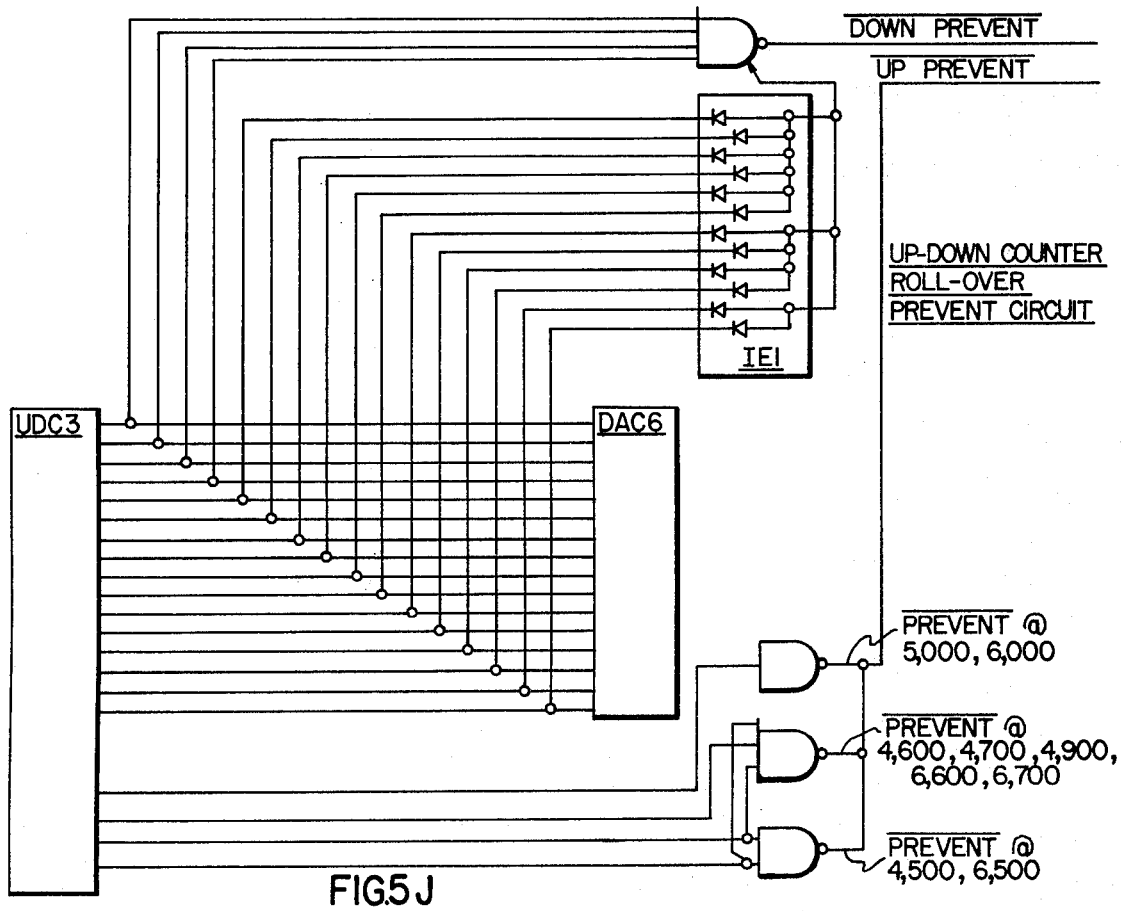
Figure 5K:
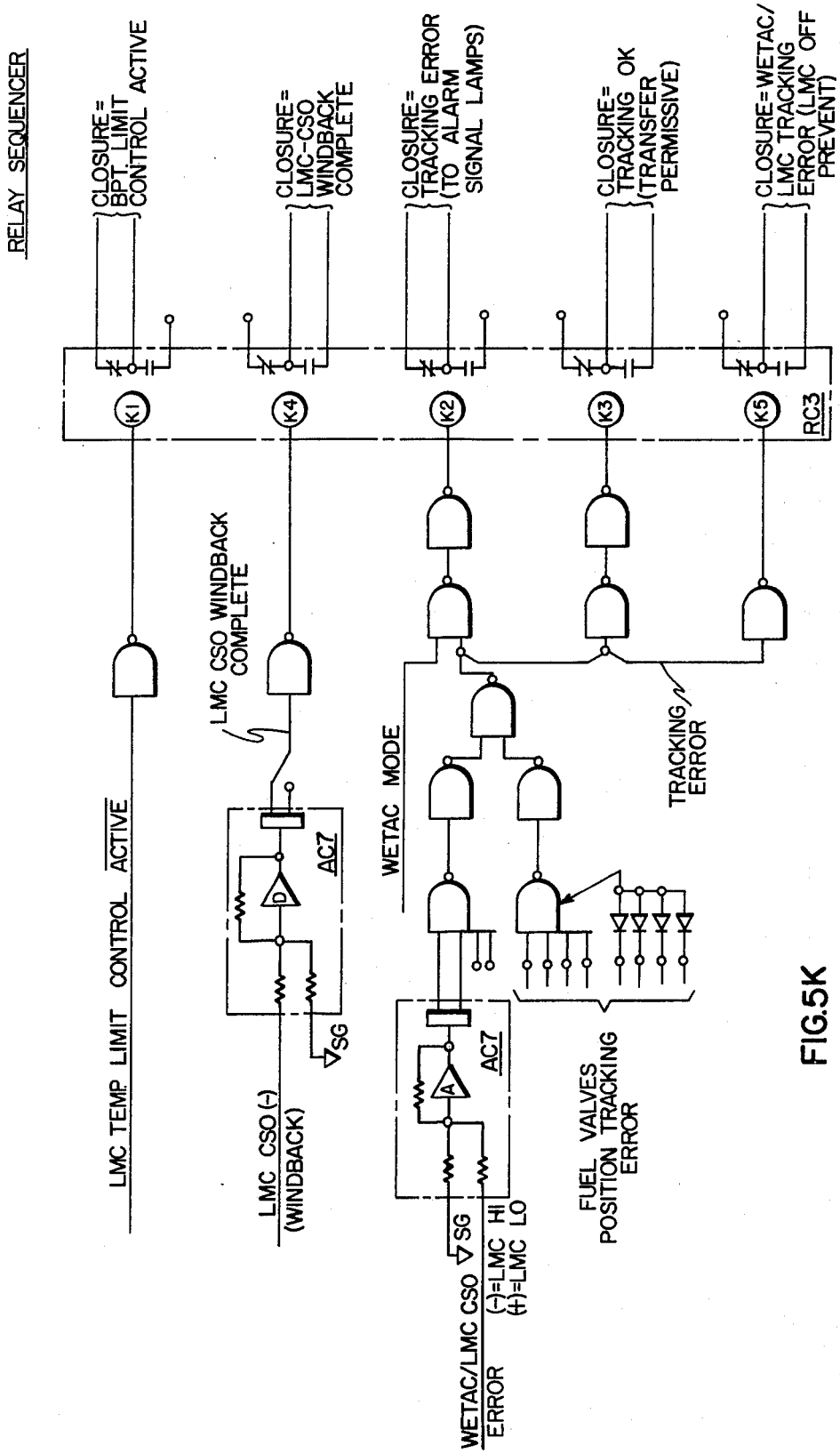

Referring first to FIGS. 4A–C, it can be seen that the LMC CSO (control signal output) is ultimately developed on line 401. This signal is then conveyed to the operator's panel 500 where it is amplified and forwarded to the appropriate fuel valve amplifier in the primary control system. An increase in LMC CSO will result in increased speed, while conversely, a decrease in that signal will result in lowered speed due to an increase or decrease in fuel flow. The LMC CSO is developed in the following manner.

AND gate 402 has four inputs thereto. Once the LMC mode of operation has been selected and a turbine start is contemplated thereunder, the LMC MODE and BREAKER OPEN (circuit breaker open) inputs to gate 402 are set to a logical high. If turbine speed is less than 95% of synchronous speed, the low speed signal monitoring block 420 sets a third input to gate 402 to a logical high. Once ignition has been achieved and recognized, the FLAME input to gate 402, its fourth and last input, is also set to a logical high. Thus, the output of gate 402 is set high, causing OR gate 403 to similarly set one of three inputs to AND gate 404. The other two inputs to gate 404, which indicate respectively that a speed decrease has not been called and that a speed increase permissive has been satisfied, are assumed to be at a logical high and so, the output of gate 404 causes the digital counter 405 to be incremented upwards at a rate determined by clock 421.

As will be noted by reference to FIG. 4C, clock 421 is able to increment the up/down counter 405 at one of four rates. These are (1) a tracking rate, (2) a loading rate, (3) a speed rate A and (4) a speed rate B. It should be noted that the particular clock rate selected for ramping the speed reference signal, which appears on line 408, is determined by the rate logic AND gates 431–433. AND gate 430 is utilized in clocking counter 405 at the predetermined loading rate. It should be further noted that the tracking rate is utilized to increment the counter 405 whenever the primary control system is, in fact, in control of the turbine or whenever, under LMC control, there is an absence of flame or pre-ignition. OR gate 434 responds to either of these conditions and sets the TRACKING STATE line 435 to a logical high should either occur.

In the tracking mode or state, the LMC CSO is held equal to the speed setpoint or reference minus the actual speed as measured by appropriate sensors previously identified. Thus, if at any time the actual speed experiences a sudden jump upwards, the LMC CSO will become negative until the speed setpoint or reference signal catches up. As previously noted, such an event actually occurs at ignition due to the fixed energy input resulting from the ignition process. Thus, with the turbine rotating at 20% speed, under the influence of the starting motor package, the sudden inflow of fuel via a fixed, minimum fuel valve setting and pressure typically yields a rapid, almost instantaneous, speed increase in the order of 30 to 40% of ignition speed.

If ramping of the speed setpoint signal is not delayed at ignition, a negative LMC CSO or fuel demand signal will occur because of the sharp increase in turbine speed. Since the period in which speed setpoint catches up to the actual turbine speed, under certain ambient conditions, may now exceed the atomizing air time, flameout could occur. This will, of course, delay placement of the turbine on-line and defeat the very reasons for having a local maintenance or backup controller or a control system which is designed to place a turbine on-line as quickly as possible.

This potential problem is solved by utilization of a signal time delay means 450 which is shown in FIG. 4C. A signal, flame instant, is received from the turbine combustors, which signal verifies that ignition has taken place. This signal is fed to AND gate 451 and a 50 second time delay block 450. After expiration of the time delay period, one input to OR gate 452 is set to a logical high, which, in turn, sets line 453 to a logical high. The other input to AND gate 451 constitutes a signal indicative of turbine speed in excess of 60% of operational speed. Since this condition does not obtain at ignition speed levels, AND gate 451 has no affect on OR gate 452 until the turbine speed has been ramped up to greater than 60%. Line 453, the flame control line also appears in FIG. 4A and, as previously discussed, the lack of a logical high signal thereon is determinative of the operational state of the LMC.

Delay means 450 is selected to impart a 50 second delay to the flame instant signal, which delay retards commencement of the speed setpoint signal by that amount. The 50 second delay period has been selected in the preferred embodiment as a compromise between the time required for the speed setpoint signal to catch up with the actual measured speed and the time period in which ambient conditions may result in flameout. Consequently, at the tracking rate, the speed setpoint has caught up to the measured speed resulting in a zero CSO and permitting speed setpoint ramping to begin.

MATCHED BLADE PATH TEMPERATURE LIMIT SIGNAL GENERATION

After the speed setpoint signal has been incremented, either up or down by counter 405, it is converted from a digital to an analog signal by the D/A converter 406. It is then forwarded to summing block 407, where an additional load compensation signal is added thereto if the line breaker has been closed. The speed setpoint signal is then forwarded to the differencing plus proportional block 409 where a speed error signal is developed and multiplied by an appropriate constant. From block 409, the speed error signal is forwarded to a proportional plus rate block 410 where the error signal is kicked or sharply increased.

Thereafter, the error signal is forwarded to a low signal selector 411, where it or an overspeed prevent signal is selected, depending on which of the input signals is lower. From there, the selected signal, which will be assumed to be the speed error signal, is forwarded to the high signal selector block 412, where it or a minimum speed error signal is selected depending on which of the two signals is higher. After being increased by the action of proportional block 413, the speed error signal arrives at the low signal select block 414. The winning signal in select block 414 appears on line 401 and, as previously noted, is conveyed to the operator's panel 500 where it is amplified and then forwarded to the appropriate fuel valve amplifier in the primary control system.

In low signal select block 414, the speed error signal is compared to a blade path temperature limit signal, with the lowest of the two being utilized to control fuel scheduling. Under most control circumstances, the speed error signal will be selected, with the temperature limit signal being utilized to insure that any speed increases called for by the control system will not violate the permissible temperature limit for the blade path.

The blade path temperature limit signal is generated in the following manner. Temperature sensors 435 generate a signal proportional to actual blade path temperature, which signal is kicked up only by the combined effects of rate block 440 and low signal limiting block 441. The resultant signal, therefore, anticipates a problem with respect to the temperature limit before it occurs and thereby prevents overshoot. Assuming that the LMC mode of operation is plus 12 seconds, the anticipated temperature signal is summed in block 442 with the measured signal and forwarded to differencing block 443. In block 443, the summed temperature signal is compared to a characterized combustor shell pressure signal or temperature limit setpoint signal developed by the combined action of pressure sensor 436, characterizing blocks 437 and 438, breaker status decisional block 454 and the summing block 439.

A temperature error signal is developed in block 443 by comparing the measured and setpoint signals and the resultant signal is forwarded to function point 455. If the error signal is positive, meaning that the measured temperature is above the temperature setpoint, the high temperature proportional signal limiter 444, which is active only when the temperature error signal is greater than zero, increases the signal by a factor of five. This increased signal is forwarded to the proportional plus integral plus high signal limiter block 446 where the increased error signal is integrated at a rate which is a function of the proportional constant set in block 444. Thus, the blade path temperature limit signal developed in block 446 will now tend to drive the measured temperature towards the temperature setpoint at a relatively rapid rate which is related to the proportional constant of block 444. This constant is selected and matched to the inertial characteristics of the gas turbine, i.e., its response to fuel cutback. It will be appreciated that the rate at which fuel can be reduced in order to lower blade path temperature is realistically limited by turbine and thermal response and that beyond a given rate of fuel reduction, there will be no increased rate of temperature reduction.

Conversely, if the temperature error signal is negative, meaning that the measured temperature is below the temperature setpoint, the low temperature proportional signal limiter 445, which is active only when the temperature error signal is less than zero, decreases the error signal by a factor of one. This decreased signal is also forwarded to block 446 where it is integrated at a rate which is a function of the proportional constant set in block 445. Thus, the blade path temperature limit signal developed in block 446 will now tend to allow the measured temperature to approach the temperature setpoint at a relatively slow rate which is related to the proportional constant of block 445. This constant is selected and matched to the response characteristics of the gas turbine and control system, i.e., the response to fuel increase.

Thus, by appropriate selection of the proportional constants of blocks 444 and 445, the generation of the blade path temperature error signal is matched or tuned to the characteristics of the gas turbine. Such generation is thereby constrained to behave in one manner in response to a condition of increasing temperature wherein fuel is increased at a relatively slow rate and in another manner in response to a condition of decreasing temperature wherein fuel is decreased at a relatively rapid rate.

After final conditioning in block 446, the blade path temperature error signal is also compared therein to a temperature limiting signal which is clamped at a predetermined percentage of the control signal output or fuel scheduling signal and appears on line 447. If the blade path temperature error signal is not higher than the clamped limit signal then it is forwarded by block 446 to the low signal selector 414 via line 448 and serves as the temperature limit signal thereat. However, if the error signal is higher than the clamped signal, then the clamped signal is forwarded to block 414 to serve as the blade path temperature limit. Since the error signal will most often be used as the temperature limit signal, particularly after ignition, it is fair to equate the error signal and the limit signal in describing operation of the present invention.

The clamped, temperature limit signal which appears on line 447 is generated in the following manner. The inputs to decision block 460 are connected respectively to the primary control fuel scheduling signal (P50 CSO) and the backup control fuel scheduling signal (LMC CSO or line 401). If the plant is being operated by the primary control system or is capable of being so operated (P50 MODE), decision block 460 forwards the fuel scheduling signal thereof to decision block 461. Conversely, if the plant is being or is to be operated by the back up control system (LMC MODE), decision block 460 forwards the fuel scheduling signal thereof to decision block 461.

At decision block 461, the forwarded signal is passed to the proportional multiplying block 462, where it is multiplied by a fixed, predetermined percentage, in the preferred embodiment by 110%, if the backup control system is not in its tracking mode. As will be recalled, the backup control system will ordinarily be in its tracking mode whenever the primary control system is operating the plant prior to speed setpoint ramping. If speed setpoint ramping in the backup control is not occurring, i.e., before ignition plus the delay, then the value of constant block 463, which is zero percent is forwarded to block 462.

Summing block 465 adds the signal received from multiplying block 462 to the bias signal generated in constant block 464, in the preferred embodiment a 2% portion of the fuel scheduling signal. The summed result, which appears on line 447, is therefore clamped to either 112% of the fuel scheduling signal (CSO) or to 2% thereof, depending upon the mode of control operation. Thus, after speed setpoint ramping with backup control or when the plant is operated on primary control, the clamped signal is held at 112% of the fuel scheduling signal which permits the speed error signal to dominate fuel scheduling. In its alternative state, prior to speed setpoint ramping under the aegis of the backup control, the clamped signal is held at only 2% of the fuel scheduling signal which insures that speed setpoint ramping, when initiated, will be able to increase turbine speed since a negative or very small initial fuel scheduling signal would otherwise control via the action of signal selector block 414.

Once speed ramping has occurred or begun, the clamping action of the temperature limit signal on line 447 holds the maximum temperature limit forwarded to selector block 414 at 110% of the fuel scheduling signal or CSO. This allows the speed error signal to ramp up turbine speed without bumping into the temperature limit before it should.

TOLD RELAY SEQUENCING ARRANGEMENT

Figure 6A:
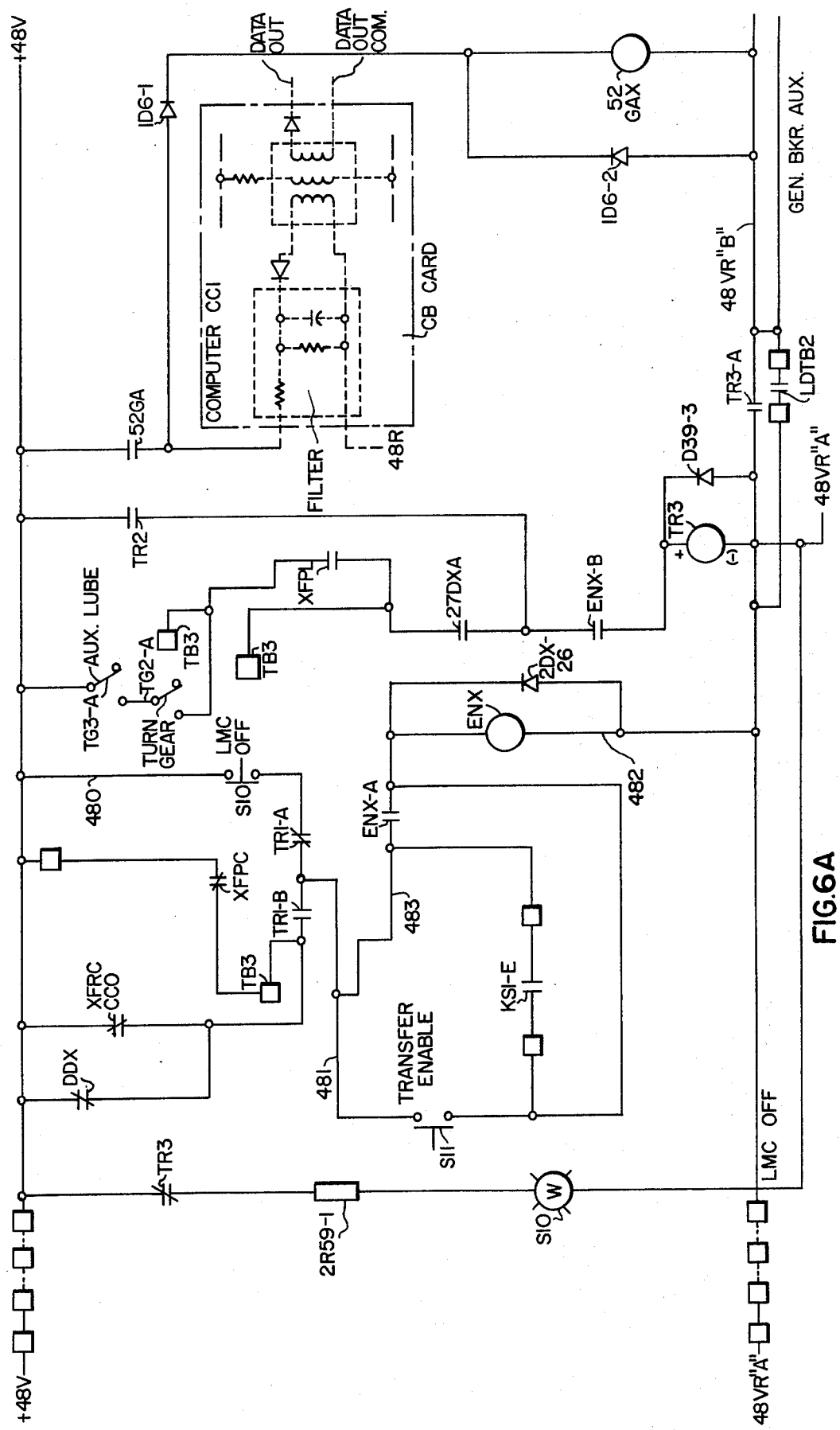
FIGS. 6A–P depict the sequencing arrangement employed in the local maintenance controller.
Figure 6B:
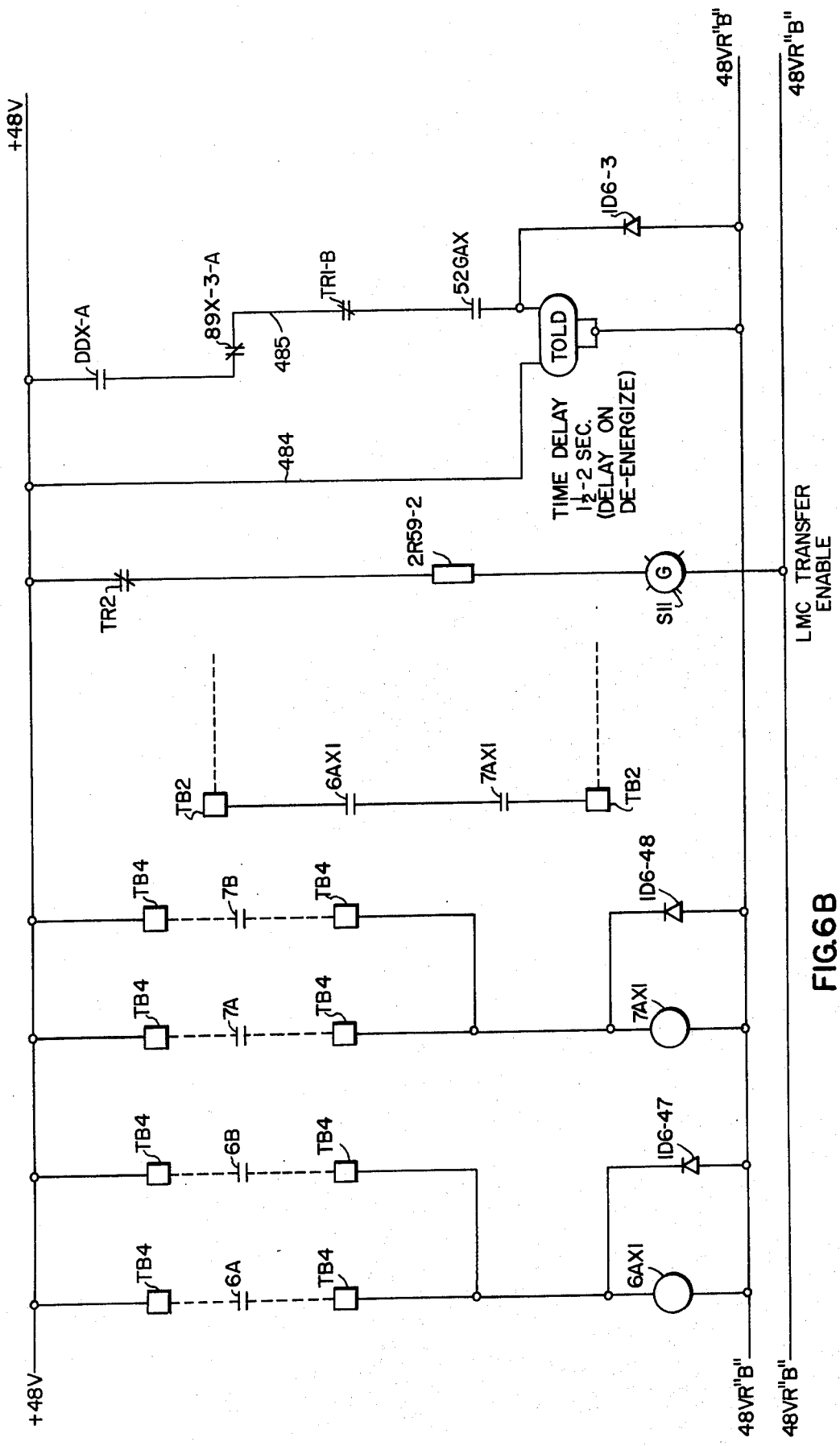
Figure 6C:
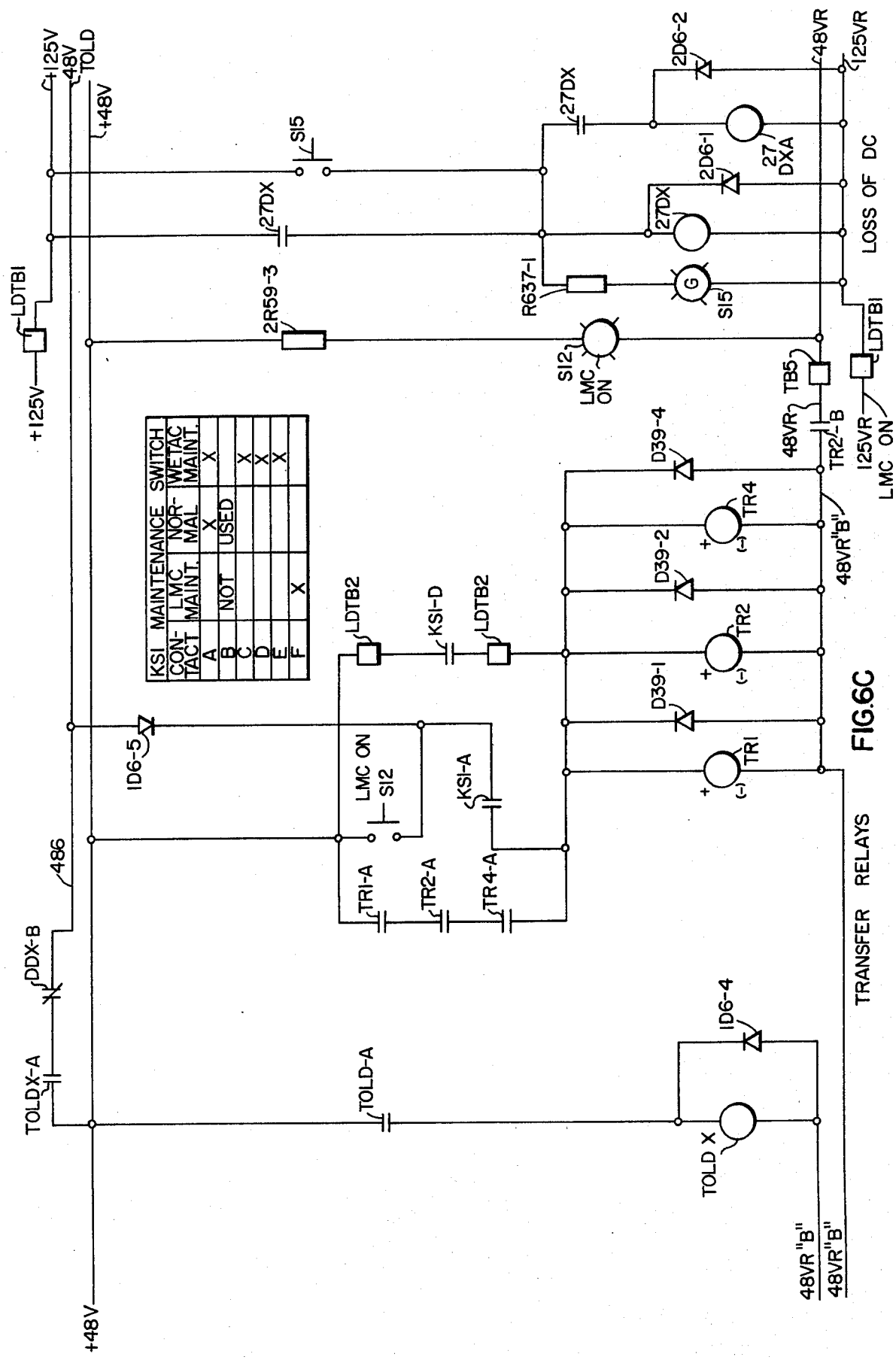
Figure 6D:
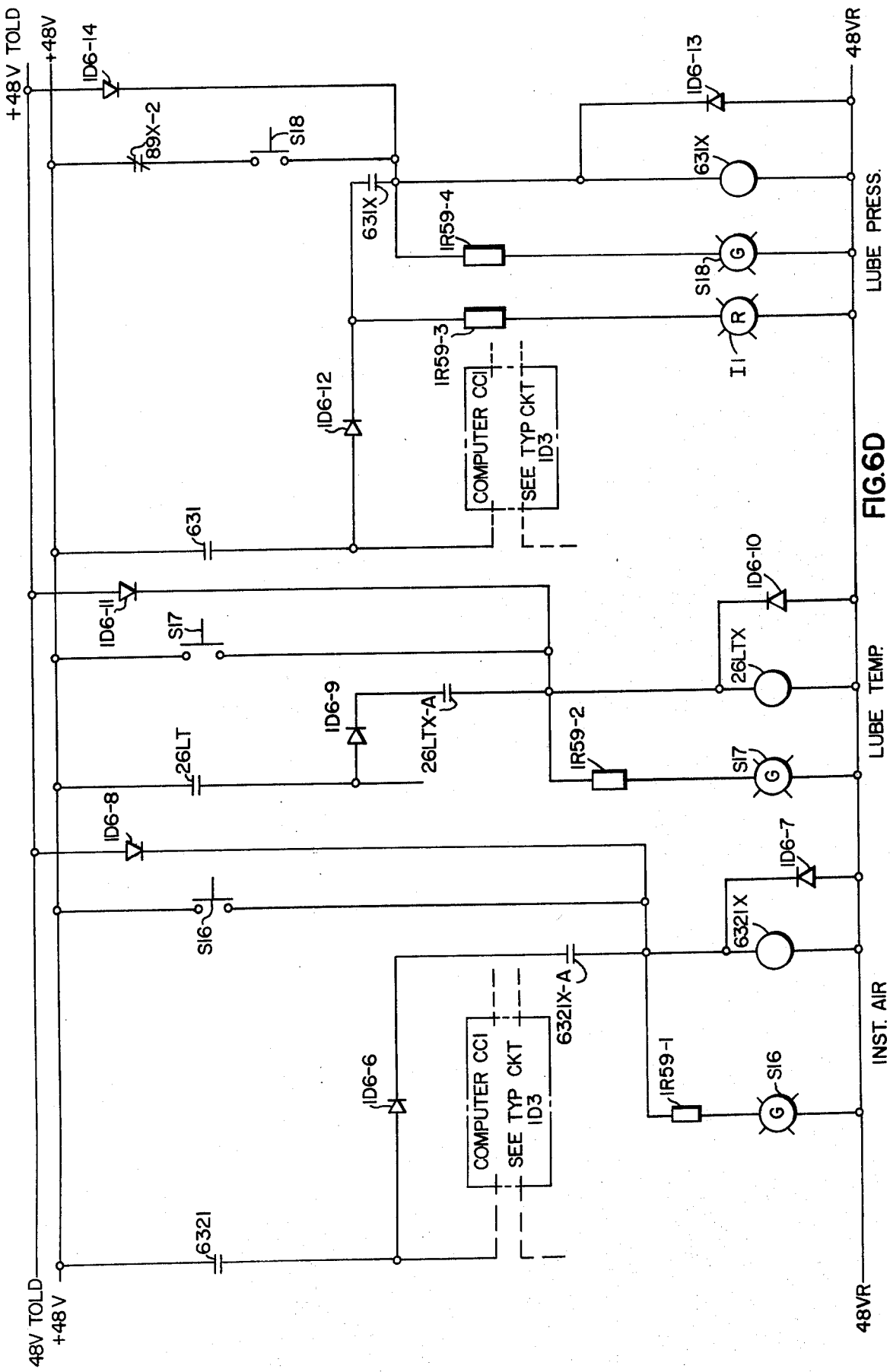
Figure 6E:
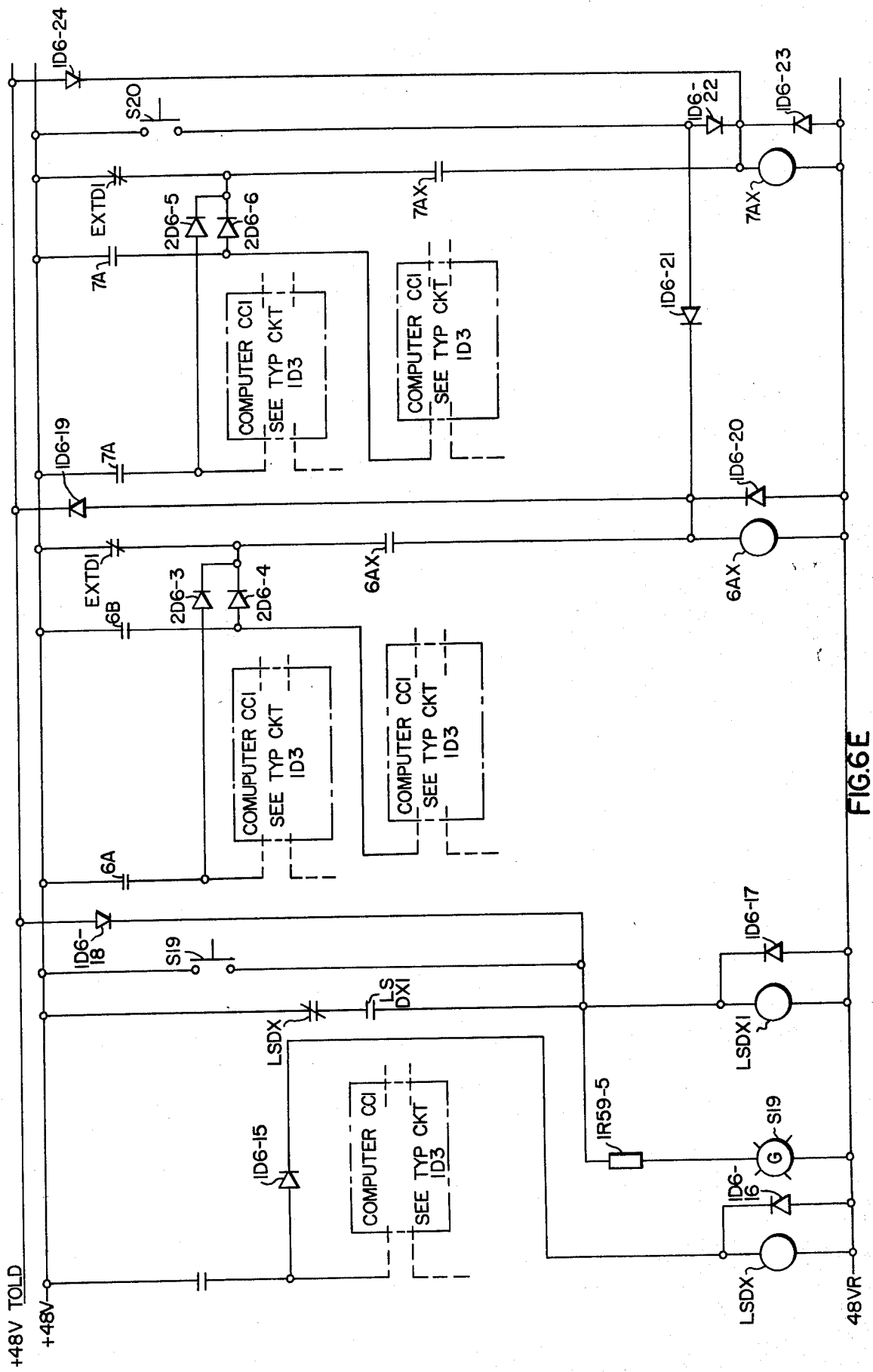
Figure 6F:
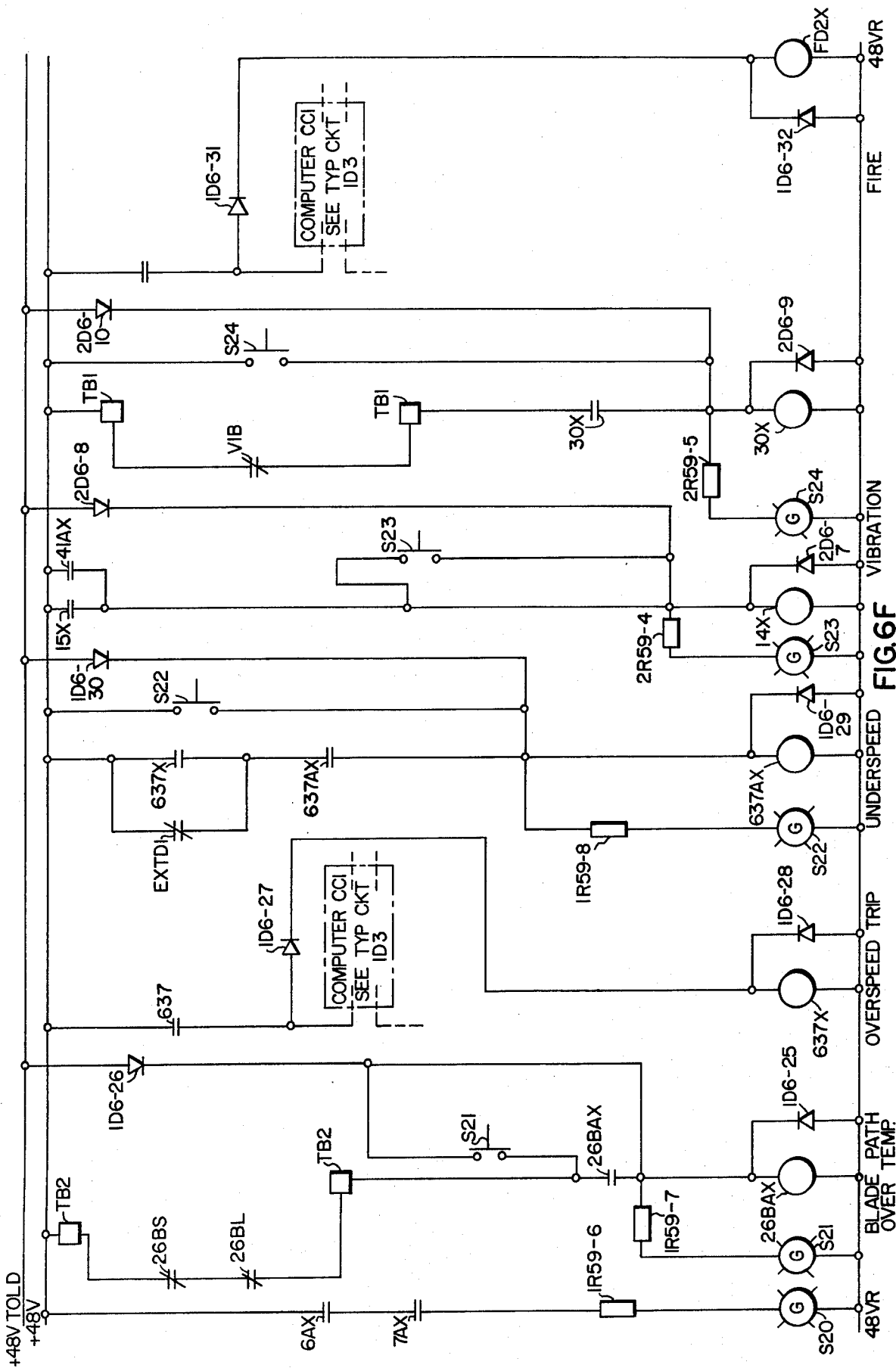
Figure 6H:
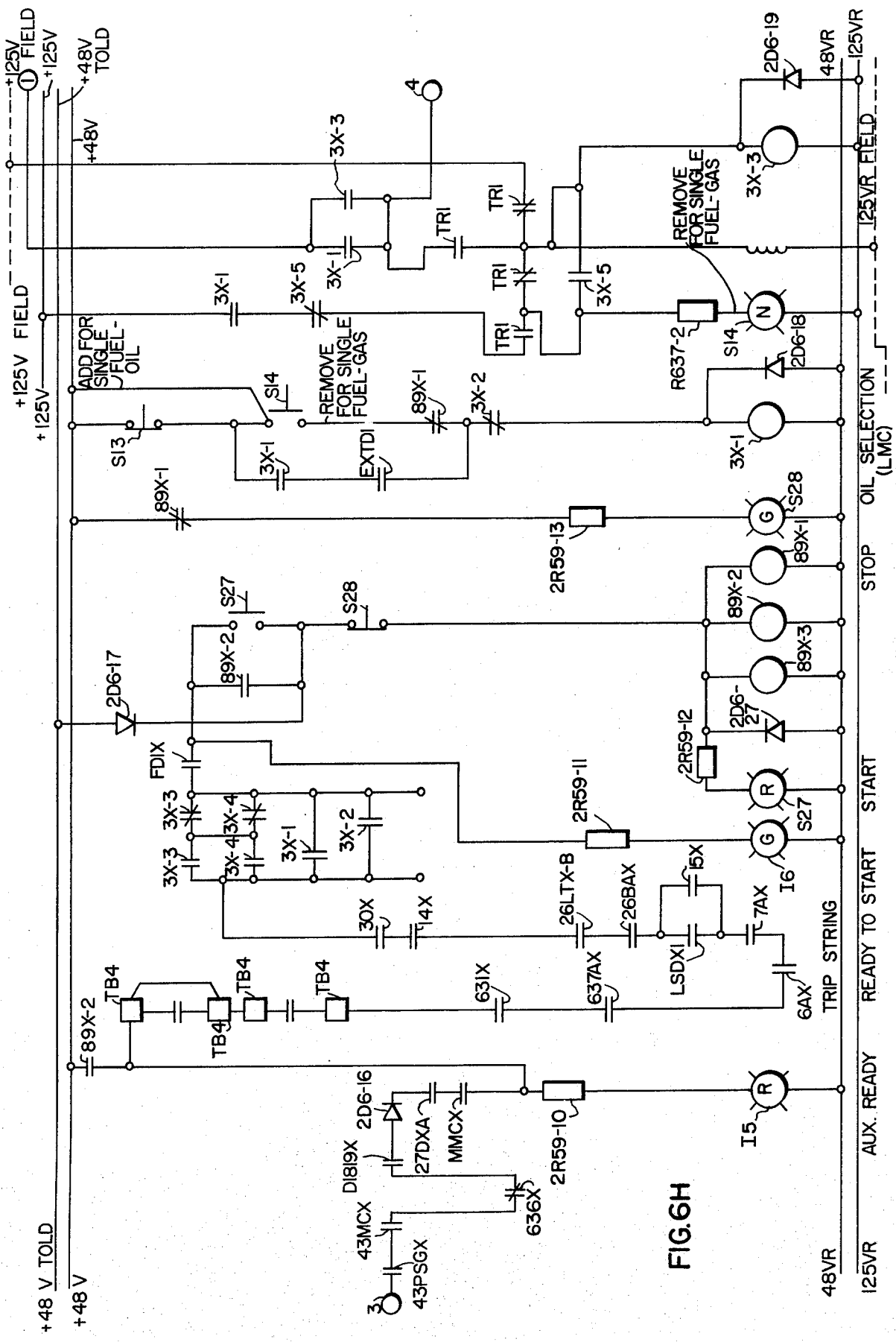
Figure 6L:
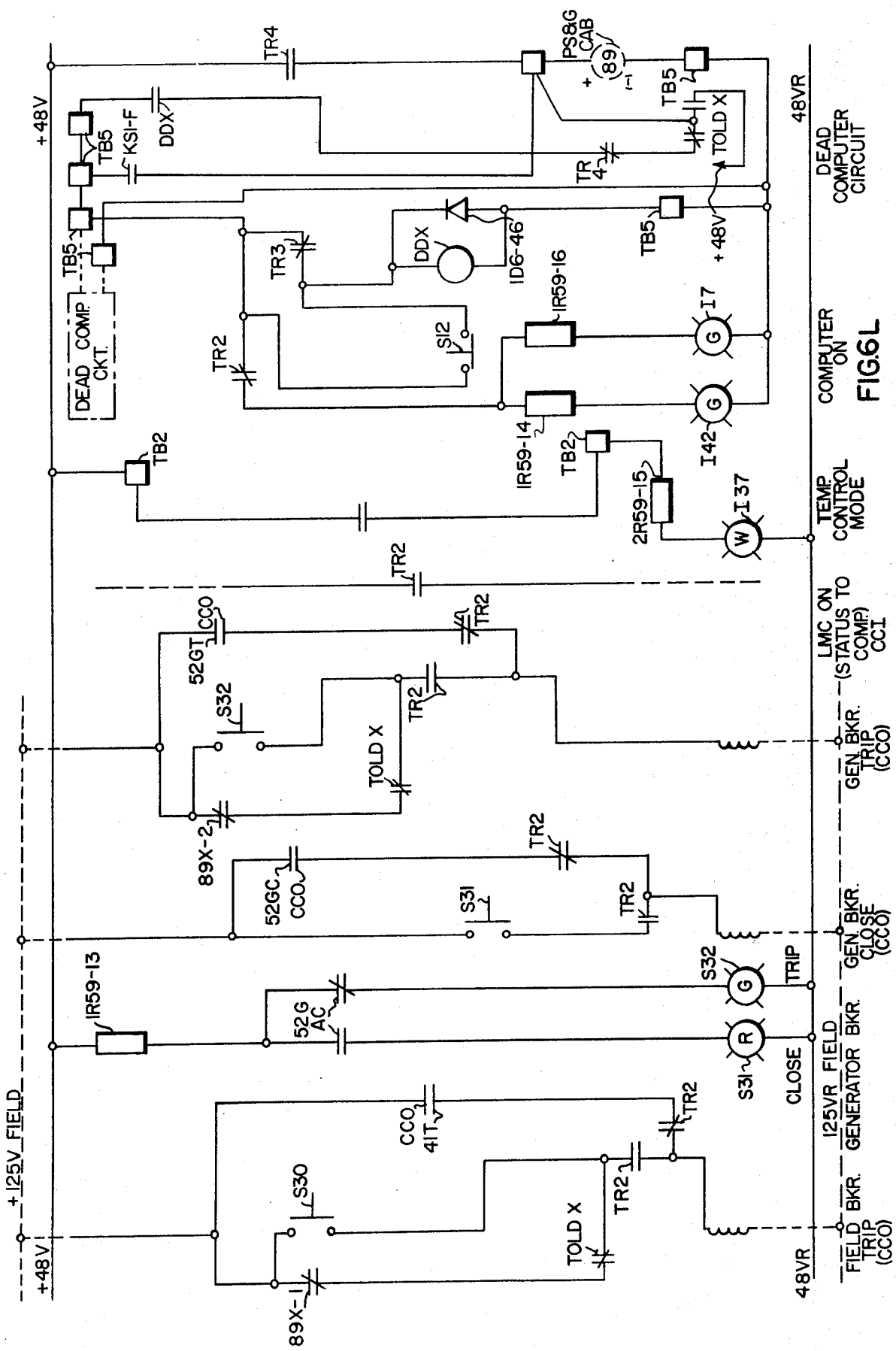
Figure 6M:
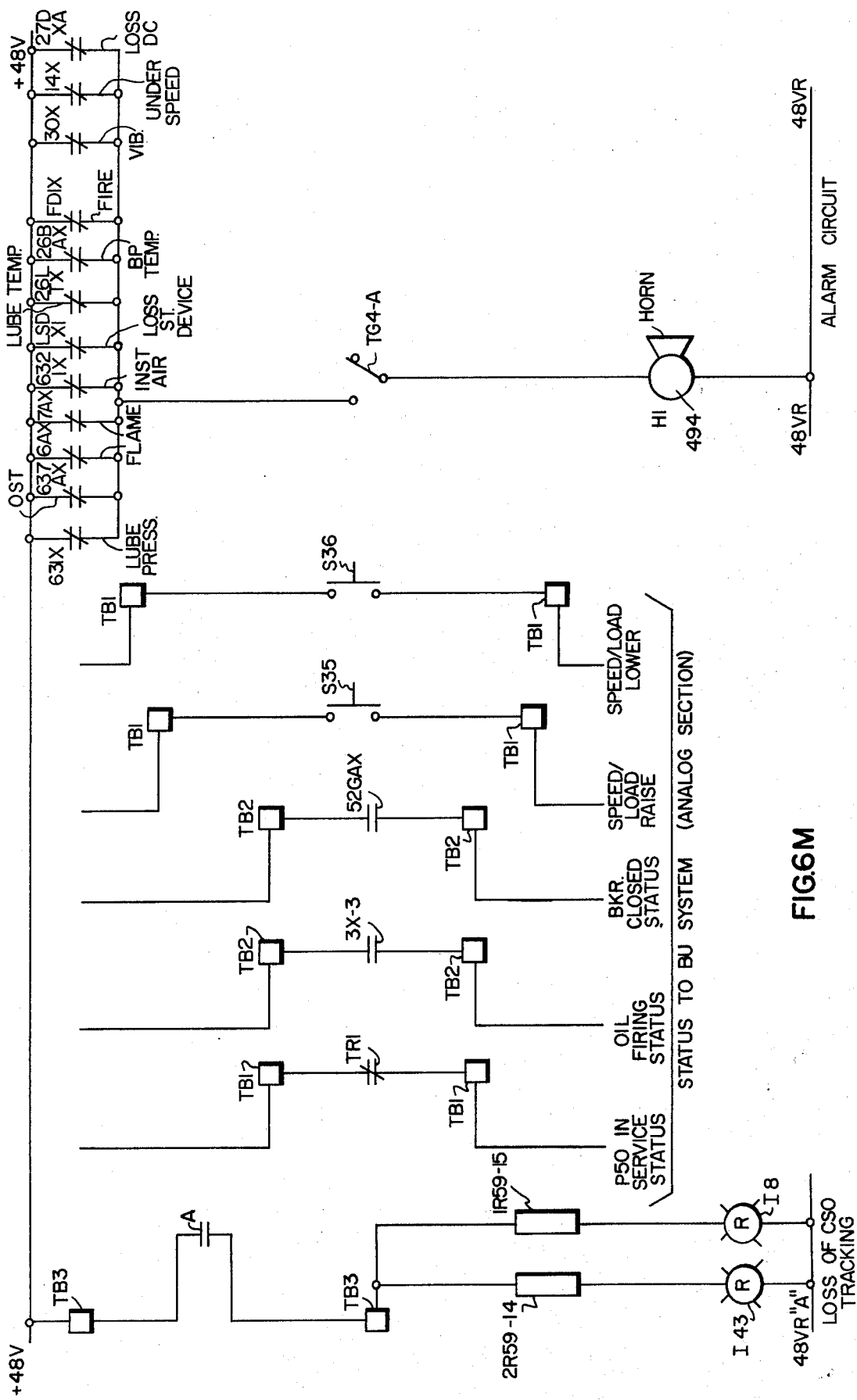
Figure 60:
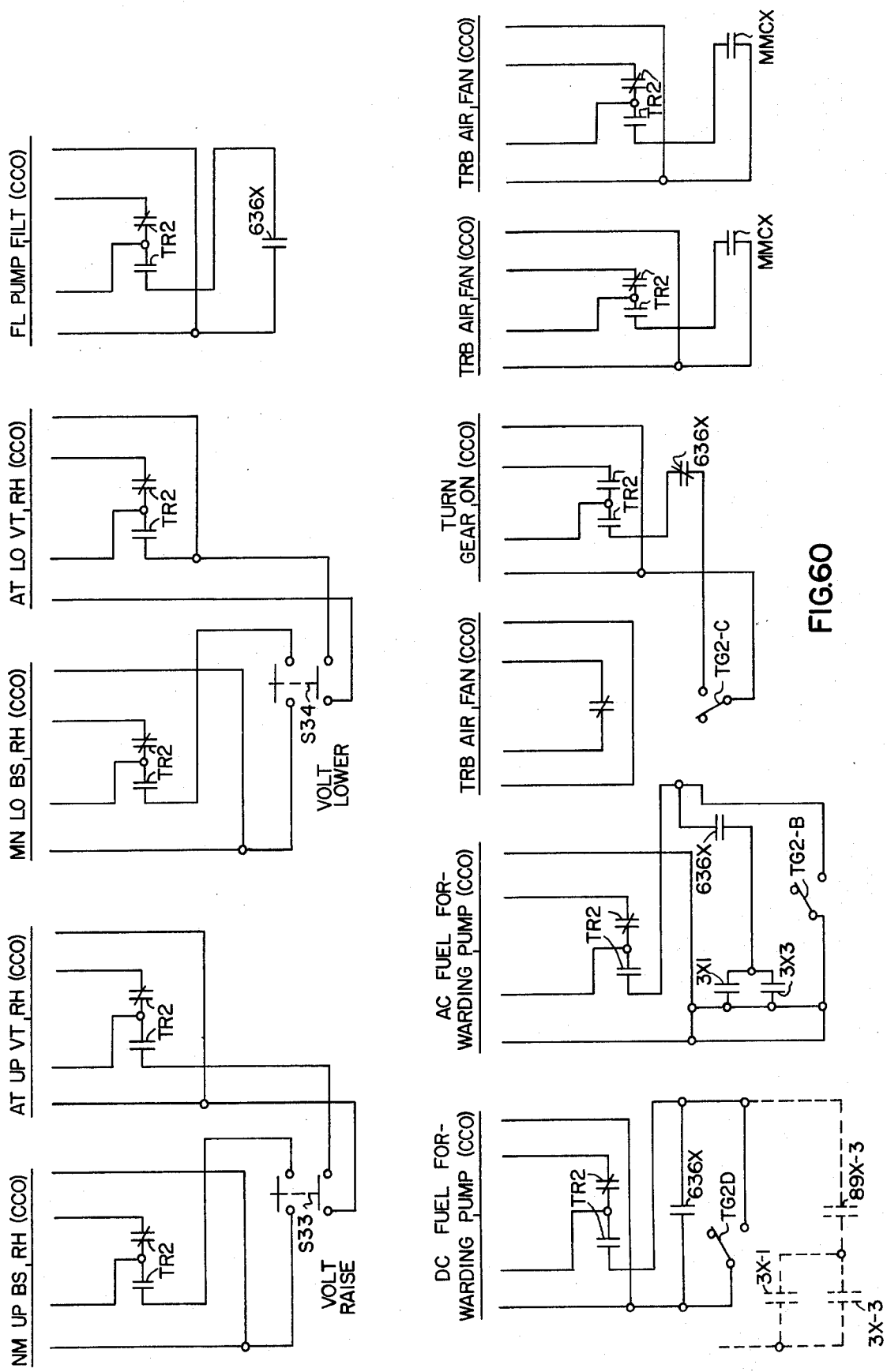
Figure 6P:
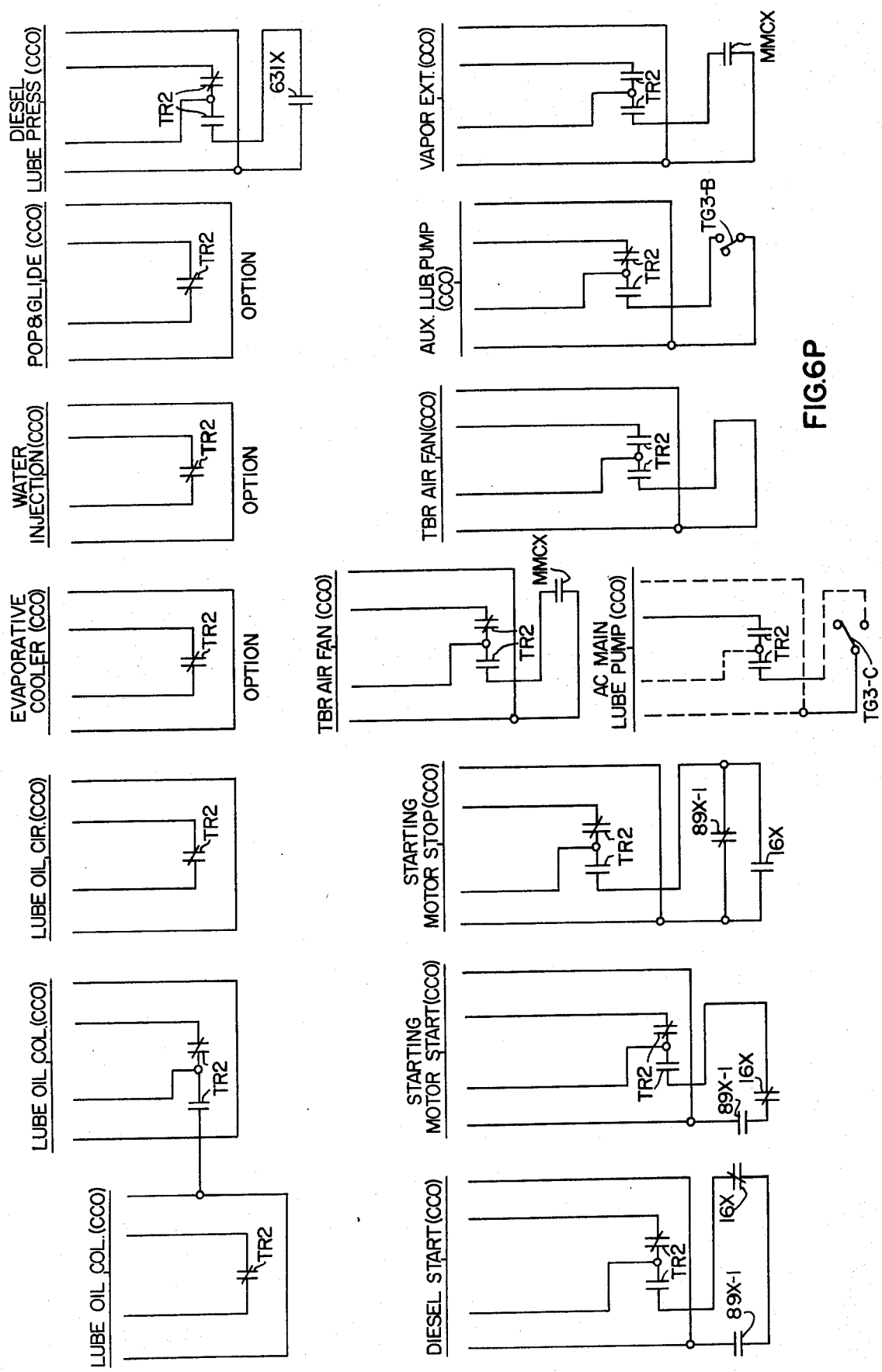
Figure 7A:
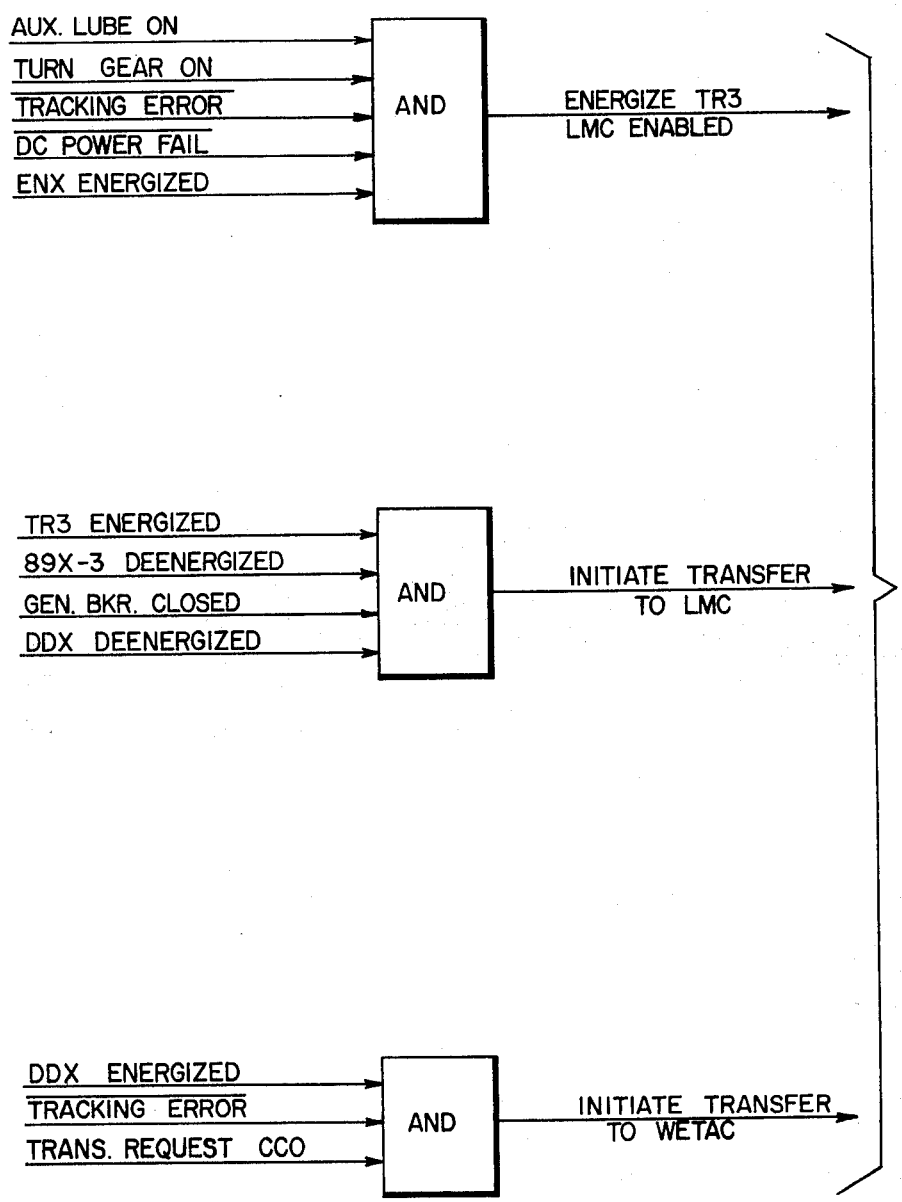
FIGS. 7A–B depict the relay blocks and action thereof used for transfer initiation and monitoring in the local maintenance controller.
Figure 7B:
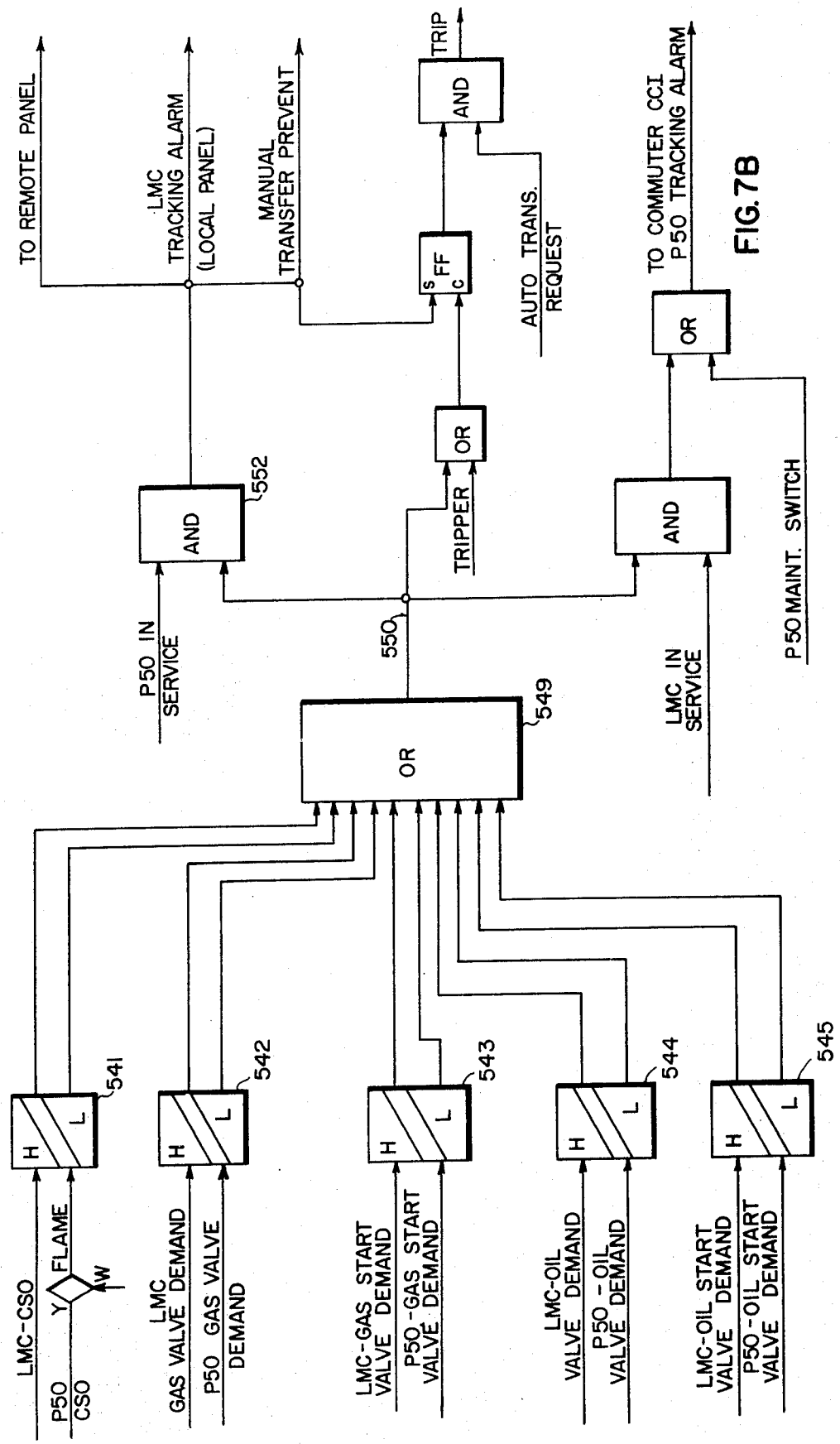

The Transfer On Line Delay (hereinafter TOLD) relay arrangement which contributes to enabling a transfer of control form the primary control system to the Local Maintenance Controller (hereinafter LMC) is illustrated in FIGS. 6A–P. It should be noted that the various relay contacts shown therein are depicted in their "shelf" state, that is their non-energized position.

It will be initially assumed that the turbine 104 is under primary control with the breaker closed. To arm or prepare the LMC for transfer, the operator makes toggle switches TG2-A and TG3-A, shown in FIG. 6A, which reflect respectively that the turning gear can be turned on if necessary and that the auxiliary lubrication pump can be turned on if necessary. In addition, the operator closes switch S-11, the TRANSFER ENABLE, which provides power for relay coil ENX in the following manner. Relay contacts TR1-A are closed since relay TR1 is not yet energized. With pushbutton switch S-10 closed, LMC OFF, a path is closed on lines 480–482 connecting relay coil ENX across the +48 volt bus and the 48 volt return bus A. Once energized, relay ENX closes contacts ENX–A and thereby seals itself in since release of pushbutton switch S-11 will not affect the newly completed path formed by lines 480, 482 and 483.

With relay ENX sealed in, contacts ENX-B are also closed. Contacts 27DXA are closed when the LMC has 125 volt power and contacts XFPL are closed when the LMC is properly tracking the primary control signal output. Assuming that these permissives are satisfied and with toggle switches TG2-A and TG3-A closed, relay TR3 becomes energized closing contacts TR3-A. This action completes the return path for the 48 volt return bus B. With relay TR3 energized, the LMC is now armed or ready for the transfer of control thereto. It should also be noted with respect to FIG. 6A, that contacts 52GA, which represent the status of the breaker, is closed when the plant is on-line, as was assumed, and that relay 52GAX is therefore energized.

The transfer logic signal development is shown in FIG. 4C and, in brief, result in contacts XFPL being closed when it is allowable to transfer to the LMC and contacts XFPC being opened to permit a transfer from the LMC back to primary control. Each set of contacts logically recognizes that the LMC tracking is free of error. The LMC tracks the primary system by comparing, in the preferred embodiment, five equivalent signals. These signals are:
 a. control signal output (CSO);
 b. gas throttle valve demand;
 c. gas start valve demand;
 d. oil throttle valve demand; and
 e. oil bypass valve demand. In an error, either high or low, exists between any pair of tracked signals with the plant on primary control, a tracking error exists and contacts XFPL will be held open. This action will prevent a transfer of control to the LMC by holding open the line to relay TR3. Alternatively, if a tracking error exists while the plant is under LMC control, contacts XFPC are held closed to prevent a return to primary control.

Referring now to FIG. 6B, there is shown the TOLD relay which exhibits a 1½ to 2 second delay when deenergized. This delay is utilized in the automatic resetting of the alarm circuitry as shall be hereinafter explained. It permits the normally quiescent relays to be positively latched at the time of transfer. Normally, the computer or primary control duty cycle is approximately 0.6 seconds where one turbine is being controlled and multiples thereof for the control of two or more turbines. Thus, if a fault requiring trip occurs at the beginning of the primary control cycle, about 0.6 to 1.8 seconds will elapse before a trip signal is generated and shut down begun. Therefore, if a fault requiring trip occurs after manual or automatic transfer is initiated, the TOLD delay is not beyond that encountered under sole primary control, but is sufficient to accomplish its purpose.

Relay contacts DDX-A are normally closed reflecting a healthy computer. Relay DDX is resident in the dead computer circuit (see FIG. 6L) which shall be discussed hereinafter. Relay contacts 89X-3-A are open only when the LMC is in a start-run condition which is not so under the assumed conditions of primary, on-line, control. Relay TR1 is not yet energized leaving contacts TR1-B closed. Relay contacts 52GAX-A are closed since, as noted previously, the plant is on-line which causes energization of relay 52GAX. With the LMC armed, i.e., the 48 volt return bus B path is completed, the TOLD relay is energized.

This action, see FIG. 6C, closes the contacts TOLD-A, thereby energizing relay TOLD X which, in turn, closes relay contacts TOLD X-A. However, since relay DDX is still energized as the computer is assumed healthy, relay contacts DDX-B remain open preventing current flow on line 486. The LMC transfer enable conditions have now all been met and primary to LMC control is permissible.

Under the previously assumed operating conditions, the LMC is now ready to take over plant control by either manual action or automatic transfer. To initiate manual transfer, see FIG. 6C, the operator depresses pushbutton switch S-12, LMC ON, which completes a path from the +48 volt bus through contacts KS1-A of the maintenance switch KS1 to the 48 volt return bus B, thereby energizing relays TR1, TR2 and TR4. It should be noted that although the LMC has been armed or made ready to accept transfer, relays TR1, TR2 and TR4 and their associated contacts are held quiescent or deenergized until transfer is actually initiated. This arrangement for these relays and others to be hereinafter described, prolongs their operating life and reduces the operating cost of the LMC.

Once energized, relay contacts TR1-A, TR2-A and TR4-A are closed, thereby sealing in relays TR1, TR2 and TR3 when pushbutton S-12 is released. In addition, relay contacts TR2-B are closed thereby completing the connection of the 48 volt return bus to the 48 volt return bus B for purposes of downstream energization. Thus, for example, closure of contacts TR2-B will cause illumination of indicating light S-12 on the LMC operator's panel 500 visually reporting thereby that LMC transfer has been effected.

Referring now to FIG. 6B, the TOLD relay, which is normally energized as previously discussed, is deenergized when relay TR1 is energized since this opens relay contacts TR1-B. The TOLD relay, however, remains energized for the appropriate, predetermined time period. The DDX relay, which is shown in FIG. 6L, works in conjunction with the dead computer circuit 486. When the computer is healthy, circuit 486 generates a +48 volt signal which energizes relay DDX via lines 487 to 491 and the normally closed LMC ON pushbutton S-12. It will be recalled that relay TR3 is energized in arming the LMC, which opens contacts TR3-B. Before opening, relay DDX is also energized via lines 487, 492, 490 and 491. When relay DDX is thereby deenergized, after LMC arming and depression of pushbutton S-12, relay contacts DDX-B (see FIG. 6C) are closed. Now, for the duration of the TOLD relay time delay, the 48 volt TOLD bus is activated.

As shown in FIG. 6D, the presence of current or a TOLD pulse on the TOLD bus will energize relay 6321X via diode 1D6-8, which is in the alarm circuit for instrument air satisfactory. When relay 6321X is energized, relay contacts 6321X-A are closed, sealing in relay 6321X since the field contacts 6321, which are controlled by a remote pressure switch (not shown), are closed if there is no field fault, i.e., instrument air pressure is in fact satisfactory. Indicating light S-16, which is physically mounted in operator's panel 500, is also illuminated visually reporting a lack of trouble with respect to this particular alarm. Since it is now sealed in, the end of the TOLD pulse does not affect continued energization of relay 6321X. It should be noted that in effecting manual transfer to the LMC with the breaker closed, that the LMC alarm circuitry is automatically reset.

Another example of the automatic resetting of the alarm circuitry is also illustrated in FIG. 6D. With field contacts 26LT closed, reflecting satisfactory lubricating temperature, the TOLD pulse will be passed by diode 1D6-11 and cause energization of relay 26LTX. This closes contacts 26LTX and allows relay 26LTX to be sealed in across the 48 volt busses. In addition, indicating light S-17 is illuminated visually showing a lack of alarm condition with respect to lubricating temperature. The other alarm circuits, shown in FIGS. 6D, 6F, 6H and 6J function in the same manner.

If, at the time of transfer, a trip condition exists or arises with respect to one of the alarmed parameters, the field contacts associated with detection of the fault involved will open and the corresponding panel light will go off when the LMC ON pushbutton S-12 is released or at the termination of the TOLD pulse. Should this occur, the operator can see the absence of illumination on panel 500 indicating an alarm condition. In addition, referring now to FIG. 6M, if toggle switch TG4-A has been made, the associated field contacts will open, thereby deenergizing the associated alarm relay and closing the horn alarm contacts causing the horn 494 to blow. The operator would then receive an audio signal of the alarm condition. With the exception of instrument air, all other alarm conditions will cause automatic shutdown of the turbine.

The automatic shutdown on alarm works in the following manner. As shown in FIG. 6H, each of the alarm relays is provided with a set of trip contacts serially connected in a trip string. Thus, for the lubrication temperature alarm, relay contacts 26LTX-B are provided. When the various alarm relays are energized, contacts 26LTX-B and others in the trip string closed. If an alarm condition now occurs, one of the closed sets of relay contacts in the trip string opens deenergizing relays 89X-1, 89X-2 and 89X-3 which had been sealed in by the TOLD pulse. This, in turn, opens contacts 89X-3-A (see FIG. 6B) and deenergizes the TOLD relay and trips the turbine.

Automatic transfer to the LMC occurs in the following manner. With the LMC armed or enabled as before, the computer fails shutting off the 48 volt signal from the dead computer circuit 486 (see FIG. 6L). This deenergizes relay DDX and opens relay contacts DDX-A in FIG. 6B. This, in turn, deenergizes the TOLD relay. As explained before with respect to manual transfer, relays TR1, TR2 and TR4 are energized and the alarm relays energized, sealed in and the alarm circuitry is reset.

When the turbine is being accelerated prior to breaker closing and a transfer becomes necessary or is desired, the alarm circuitry must be manually reset since TOLD relay energization is prevented by the open breaker contacts 52GAX-A shown in FIG. 6B. For manual reset, for example the resetting of the lube temperature alarm circuit of FIG. 6D, the operator manually depresses the alarm reset pushbutton S-17 which when closed places relay 26LTX across the 48 volt busses. Once actuated, as previously explained, relay 26LTX is sealed in and the associated indicating light S-17 is illuminated. After all of the alarm circuitry has been reset, the operator can then start the turbine on the LMC providing all permissives are satisfied.

BUMPLESS TRANSFER AND TRACKING IN AND DIAGNOSTIC USAGE OF THE LMC

Unlike the prior art backup control systems, the LMC can and does track more than one signal. Furthermore, the operator is visually advised by appropriate lamps on the LMC operator's panel 500 (see FIG. 3) that the entire LMC with the exception of the temperature loop is armed and properly tracking. An explanation of how the LMC is armed or made ready to assume control was given in the previous section. As will be recalled, when the LMC is enabled, lamp S-11 of FIG. 6B (lamp 525 in FIG. 3) is lit signifying that fact. The tracking function and panel indications are accomplished in the following manner.

It was noted in the prior discussion that, when utilized, the LMC tracks or compares five different signals. By making sure that all five signals are within a narrow deadband, i.e., the same primary control signal and LMC signal are no more than 5% apart for example, bumpless transfer is insured, since transfer outside the deadband is inhibited.

The five signals which are tracked by the LMC are (see FIG. 7B):

a. control signal output (CSO);
b. gas throttle valve demand;
c. gas start valve demand;
d. oil throttle valve demand; and
e. oil bypass valve demand.

The tracking function which is accomplished with the aid of the logic deadband monitors 541, 542, 543, 544 and 545 is shown in FIGS. 4B and 4C.

The primary control CSO and the LMC CSO are both fed to the proportional error block 546 when any difference therebetween is amplified and forwarded to monitor 541. There, the CSO tracking error signal is compared to zero and if greater in magnitude, plus or minus, results in line 547 or 548 being set to a logical high. If either of these lines goes HI, indicating a CSO tracking error OR gate 549 is switched setting its output line 550 to a logical high. This signal, after negation by block 551, shows on line 553 that transfer from the P50 or primary control to the LMC is not permissible and also holds relay contacts XFPL (see FIG. 6A) opened preventing such transfer.

Line 554 also goes high indicating a tracking error which prevents a transfer of control from the LMC back to the P50 or primary control by holding relay contacts XFPC closed (see FIG. 6A). At the same time, the P50 mode logic signal is anded in gate 552 with the OR gate 550 output to cause line 555 to go high if both logical conditions exist, thereby illuminating the LMC NOT TRACKING panel lights 528 (see FIG. 3). It should be noted that the tracking error action described above for LMC output lines 553, 554 and 555 is the same for a tracking error in one of the four valve signals as for a tracking error in the CSO signal.

Tracking of the fuel valve signals is accomplished as follows. If the P50 or turbine is not oil firing, decisional block 556 forwards the LMC CSO signal to the proportional high signal limiting block 557 whereat the LMC CSO signal is multiplied by the gain factor shown and limited, in the preferred embodiment, to 5 volts. The resultant signal is forwarded to monitor block 542 where it is compared to the functionally identical P50 or primary control signal for the gas start valve 256 after that signal has also been high limited in block 568. The presence of any signal disparity or tracking error is relayed by monitor block 542 to OR gate 549. Decision block 567 forwards the appropriate signal on line 575 to the gas start valve 256 (see FIGS. 8 and 17) depending on whether the turbine is under LMC or primary control.

The LMC CSO is also forwarded to the proportional error block 559 where it is compared to a constant or setpoint valve generated by block 558, which constant represents a 25% fuel flow value. The developed error signal is forwarded, after being multiplied by the gain factor of block 559, to monitor block 543 where it is compared to the functionally identical P50 control signal for the gas throttle valve 258. Again, the presence of any tracking error is relayed by the signal monitor to OR gate 549. Decision block 569 forwards the appropriate signal on line 576 to the gas throttle valve 258 (see FIGS. 8 and 17) depending on whether the turbine is under LMC or primary control.

If the P50 or turbine is being oil fired, decision block 556, forwards the LMC CSO to the proportional error block 560 where it is compared to the 25% value. The developed error signal is forwarded, after being multiplied by the gain factor of block 560, to monitor block 544 where it is compared to the functionally identical P50 or primary control signal for the oil throttle valve 273. Again, the presence of any tracking error outside the deadband of monitor block 544 is logically relayed to OR gate 549. Decision block 570 forwards the appropriate signal on line 577 to the oil throttle valve 273 (see FIGS. 8 and 18) depending on whether the turbine is under LMC or primary control.

The oil bypass valve position demand signal tracking is accomplished in the following manner. The LMC CSO is fed to amplifying block 562, signal limiting block 563 having preset high and low signal limits and the proportional error with integrating action block 564. Pressure transducer 561 also forwards an input to block 564. The other input thereto is developed as an error signal between the output of block 564 and the P50 oil bypass valve position demand signal in block 567 and is received, via the action of decision block 566 if the turbine is under LMC control. If not, that error signal is delayed by the action of lag block 565 before being relayed back to the P50 on line 579. If in the P50 mode, the integrated error signal is algebraically added to the other inputs of block 564. The error signal is integrated at a rate which drives the output of block 564, to the value of the P50 oil bypass valve position demand signal. These two signals are compared in monitor block 545 and any tracking error is again logically relayed to OR gate 549. Decision block 571 forwards the appropriate signal on line 578 to the oil bypass valve 270 (see FIGS. 8 and 18) depending on whether the turbine is under LMC or primary control.

In this manner, the LMC provides multiple signal tracking capability as well as diagnostic assistance. The operator can thereby determine at a glance whether the back-up control is properly tracking all of the requisite signals and whether the primary control is able to resume operational command, that is, whether or not the primary control is also properly tracking. This insures bumpless transfer since the five tracked set of signal will be within an allowable percentage of each other and it also prevents transfer back to the primary control when the primary control would otherwise be willing or is healthy but not able or not properly tracking.

LMC OPERATOR'S PANEL - BRIEF DESCRIPTION

Figure 3:
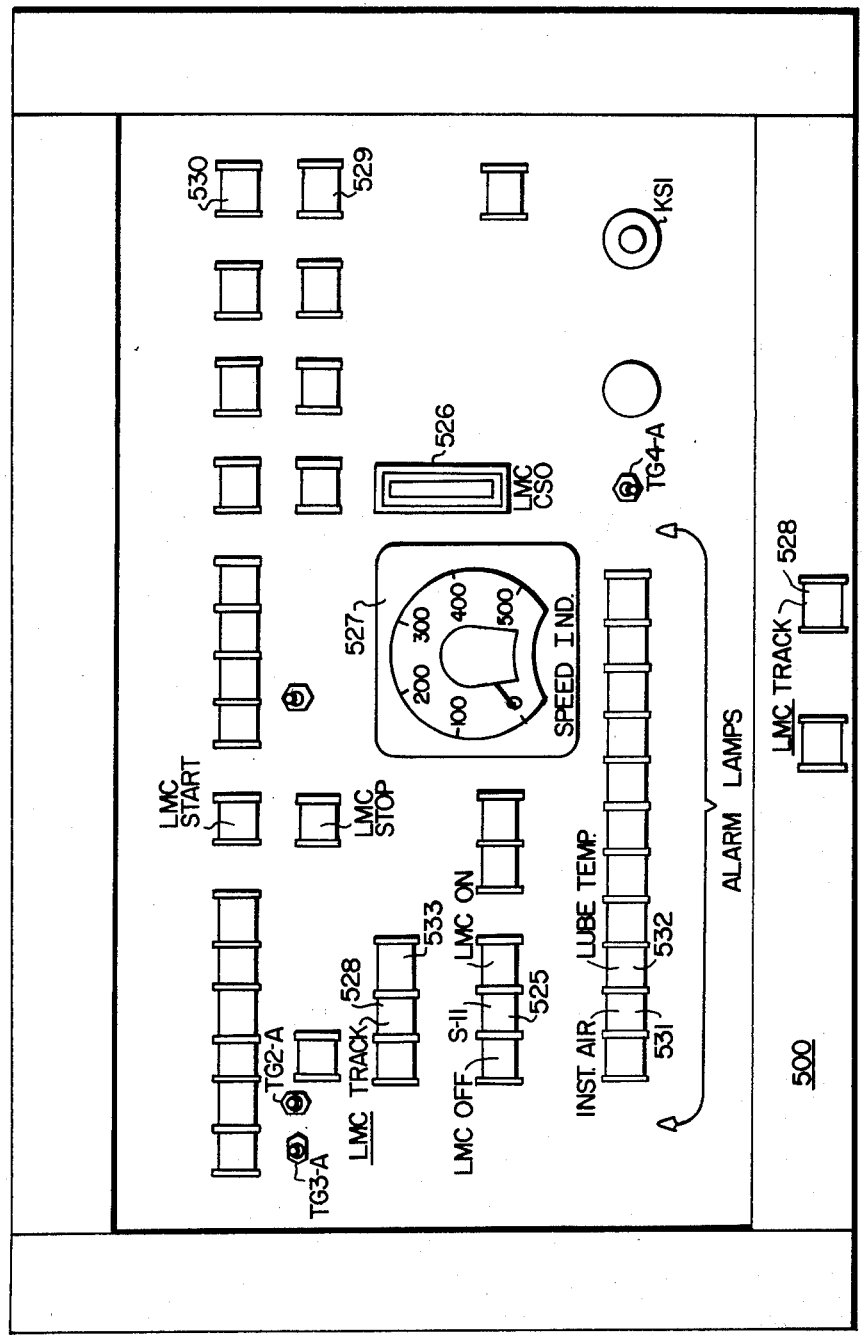
FIG. 3 shows a top view of the local maintenance controller operator's panel.

In addition to the several identifying functions previously noted the LMC operator's panel 500 also includes other indicating lamps, switches and pushbuttons. These are illustrated in FIG. 3.

For example, the speed/load decrease and increase combined pushbuttons and lamps are in the upper right-hand portion of the panel and identified by reference numerals 529 and 530 respectively. The LMC CSO is displayed by indicator or meter 526 and the generator speed by indicator or meter 527 (see also FIG. 4C). The alarm lamps for instrument air 531, lube temperature 532 and the remaining alarm lamps are horizontally clustered in the lower left-hand portion of panel 500.

The two speed channels shown in FIG. 4A are checked by monitoring the higher speed selected and the average speed in block 580. Any error beyond the deadband of block 580 is logically relayed to OR gate 581, the output of which is utilized to illuminate panel lamp 533 to indicate a speed error. Vibration in tolerance is similarly indicated as are such functions as speed ready to synch or speed in excess of or equal to 95%, shutdown of the starting device or speed in excess of 60% and the fact that the LMC, when in control is being temperature limited.

Thus, there has been shown and illustrated what is considered at present to be the preferred embodiment of the invention. While the preferred embodiment has been specifically described in a particular operating environment, it will be appreciated and understood that alternative embodiments and modifications thereof are possible and within the abilities of those skilled in the art. Consequently, it is intended that the invention not be limited by the foregoing description thereof, but be accorded the fullest scope and spirit consistent with its broad principles except as fairly limited by any pertinent prior art.

We claim:

1. For a gas turbine power plant having a primary control system which develops a control signal output utilized to regulate fuel flow to the turbine and a plurality of signals for regulating predetermined plant elements, the plant including a plurality of sensors for indicating the status of predetermined plant parameters and operating status conditions, backup control apparatus comprising:
   a. input means coupled to receive information from the plant sensors;
   b. first means, coupled to said input means, for generating a control signal output independently of the functionally identical signal developed by the primary control system;
   c. second means, coupled to said input means, for generating an equal plurality of signals for regulating the predetermined plant elements independently of the functionally identical signals developed by the primary control system;
   d. means for comparing each of the functionally identical signals, coupled to said first and second means for generating, and for developing a tracking error signal in response to any difference between any one of said generated signals and the functionally identical signal developed by the primary control system; and
   e. transfer enabling means, connected between the primary control system and the means for comparing, for preventing a shift in control command to said backup apparatus whenever said means for comparing develops said tracking error signal.

2. The apparatus according to claim 1 which further comprises an operator's panel including means responsive to said tracking error signal for indicating the development of said tracking error signal.

3. The apparatus according to claim 2 wherein said transfer means further includes means for preventing a shift in control command to the primary control system whenever said means for comparing develops said tracking error signal.

4. The apparatus according to claim 3 wherein the primary control system and said second means for generating both develop a plurality of signals for use in regulating fuel valve positioning.

5. The apparatus according to claim 1 wherein said transfer means further includes means for preventing a shift in control command to the primary control system whenever said means for comparing develops said tracking error signal.

6. The apparatus according to claim 5 wherein the primary control system and said second means for generating both develop a plurality of signals for use in regulating fuel valve positioning.

7. The apparatus according to claim 1 wherein the primary control system and said second means for generating both develop a plurality of signals for use in regulating fuel valve positioning.

8. For a gas turbine power plant having a primary control system which develops a plurality of signals for regulating predetermined plant elements, the plant including a plurality of sensors for indicating the status of predetermined plant parameters and operating status conditions, backup control apparatus comprising:
   a. input means coupled to receive information from the plant sensors;
   b. means, coupled to said input means, for generating an equal plurality of signals for regulating the predetermined plant elements independently of the functionally identical signals developed by the primary control system;
   c. means for comparing each of the functionally identical signals, coupled to said means for generating, and for developing a tracking error signal in response to any difference between any one of said generated signals and the functionally identical signal developed by the primary control system; and
   d. transfer enabling means, connected between the primary control system and the means for comparing, for preventing a shift in control command to said backup apparatus whenever said means for comparing develops said tracking error signal.

9. The apparatus according to claim 8 which further comprises an operator's panel including means responsive to said tracking error signal for indicating the development of said tracking error signal.

10. The apparatus according to claim 9 wherein said transfer means further includes means for preventing a shift in control command to the primary control system whenever said means for comparing develops said tracking error signal.

11. The apparatus according to claim 8 wherein said transfer means further includes means for preventing a shift in control command to the primary control system whenever said means for comparing develops said tracking error signal.

* * * * *